US 8,103,496 B1

(12) United States Patent
Roe et al.

(10) Patent No.: US 8,103,496 B1
(45) Date of Patent: Jan. 24, 2012

(54) BREAKPOINT CONTROL IN AN IN-CIRCUIT EMULATION SYSTEM

(75) Inventors: Steve Roe, Woodinville, WA (US); Craig Nemecek, Seattle, WA (US)

(73) Assignee: Cypress Semicondutor Corporation, San Jose ( * ) Notice: Subject to any disclaimer, the term of this patent is extended or adjusted under 35 U.S.C. 154(b) by 985 days.

(21) Appl. No.: 10/001,477

(22) Filed: Nov. 1, 2001

Related U.S. Application Data

(63) Continuation-in-part of application No. 09/975,105, filed on Oct. 10, 2001, now Pat. No. 7,206,733.

(60) Provisional application No. 60/243,708, filed on Oct. 26, 2000.

(51) Int. Cl.
G06F 9/455 (2006.01)
G06F 11/36 (2006.01)

(52) U.S. Cl. ........... 703/28; 703/23; 714/28; 714/34; 717/129

(58) Field of Classification Search .......... 703/28, 703/23; 714/28, 34; 717/129
See application file for complete search history.

(56) References Cited

U.S. PATENT DOCUMENTS

| | | |
|---|---|---|
| 3,600,690 A | 8/1971 | White |
| 3,725,804 A | 4/1973 | Langan |
| 3,740,588 A | 6/1973 | Stratton et al. |
| 3,805,245 A | 4/1974 | Brooks et al. |
| 3,810,036 A | 5/1974 | Bloedorn |
| 3,831,113 A | 8/1974 | Ahmed |
| 3,845,328 A | 10/1974 | Hollingsworth |
| 3,940,760 A | 2/1976 | Brokaw |
| 4,061,987 A | 12/1977 | Nagahama |
| 4,134,073 A | 1/1979 | MacGregor |
| 4,138,671 A | 2/1979 | Comer et al. |
| 4,176,258 A | 11/1979 | Jackson |
| 4,250,464 A | 2/1981 | Schade, Jr. |
| 4,272,760 A | 6/1981 | Prazak et al. |
| 4,283,713 A | 8/1981 | Philipp |
| 4,326,135 A | 4/1982 | Jarrett et al. |
| 4,344,067 A | 8/1982 | Lee |
| 4,380,083 A | 4/1983 | Andersson et al. |
| 4,438,404 A | 3/1984 | Philipp |
| 4,475,151 A | 10/1984 | Philipp |
| 4,497,575 A | 2/1985 | Philipp |
| 4,604,363 A | 8/1986 | Newhouse et al. |

(Continued)

FOREIGN PATENT DOCUMENTS

DE 19710829 A1 9/1998

(Continued)

OTHER PUBLICATIONS

Richard M. Stallman and Roland H. Pesch, Debugging with The GNU Source-Level Debugger, Jan. 1994, retrieved on May 2, 2005 from http://www.cs.utah.edu, "Stopping and Continuing".*

(Continued)

*Primary Examiner* — Jason Proctor

(57) ABSTRACT

A breakpoint control mechanism for an In-Circuit Emulation system. Break bits are assigned to each instruction address and stored in a lookup table within a base station containing a virtual microcontroller. As a program counter increments, a determination is made as to whether or not a break is to occur by reading the break bit from the lookup table. When a break is to occur, a breakpoint controller issues a break command over an interface to an actual microcontroller under test, thus freeing the microcontroller under test from having to include a look-up table on board for a breakpoint control or otherwise provide specifically for breakpoint control.

21 Claims, 9 Drawing Sheets

U.S. PATENT DOCUMENTS

| | | | |
|---|---|---|---|
| 4,608,502 A | 8/1986 | Dijkmans et al. | |
| 4,656,603 A | 4/1987 | Dunn | |
| 4,670,838 A | 6/1987 | Kawata | |
| 4,689,740 A | 8/1987 | Moelands et al. | |
| 4,692,718 A | 9/1987 | Roza et al. | |
| 4,701,907 A | 10/1987 | Collins | |
| 4,727,541 A | 2/1988 | Mori et al. | |
| 4,736,097 A | 4/1988 | Philipp | |
| 4,740,966 A | 4/1988 | Goad | |
| 4,755,766 A | 7/1988 | Metz | |
| 4,773,024 A | 9/1988 | Faggin et al. | |
| 4,794,558 A | 12/1988 | Thompson | |
| 4,802,103 A | 1/1989 | Faggin et al. | |
| 4,802,119 A | 1/1989 | Heene et al. | |
| 4,807,183 A | 2/1989 | Kung et al. | |
| 4,809,345 A | 2/1989 | Tabata et al. | |
| 4,812,684 A | 3/1989 | Yamagiwa et al. | |
| 4,813,013 A | 3/1989 | Dunn | |
| 4,827,401 A | 5/1989 | Hrustich et al. | |
| 4,831,546 A | 5/1989 | Mitsuta et al. | |
| 4,833,418 A | 5/1989 | Quintus et al. | |
| 4,868,525 A | 9/1989 | Dias | |
| 4,876,466 A | 10/1989 | Kondou et al. | |
| 4,876,534 A | 10/1989 | Mead et al. | |
| 4,878,200 A | 10/1989 | Asghar et al. | |
| 4,879,688 A | 11/1989 | Turner et al. | |
| 4,885,484 A | 12/1989 | Gray | |
| 4,907,121 A | 3/1990 | Hrassky | |
| 4,939,637 A | 7/1990 | Pawloski | |
| 4,942,540 A | 7/1990 | Black et al. | |
| 4,947,169 A | 8/1990 | Smith et al. | |
| 4,953,928 A | 9/1990 | Anderson et al. | |
| 4,962,342 A | 10/1990 | Mead et al. | |
| 4,964,074 A | 10/1990 | Suzuki et al. | |
| 4,969,087 A | 11/1990 | Tanagawa et al. | |
| 4,970,408 A | 11/1990 | Hanke et al. | |
| 4,972,372 A | 11/1990 | Ueno | |
| 4,977,381 A | 12/1990 | Main | |
| 4,980,652 A | 12/1990 | Tarusawa et al. | |
| 4,999,519 A | 3/1991 | Kitsukawa et al. | |
| 5,043,674 A | 8/1991 | Bonaccio et al. | |
| 5,049,758 A | 9/1991 | Mead et al. | |
| 5,050,168 A * | 9/1991 | Paterson | 714/35 |
| 5,053,949 A | 10/1991 | Allison et al. | |
| 5,055,827 A | 10/1991 | Philipp | |
| 5,059,920 A | 10/1991 | Anderson et al. | |
| 5,068,622 A | 11/1991 | Mead et al. | |
| 5,073,759 A | 12/1991 | Mead et al. | |
| 5,083,044 A | 1/1992 | Mead et al. | |
| 5,095,284 A | 3/1992 | Mead | |
| 5,097,305 A | 3/1992 | Mead et al. | |
| 5,099,191 A | 3/1992 | Galler et al. | |
| 5,107,146 A | 4/1992 | El-Ayat | |
| 5,107,149 A | 4/1992 | Platt et al. | |
| 5,109,261 A | 4/1992 | Mead et al. | |
| 5,119,038 A | 6/1992 | Anderson et al. | |
| 5,120,996 A | 6/1992 | Mead et al. | |
| 5,122,800 A | 6/1992 | Philipp | |
| 5,126,685 A | 6/1992 | Platt et al. | |
| 5,127,103 A | 6/1992 | Hill et al. | |
| 5,128,871 A | 7/1992 | Schmitz | |
| 5,136,188 A | 8/1992 | Ha et al. | |
| 5,140,197 A | 8/1992 | Grider | |
| 5,142,247 A | 8/1992 | Lada et al. | |
| 5,144,582 A | 9/1992 | Steele | |
| 5,146,106 A | 9/1992 | Anderson et al. | |
| 5,150,079 A | 9/1992 | Williams et al. | |
| 5,155,836 A | 10/1992 | Jordan et al. | |
| 5,159,292 A | 10/1992 | Canfield et al. | |
| 5,159,335 A | 10/1992 | Veneruso | |
| 5,160,899 A | 11/1992 | Anderson et al. | |
| 5,161,124 A | 11/1992 | Love | |
| 5,165,054 A | 11/1992 | Platt et al. | |
| 5,166,562 A | 11/1992 | Allen et al. | |
| 5,175,884 A | 12/1992 | Suarez | |
| 5,179,531 A | 1/1993 | Yamaki | |
| 5,184,061 A | 2/1993 | Lee et al. | |
| 5,196,740 A | 3/1993 | Austin | |
| 5,198,817 A | 3/1993 | Walden et al. | |
| 5,200,751 A | 4/1993 | Smith | |
| 5,202,687 A | 4/1993 | Distinti | |
| 5,204,549 A | 4/1993 | Platt et al. | |
| 5,206,582 A | 4/1993 | Ekstedt et al. | |
| 5,220,512 A | 6/1993 | Watkins et al. | |
| 5,225,991 A | 7/1993 | Dougherty | |
| 5,230,000 A | 7/1993 | Mozingo et al. | |
| 5,235,617 A | 8/1993 | Mallard, Jr. | |
| 5,241,492 A | 8/1993 | Girardeau, Jr. | |
| 5,243,554 A | 9/1993 | Allen et al. | |
| 5,245,262 A | 9/1993 | Moody et al. | |
| 5,248,843 A | 9/1993 | Billings | |
| 5,248,873 A | 9/1993 | Allen et al. | |
| 5,258,760 A | 11/1993 | Moody et al. | |
| 5,260,592 A | 11/1993 | Mead et al. | |
| 5,260,979 A | 11/1993 | Parker et al. | |
| 5,270,963 A | 12/1993 | Allen et al. | |
| 5,276,407 A | 1/1994 | Mead et al. | |
| 5,276,739 A | 1/1994 | Krokstad et al. | |
| 5,276,890 A | 1/1994 | Arai | |
| 5,280,199 A | 1/1994 | Itakura | |
| 5,280,202 A | 1/1994 | Chan et al. | |
| 5,289,023 A | 2/1994 | Mead | |
| 5,303,329 A | 4/1994 | Mead et al. | |
| 5,304,955 A | 4/1994 | Atriss et al. | |
| 5,305,017 A | 4/1994 | Gerpheide | |
| 5,305,312 A | 4/1994 | Fornek et al. | |
| 5,307,381 A | 4/1994 | Ahuja | |
| 5,313,618 A | 5/1994 | Pawloski | |
| 5,317,202 A | 5/1994 | Waizman | |
| 5,319,370 A | 6/1994 | Signore et al. | |
| 5,319,771 A | 6/1994 | Takeda | |
| 5,321,828 A | 6/1994 | Phillips et al. | |
| 5,324,958 A | 6/1994 | Mead et al. | |
| 5,325,512 A | 6/1994 | Takahashi | |
| 5,329,471 A | 7/1994 | Swoboda et al. | |
| 5,331,215 A | 7/1994 | Allen et al. | |
| 5,331,315 A | 7/1994 | Crosette | |
| 5,331,571 A | 7/1994 | Aronoff et al. | |
| 5,334,952 A | 8/1994 | Maddy et al. | |
| 5,335,342 A | 8/1994 | Pope et al. | |
| 5,336,936 A | 8/1994 | Allen et al. | |
| 5,339,213 A | 8/1994 | O'Callaghan | |
| 5,339,262 A | 8/1994 | Rostoker et al. | |
| 5,341,044 A | 8/1994 | Ahanin et al. | |
| 5,341,267 A | 8/1994 | Whitten | |
| 5,345,195 A | 9/1994 | Cordoba et al. | |
| 5,349,303 A | 9/1994 | Gerpheide | |
| 5,355,097 A | 10/1994 | Scott et al. | |
| 5,357,626 A | 10/1994 | Johnson et al. | |
| 5,361,290 A | 11/1994 | Akiyama | |
| 5,371,524 A | 12/1994 | Lewis et al. | |
| 5,371,860 A | 12/1994 | Mura et al. | |
| 5,371,878 A | 12/1994 | Coker | |
| 5,371,883 A | 12/1994 | Gross et al. | |
| 5,374,787 A | 12/1994 | Miller et al. | |
| 5,377,333 A | 12/1994 | Nakagoshi et al. | |
| 5,378,935 A | 1/1995 | Korhonen et al. | |
| 5,381,515 A | 1/1995 | Platt et al. | |
| 5,384,467 A | 1/1995 | Plimon et al. | |
| 5,384,745 A | 1/1995 | Konishi et al. | |
| 5,384,910 A | 1/1995 | Torres | |
| 5,392,784 A | 2/1995 | Gudaitis | |
| 5,394,522 A | 2/1995 | Sanchez-Frank et al. | |
| 5,396,245 A | 3/1995 | Rempfer | |
| 5,398,261 A | 3/1995 | Marbot | |
| 5,399,922 A | 3/1995 | Kiani et al. | |
| 5,408,194 A | 4/1995 | Steinbach et al. | |
| 5,408,235 A | 4/1995 | Doyle et al. | |
| 5,414,308 A | 5/1995 | Lee et al. | |
| 5,414,380 A | 5/1995 | Floyd et al. | |
| 5,416,895 A | 5/1995 | Anderson et al. | |
| 5,422,823 A | 6/1995 | Agrawal et al. | |
| 5,424,689 A | 6/1995 | Gillig et al. | |
| 5,426,378 A | 6/1995 | Ong | |
| 5,426,384 A | 6/1995 | May | |
| 5,428,319 A | 6/1995 | Marvin et al. | |
| 5,430,395 A | 7/1995 | Ichimaru | |

| Patent No. | Date | Inventor(s) |
|---|---|---|
| 5,430,687 A | 7/1995 | Hung et al. |
| 5,430,734 A | 7/1995 | Gilson |
| 5,432,476 A | 7/1995 | Tran |
| 5,438,672 A * | 8/1995 | Dey ............................... 703/23 |
| 5,440,305 A | 8/1995 | Signore et al. |
| 5,451,887 A | 9/1995 | El-Avat et al. |
| 5,453,904 A | 9/1995 | Higashiyama et al. |
| 5,455,525 A | 10/1995 | Ho et al. |
| 5,455,731 A | 10/1995 | Parkinson |
| 5,455,927 A | 10/1995 | Huang |
| 5,457,410 A | 10/1995 | Ting |
| 5,457,479 A | 10/1995 | Cheng |
| 5,463,591 A | 10/1995 | Aimoto et al. |
| 5,479,603 A | 12/1995 | Stone et al. |
| 5,479,643 A | 12/1995 | Bhaskar et al. |
| 5,479,652 A | 12/1995 | Dreyer et al. |
| 5,481,471 A | 1/1996 | Naglestad |
| 5,488,204 A | 1/1996 | Mead et al. |
| 5,491,458 A | 2/1996 | McCune |
| 5,493,246 A | 2/1996 | Anderson |
| 5,493,723 A * | 2/1996 | Beck et al. ....................... 703/28 |
| 5,495,077 A | 2/1996 | Miller et al. |
| 5,495,593 A | 2/1996 | Elmer et al. |
| 5,495,594 A | 2/1996 | MacKenna et al. |
| 5,497,119 A | 3/1996 | Tedrow et al. |
| 5,499,192 A | 3/1996 | Knapp et al. |
| 5,500,823 A | 3/1996 | Martin et al. |
| 5,517,198 A | 5/1996 | McEwan |
| 5,519,854 A | 5/1996 | Watt |
| 5,521,529 A | 5/1996 | Agrawal et al. |
| 5,530,444 A | 6/1996 | Tice et al. |
| 5,530,673 A | 6/1996 | Tobita et al. |
| 5,530,813 A | 6/1996 | Paulsen et al. |
| 5,537,057 A | 7/1996 | Leong et al. |
| 5,541,878 A | 7/1996 | LeMoncheck et al. |
| 5,542,055 A | 7/1996 | Amini et al. |
| 5,543,588 A | 8/1996 | Bisset et al. |
| 5,543,590 A | 8/1996 | Gillespie et al. |
| 5,543,591 A | 8/1996 | Gillespie et al. |
| 5,544,067 A | 8/1996 | Rostoker et al. |
| 5,544,311 A | 8/1996 | Harenberg et al. |
| 5,546,433 A | 8/1996 | Tran et al. |
| 5,546,562 A | 8/1996 | Patel |
| 5,552,725 A | 9/1996 | Ray et al. |
| 5,552,748 A | 9/1996 | O'Shaughnessy |
| 5,554,951 A | 9/1996 | Gough |
| 5,555,452 A | 9/1996 | Callaway, Jr. et al. |
| 5,555,907 A | 9/1996 | Philipp |
| 5,557,762 A | 9/1996 | Okuaki et al. |
| 5,559,502 A | 9/1996 | Schutte |
| 5,559,996 A | 9/1996 | Fujioka et al. |
| 5,563,526 A | 10/1996 | Hastings et al. |
| 5,563,529 A | 10/1996 | Seltzer et al. |
| 5,564,010 A | 10/1996 | Henry et al. |
| 5,564,108 A | 10/1996 | Hunsaker et al. |
| 5,565,658 A | 10/1996 | Gerpheide et al. |
| 5,566,702 A | 10/1996 | Philipp |
| 5,572,665 A | 11/1996 | Nakabayashi |
| 5,572,719 A | 11/1996 | Biesterfeldt |
| 5,574,678 A | 11/1996 | Gorecki |
| 5,574,852 A | 11/1996 | Bakker et al. |
| 5,574,892 A | 11/1996 | Christensen |
| 5,579,353 A | 11/1996 | Parmenter et al. |
| 5,587,945 A | 12/1996 | Lin et al. |
| 5,587,957 A | 12/1996 | Kowalczyk et al. |
| 5,590,354 A | 12/1996 | Klapproth et al. |
| 5,594,388 A | 1/1997 | O'Shaughnessy et al. |
| 5,594,734 A | 1/1997 | Worsley et al. |
| 5,594,876 A | 1/1997 | Getzlaff et al. |
| 5,594,890 A | 1/1997 | Yamaura et al. |
| 5,600,262 A | 2/1997 | Kolze |
| 5,604,466 A | 2/1997 | Dreps et al. |
| 5,608,892 A | 3/1997 | Wakerly |
| 5,614,861 A | 3/1997 | Harada |
| 5,625,316 A | 4/1997 | Chambers et al. |
| 5,625,583 A | 4/1997 | Hyatt |
| 5,629,857 A | 5/1997 | Brennan |
| 5,629,891 A | 5/1997 | LeMoncheck et al. |
| 5,630,052 A | 5/1997 | Shah |
| 5,630,057 A | 5/1997 | Hait |
| 5,630,102 A | 5/1997 | Johnson et al. |
| 5,631,577 A | 5/1997 | Freidin et al. |
| 5,633,766 A | 5/1997 | Hase et al. |
| 5,642,295 A | 6/1997 | Smayling |
| 5,646,544 A | 7/1997 | Iadanza |
| 5,646,901 A | 7/1997 | Sharpe-Geisler et al. |
| 5,648,642 A | 7/1997 | Miller et al. |
| 5,651,035 A | 7/1997 | Tozun |
| 5,652,893 A | 7/1997 | Ben-Meir et al. |
| 5,661,433 A | 8/1997 | LaRosa et al. |
| 5,663,900 A * | 9/1997 | Bhandari et al. ................. 716/17 |
| 5,663,965 A | 9/1997 | Seymour |
| 5,664,199 A | 9/1997 | Kuwahara |
| 5,666,480 A | 9/1997 | Leung et al. |
| 5,670,915 A | 9/1997 | Cooper et al. |
| 5,673,198 A | 9/1997 | Lawman et al. |
| 5,675,825 A | 10/1997 | Dreyer et al. |
| 5,677,691 A | 10/1997 | Hosticka et al. |
| 5,680,070 A | 10/1997 | Anderson et al. |
| 5,682,032 A | 10/1997 | Philipp |
| 5,684,434 A | 11/1997 | Mann et al. |
| 5,684,952 A | 11/1997 | Stein |
| 5,686,844 A | 11/1997 | Hull et al. |
| 5,687,325 A | 11/1997 | Chang |
| 5,689,195 A | 11/1997 | Cliff et al. |
| 5,689,196 A | 11/1997 | Schutte |
| 5,691,664 A | 11/1997 | Anderson et al. |
| 5,691,898 A | 11/1997 | Rosenberg et al. |
| 5,694,063 A | 12/1997 | Burlison et al. |
| 5,696,952 A | 12/1997 | Pontarelli |
| 5,699,024 A | 12/1997 | Manlove et al. |
| 5,703,871 A | 12/1997 | Pope et al. |
| 5,706,453 A | 1/1998 | Cheng et al. |
| 5,708,589 A | 1/1998 | Beauvais |
| 5,710,906 A | 1/1998 | Ghosh et al. |
| 5,712,969 A | 1/1998 | Zimmermann et al. |
| 5,721,931 A | 2/1998 | Gephardt et al. |
| 5,724,009 A | 3/1998 | Collins et al. |
| 5,727,170 A | 3/1998 | Mitchell et al. |
| 5,728,933 A | 3/1998 | Schultz et al. |
| 5,729,704 A | 3/1998 | Stone et al. |
| 5,730,165 A | 3/1998 | Philipp |
| 5,732,277 A | 3/1998 | Kodosky et al. |
| 5,734,272 A | 3/1998 | Belot et al. |
| 5,734,334 A | 3/1998 | Hsieh et al. |
| 5,737,557 A | 4/1998 | Sullivan |
| 5,737,760 A | 4/1998 | Grimmer et al. |
| 5,745,011 A | 4/1998 | Scott |
| 5,748,048 A | 5/1998 | Moyal |
| 5,748,875 A * | 5/1998 | Tzori ............................... 714/29 |
| 5,752,013 A | 5/1998 | Christensen et al. |
| 5,754,552 A | 5/1998 | Allmond et al. |
| 5,754,826 A | 5/1998 | Gamal et al. |
| 5,757,368 A | 5/1998 | Gerpheide et al. |
| 5,758,058 A | 5/1998 | Milburn |
| 5,761,128 A | 6/1998 | Watanabe |
| 5,763,909 A | 6/1998 | Mead et al. |
| 5,764,714 A | 6/1998 | Stansell et al. |
| 5,767,457 A | 6/1998 | Gerpheide et al. |
| 5,774,704 A | 6/1998 | Williams |
| 5,777,399 A | 7/1998 | Shibuya |
| 5,781,030 A | 7/1998 | Agrawal et al. |
| 5,781,747 A | 7/1998 | Smith et al. |
| 5,784,545 A | 7/1998 | Anderson et al. |
| 5,790,957 A | 8/1998 | Heidari |
| 5,796,183 A | 8/1998 | Hourmand |
| 5,799,176 A | 8/1998 | Kapusta et al. |
| 5,801,958 A | 9/1998 | Dangelo et al. |
| 5,802,073 A | 9/1998 | Platt |
| 5,802,290 A | 9/1998 | Casselman |
| 5,805,792 A | 9/1998 | Swoboda et al. |
| 5,805,897 A | 9/1998 | Glowny |
| 5,808,883 A | 9/1998 | Hawkes |
| 5,811,987 A | 9/1998 | Ashmore, Jr. et al. |
| 5,812,698 A | 9/1998 | Platt et al. |
| 5,818,254 A | 10/1998 | Agrawal et al. |
| 5,818,444 A | 10/1998 | Alimpich et al. |
| 5,818,736 A | 10/1998 | Leibold |

| Patent | Date | Inventors | Patent | Date | Inventors |
|---|---|---|---|---|---|
| 5,819,028 A | 10/1998 | Manghirmalani et al. | 5,964,893 A | 10/1999 | Circello et al. |
| 5,822,387 A | 10/1998 | Mar | 5,966,027 A | 10/1999 | Kapusta et al. |
| 5,822,531 A | 10/1998 | Gorczyca et al. | 5,966,532 A | 10/1999 | McDonald et al. |
| 5,828,693 A | 10/1998 | Mays et al. | 5,968,135 A | 10/1999 | Teramoto et al. |
| 5,838,583 A | 11/1998 | Varadarajan et al. | 5,969,513 A | 10/1999 | Clark |
| 5,841,078 A | 11/1998 | Miller et al. | 5,969,632 A | 10/1999 | Diamant et al. |
| 5,841,996 A | 11/1998 | Nolan et al. | 5,973,368 A | 10/1999 | Pearce et al. |
| 5,844,404 A | 12/1998 | Caser et al. | 5,974,235 A | 10/1999 | Nunally et al. |
| 5,848,285 A | 12/1998 | Kapusta et al. | 5,977,791 A | 11/1999 | Veenstra |
| 5,850,156 A | 12/1998 | Wittman | 5,978,584 A | 11/1999 | Nishibata et al. |
| 5,852,733 A | 12/1998 | Chien et al. | 5,978,937 A | 11/1999 | Miyamori et al. |
| 5,854,625 A | 12/1998 | Frisch et al. | 5,982,105 A | 11/1999 | Masters |
| 5,857,109 A | 1/1999 | Taylor | 5,982,229 A | 11/1999 | Wong et al. |
| 5,861,583 A | 1/1999 | Schediwy et al. | 5,982,241 A | 11/1999 | Nguyen et al. |
| 5,861,875 A | 1/1999 | Gerpheide | 5,983,277 A | 11/1999 | Heile et al. |
| 5,864,242 A | 1/1999 | Allen et al. | 5,986,479 A | 11/1999 | Mohan |
| 5,864,392 A | 1/1999 | Winklhofer et al. | 5,987,246 A | 11/1999 | Thomsen et al. |
| 5,867,046 A | 2/1999 | Sugasawa | 5,988,902 A | 11/1999 | Holehan |
| 5,867,399 A | 2/1999 | Rostoker et al. | 5,994,939 A | 11/1999 | Johnson et al. |
| 5,869,979 A | 2/1999 | Bocchino | 5,996,032 A | 11/1999 | Baker |
| 5,870,004 A | 2/1999 | Lu | 5,999,725 A | 12/1999 | Barbier et al. |
| 5,870,309 A | 2/1999 | Lawman | 6,002,268 A | 12/1999 | Sasaki et al. |
| 5,870,345 A | 2/1999 | Stecker | 6,002,398 A | 12/1999 | Wilson |
| 5,872,464 A | 2/1999 | Gradinariu | 6,003,054 A | 12/1999 | Oshima et al. |
| 5,874,958 A | 2/1999 | Ludolph | 6,003,107 A | 12/1999 | Ranson et al. |
| 5,875,293 A | 2/1999 | Bell et al. | 6,003,133 A | 12/1999 | Moughanni et al. |
| 5,877,656 A | 3/1999 | Mann et al. | 6,005,814 A | 12/1999 | Mulholland et al. |
| 5,878,425 A | 3/1999 | Redpath | 6,005,904 A | 12/1999 | Knapp et al. |
| 5,880,411 A | 3/1999 | Gillespie et al. | 6,008,685 A | 12/1999 | Kunst |
| 5,880,598 A | 3/1999 | Duong | 6,008,703 A | 12/1999 | Perrott et al. |
| 5,883,623 A | 3/1999 | Cseri | 6,009,270 A | 12/1999 | Mann |
| 5,886,582 A | 3/1999 | Stansell | 6,009,496 A | 12/1999 | Tsai |
| 5,887,189 A | 3/1999 | Bims et al. | 6,011,407 A | 1/2000 | New |
| 5,889,236 A | 3/1999 | Gillespie et al. | 6,012,835 A | 1/2000 | Thompson et al. |
| 5,889,723 A | 3/1999 | Pascucci | 6,014,135 A | 1/2000 | Fernandes |
| 5,889,936 A | 3/1999 | Chan | 6,014,509 A | 1/2000 | Furtek et al. |
| 5,889,988 A | 3/1999 | Held | 6,014,723 A | 1/2000 | Tremblay et al. |
| 5,894,226 A | 4/1999 | Koyama | 6,016,554 A | 1/2000 | Skrovan et al. |
| 5,894,243 A | 4/1999 | Hwang | 6,016,563 A | 1/2000 | Fleisher |
| 5,894,565 A | 4/1999 | Furtek et al. | 6,018,559 A | 1/2000 | Azegami et al. |
| 5,895,494 A | 4/1999 | Scalzi et al. | 6,023,422 A | 2/2000 | Allen et al. |
| 5,896,068 A | 4/1999 | Moyal | 6,023,565 A | 2/2000 | Lawman et al. |
| 5,896,330 A | 4/1999 | Gibson | 6,026,134 A | 2/2000 | Duffy et al. |
| 5,898,345 A | 4/1999 | Namura et al. | 6,026,501 A | 2/2000 | Hohl et al. |
| 5,900,780 A | 5/1999 | Hirose et al. | 6,028,271 A | 2/2000 | Gillespie et al. |
| 5,901,062 A | 5/1999 | Burch et al. | 6,028,959 A | 2/2000 | Wang et al. |
| 5,903,718 A | 5/1999 | Marik | 6,031,365 A | 2/2000 | Sharpe-Geisler |
| 5,905,398 A | 5/1999 | Todsen et al. | 6,032,268 A | 2/2000 | Swoboda et al. |
| 5,909,544 A | 6/1999 | Anderson, II et al. | 6,034,538 A | 3/2000 | Abramovici |
| 5,911,059 A | 6/1999 | Profit, Jr. | 6,035,320 A | 3/2000 | Kiriaki et al. |
| 5,914,465 A | 6/1999 | Allen et al. | 6,037,807 A | 3/2000 | Wu et al. |
| 5,914,633 A | 6/1999 | Comino et al. | 6,038,551 A | 3/2000 | Barlow et al. |
| 5,914,708 A | 6/1999 | LaGrange et al. | 6,041,406 A | 3/2000 | Mann |
| 5,917,356 A | 6/1999 | Casal et al. | 6,043,695 A | 3/2000 | O'Sullivan |
| 5,920,310 A | 7/1999 | Faggin et al. | 6,043,719 A | 3/2000 | Lin et al. |
| 5,923,264 A | 7/1999 | Lavelle et al. | 6,049,223 A | 4/2000 | Lytle et al. |
| 5,926,566 A | 7/1999 | Wang et al. | 6,049,225 A | 4/2000 | Huang et al. |
| 5,929,710 A | 7/1999 | Bien | 6,051,772 A | 4/2000 | Cameron et al. |
| 5,930,148 A | 7/1999 | Bjorksten et al. | 6,052,035 A | 4/2000 | Nolan et al. |
| 5,930,150 A | 7/1999 | Cohen et al. | 6,052,524 A | 4/2000 | Pauna |
| 5,931,959 A | 8/1999 | Kwiat | 6,055,584 A | 4/2000 | Bridges et al. |
| 5,933,023 A | 8/1999 | Young | 6,057,705 A | 5/2000 | Wojewoda et al. |
| 5,933,356 A | 8/1999 | Rostoker et al. | 6,058,263 A | 5/2000 | Voth |
| 5,933,816 A | 8/1999 | Zeanah et al. | 6,058,452 A | 5/2000 | Rangasayee et al. |
| 5,935,233 A | 8/1999 | Jeddeloh | 6,061,511 A | 5/2000 | Marantz et al. |
| 5,935,266 A | 8/1999 | Thurnhofer et al. | 6,066,961 A | 5/2000 | Lee et al. |
| 5,939,904 A | 8/1999 | Fetterman et al. | 6,070,003 A | 5/2000 | Gove et al. |
| 5,939,949 A | 8/1999 | Olgaard et al. | 6,072,803 A | 6/2000 | Allmond et al. |
| 5,941,991 A | 8/1999 | Kageshima | 6,075,941 A | 6/2000 | Itoh et al. |
| 5,942,733 A | 8/1999 | Allen et al. | 6,079,985 A | 6/2000 | Wohl et al. |
| 5,943,052 A | 8/1999 | Allen et al. | 6,081,140 A | 6/2000 | King |
| 5,945,878 A | 8/1999 | Westwick et al. | 6,094,730 A | 7/2000 | Lopez et al. |
| 5,949,632 A | 9/1999 | Barreras, Sr. et al. | 6,097,211 A | 8/2000 | Couts-Martin et al. |
| 5,952,888 A | 9/1999 | Scott | 6,097,432 A | 8/2000 | Mead et al. |
| 5,956,279 A | 9/1999 | Mo et al. | 6,101,457 A | 8/2000 | Barch et al. |
| 5,959,871 A | 9/1999 | Pierzchala et al. | 6,101,617 A | 8/2000 | Burckhartt et al. |
| 5,963,075 A | 10/1999 | Hiiragizawa | 6,104,217 A | 8/2000 | Magana |
| 5,963,105 A | 10/1999 | Nguyen | 6,104,325 A | 8/2000 | Liaw et al. |
| 5,963,503 A | 10/1999 | Lee | 6,107,769 A | 8/2000 | Saylor et al. |

| | | | |
|---|---|---|---|
| 6,107,826 A | 8/2000 | Young et al. | |
| 6,107,882 A | 8/2000 | Gabara et al. | |
| 6,110,223 A | 8/2000 | Southgate et al. | |
| 6,111,431 A | 8/2000 | Estrada | |
| 6,112,264 A | 8/2000 | Beasley et al. | |
| 6,121,791 A | 9/2000 | Abbott | |
| 6,121,805 A | 9/2000 | Thamsirianunt et al. | |
| 6,121,965 A | 9/2000 | Kenney et al. | |
| 6,125,416 A | 9/2000 | Warren | |
| 6,130,548 A | 10/2000 | Koifman | |
| 6,130,551 A | 10/2000 | Agrawal et al. | |
| 6,130,552 A | 10/2000 | Jefferson et al. | |
| 6,133,773 A | 10/2000 | Garlepp et al. | |
| 6,134,181 A | 10/2000 | Landry | |
| 6,134,516 A | 10/2000 | Wang et al. | |
| 6,137,308 A | 10/2000 | Nayak | |
| 6,140,853 A | 10/2000 | Lo | |
| 6,141,376 A | 10/2000 | Shaw | |
| 6,141,764 A | 10/2000 | Ezell | |
| 6,144,327 A | 11/2000 | Distinti et al. | |
| 6,148,104 A | 11/2000 | Wang et al. | |
| 6,148,441 A | 11/2000 | Woodward | |
| 6,149,299 A | 11/2000 | Aslan et al. | |
| 6,150,866 A | 11/2000 | Eto et al. | |
| 6,154,064 A | 11/2000 | Proebsting | |
| 6,157,024 A | 12/2000 | Chapdelaine et al. | |
| 6,157,270 A | 12/2000 | Tso | |
| 6,161,199 A | 12/2000 | Szeto et al. | |
| 6,166,367 A | 12/2000 | Cho | |
| 6,166,960 A | 12/2000 | Marneweck et al. | |
| 6,167,077 A | 12/2000 | Ducaroir | |
| 6,167,364 A | 12/2000 | Stellenberg et al. | |
| 6,167,559 A | 12/2000 | Furtek et al. | |
| 6,172,428 B1 | 1/2001 | Jordan | |
| 6,172,571 B1 | 1/2001 | Moyal | |
| 6,173,419 B1 * | 1/2001 | Barnett | 714/28 |
| 6,175,914 B1 | 1/2001 | Mann | |
| 6,175,949 B1 | 1/2001 | Gristede et al. | |
| 6,181,163 B1 | 1/2001 | Agrawal et al. | |
| 6,183,131 B1 | 2/2001 | Holloway et al. | |
| 6,185,127 B1 | 2/2001 | Myers et al. | |
| 6,185,450 B1 | 2/2001 | Seguine et al. | |
| 6,185,522 B1 | 2/2001 | Bakker | |
| 6,185,703 B1 | 2/2001 | Guddat et al. | |
| 6,185,732 B1 | 2/2001 | Mann et al. | |
| 6,188,228 B1 | 2/2001 | Philipp | |
| 6,188,241 B1 | 2/2001 | Gauthier et al. | |
| 6,188,381 B1 | 2/2001 | van der Wal et al. | |
| 6,188,391 B1 | 2/2001 | Seely et al. | |
| 6,188,975 B1 | 2/2001 | Gay | |
| 6,191,603 B1 | 2/2001 | Muradali et al. | |
| 6,191,660 B1 | 2/2001 | Mar et al. | |
| 6,191,998 B1 | 2/2001 | Reddy et al. | |
| 6,192,431 B1 | 2/2001 | Dabral et al. | |
| 6,198,303 B1 | 3/2001 | Rangasayee | |
| 6,201,407 B1 | 3/2001 | Kapusta et al. | |
| 6,201,829 B1 | 3/2001 | Schneider | |
| 6,202,044 B1 * | 3/2001 | Tzori | 703/28 |
| 6,204,687 B1 | 3/2001 | Schultz et al. | |
| 6,205,574 B1 | 3/2001 | Dellinger et al. | |
| 6,208,572 B1 | 3/2001 | Adams et al. | |
| 6,211,708 B1 | 4/2001 | Klemmer | |
| 6,211,715 B1 | 4/2001 | Terauchi | |
| 6,211,741 B1 | 4/2001 | Dalmia | |
| 6,215,352 B1 | 4/2001 | Sudo | |
| 6,216,254 B1 | 4/2001 | Pesce et al. | |
| 6,219,729 B1 | 4/2001 | Keats et al. | |
| 6,222,528 B1 | 4/2001 | Gerpheide et al. | |
| 6,223,144 B1 | 4/2001 | Barnett et al. | |
| 6,223,147 B1 | 4/2001 | Bowers | |
| 6,223,272 B1 | 4/2001 | Coehlo et al. | |
| RE37,195 E | 5/2001 | Kean | |
| 6,225,866 B1 | 5/2001 | Kubota et al. | |
| 6,236,242 B1 | 5/2001 | Hedberg | |
| 6,236,275 B1 | 5/2001 | Dent | |
| 6,236,278 B1 | 5/2001 | Olgaard | |
| 6,236,593 B1 | 5/2001 | Hong et al. | |
| 6,239,389 B1 | 5/2001 | Allen et al. | |
| 6,239,798 B1 | 5/2001 | Ludolph et al. | |
| 6,240,375 B1 | 5/2001 | Sonoda | |
| 6,246,258 B1 | 6/2001 | Lesea | |
| 6,246,410 B1 | 6/2001 | Bergeron et al. | |
| 6,249,167 B1 | 6/2001 | Oguchi et al. | |
| 6,249,447 B1 | 6/2001 | Boylan et al. | |
| 6,253,250 B1 | 6/2001 | Evans et al. | |
| 6,262,717 B1 | 7/2001 | Donohue et al. | |
| 6,263,302 B1 | 7/2001 | Hellestrand et al. | |
| 6,263,339 B1 | 7/2001 | Hirsch | |
| 6,263,484 B1 | 7/2001 | Yang | |
| 6,271,679 B1 | 8/2001 | McClintock et al. | |
| 6,272,646 B1 | 8/2001 | Rangasayee | |
| 6,275,117 B1 | 8/2001 | Abugharbieh et al. | |
| 6,278,568 B1 | 8/2001 | Cloke et al. | |
| 6,280,391 B1 | 8/2001 | Olson et al. | |
| 6,281,753 B1 | 8/2001 | Corsi et al. | |
| 6,282,547 B1 | 8/2001 | Hirsch | |
| 6,282,551 B1 | 8/2001 | Anderson et al. | |
| 6,286,127 B1 | 9/2001 | King et al. | |
| 6,288,707 B1 | 9/2001 | Philipp | |
| 6,289,300 B1 | 9/2001 | Brannick et al. | |
| 6,289,478 B1 | 9/2001 | Kitagaki | |
| 6,289,489 B1 | 9/2001 | Bold et al. | |
| 6,292,028 B1 | 9/2001 | Tomita | |
| 6,294,932 B1 | 9/2001 | Watarai | |
| 6,294,962 B1 | 9/2001 | Mar | |
| 6,298,320 B1 | 10/2001 | Buckmaster et al. | |
| 6,304,014 B1 | 10/2001 | England et al. | |
| 6,304,101 B1 | 10/2001 | Nishihara | |
| 6,304,790 B1 | 10/2001 | Nakamura et al. | |
| 6,307,413 B1 | 10/2001 | Dalmia et al. | |
| 6,310,521 B1 | 10/2001 | Dalmia | |
| 6,310,611 B1 | 10/2001 | Caldwell | |
| 6,311,149 B1 | 10/2001 | Ryan et al. | |
| 6,314,530 B1 * | 11/2001 | Mann | 714/38 |
| 6,320,184 B1 | 11/2001 | Winklhofer et al. | |
| 6,320,282 B1 | 11/2001 | Caldwell | |
| 6,321,369 B1 | 11/2001 | Heile et al. | |
| 6,323,846 B1 | 11/2001 | Westerman et al. | |
| 6,324,628 B1 | 11/2001 | Chan | |
| 6,326,859 B1 | 12/2001 | Goldman et al. | |
| 6,332,137 B1 | 12/2001 | Hori et al. | |
| 6,332,201 B1 | 12/2001 | Chin et al. | |
| 6,337,579 B1 | 1/2002 | Mochida | |
| 6,338,109 B1 | 1/2002 | Snyder et al. | |
| 6,339,815 B1 | 1/2002 | Feng et al. | |
| 6,342,907 B1 | 1/2002 | Petty et al. | |
| 6,345,383 B1 | 2/2002 | Ueki | |
| 6,347,395 B1 | 2/2002 | Payne et al. | |
| 6,351,789 B1 | 2/2002 | Green | |
| 6,353,452 B1 | 3/2002 | Hamada et al. | |
| 6,355,980 B1 | 3/2002 | Callahan | |
| 6,356,862 B2 | 3/2002 | Bailey | |
| 6,356,958 B1 | 3/2002 | Lin | |
| 6,356,960 B1 | 3/2002 | Jones et al. | |
| 6,359,950 B2 | 3/2002 | Gossmann et al. | |
| 6,362,697 B1 | 3/2002 | Pulvirenti | |
| 6,366,174 B1 | 4/2002 | Berry et al. | |
| 6,366,300 B1 | 4/2002 | Ohara et al. | |
| 6,366,874 B1 | 4/2002 | Lee et al. | |
| 6,366,878 B1 | 4/2002 | Grunert | |
| 6,369,660 B1 | 4/2002 | Wei | |
| 6,371,878 B1 | 4/2002 | Bowen | |
| 6,373,954 B1 | 4/2002 | Malcolm et al. | |
| 6,374,370 B1 | 4/2002 | Bockhaus et al. | |
| 6,377,009 B1 | 4/2002 | Philipp | |
| 6,377,575 B1 | 4/2002 | Mullaney et al. | |
| 6,377,646 B1 | 4/2002 | Sha | |
| 6,380,811 B1 | 4/2002 | Zarubinsky et al. | |
| 6,380,929 B1 | 4/2002 | Platt | |
| 6,380,931 B1 | 4/2002 | Gillespie et al. | |
| 6,384,947 B1 | 5/2002 | Ackerman et al. | |
| 6,385,742 B1 | 5/2002 | Kirsch et al. | |
| 6,388,109 B1 | 5/2002 | Schwarz et al. | |
| 6,388,464 B1 | 5/2002 | Lacey et al. | |
| 6,396,302 B2 | 5/2002 | New et al. | |
| 6,397,232 B1 | 5/2002 | Cheng-Hung et al. | |
| 6,401,230 B1 | 6/2002 | Ahanessians et al. | |
| 6,404,204 B1 | 6/2002 | Farruggia et al. | |

| Patent | Type | Date | Inventor |
|---|---|---|---|
| 6,404,445 | B1 | 6/2002 | Galea et al. |
| 6,407,953 | B1 | 6/2002 | Cleeves |
| 6,408,432 | B1 | 6/2002 | Herrmann et al. |
| 6,411,665 | B1 | 6/2002 | Chan et al. |
| 6,411,974 | B1 | 6/2002 | Graham et al. |
| 6,414,671 | B1 | 7/2002 | Gillespie et al. |
| 6,421,698 | B1 | 7/2002 | Hong |
| 6,421,817 | B1 | 7/2002 | Mohan et al. |
| 6,425,109 | B1 | 7/2002 | Choukalos et al. |
| 6,429,882 | B1 | 8/2002 | Abdelnur et al. |
| 6,430,305 | B1 | 8/2002 | Decker |
| 6,433,645 | B1 | 8/2002 | Mann et al. |
| 6,434,187 | B1 | 8/2002 | Beard |
| 6,437,805 | B1 | 8/2002 | Sojoodi et al. |
| 6,438,565 | B1 | 8/2002 | Ammirato et al. |
| 6,438,735 | B1 | 8/2002 | McElvain et al. |
| 6,438,738 | B1 | 8/2002 | Elayda |
| 6,441,073 | B1 | 8/2002 | Tanaka et al. |
| 6,445,211 | B1 | 9/2002 | Saripella |
| 6,449,628 | B1 | 9/2002 | Wasson |
| 6,449,755 | B1 | 9/2002 | Beausang et al. |
| 6,449,761 | B1 | 9/2002 | Greidinger et al. |
| 6,452,437 | B1 | 9/2002 | Takeuchi et al. |
| 6,452,514 | B1 | 9/2002 | Philipp |
| 6,453,175 | B2 | 9/2002 | Mizell et al. |
| 6,453,461 | B1 | 9/2002 | Chaiken |
| 6,456,304 | B1 | 9/2002 | Angiulo et al. |
| 6,457,355 | B1 | 10/2002 | Philipp |
| 6,457,479 | B1 | 10/2002 | Zhuang et al. |
| 6,460,172 | B1 | 10/2002 | Insenser Farre et al. |
| 6,463,488 | B1 | 10/2002 | San Juan |
| 6,466,036 | B1 | 10/2002 | Philipp |
| 6,466,078 | B1 | 10/2002 | Stiff |
| 6,466,898 | B1 | 10/2002 | Chan |
| 6,473,069 | B1 | 10/2002 | Gerpheide |
| 6,473,825 | B1 | 10/2002 | Worley et al. |
| 483,343 | A1 | 11/2002 | Faith at el. |
| 6,477,691 | B1 | 11/2002 | Bergamash et al. |
| 6,480,921 | B1 | 11/2002 | Mansoorian et al. |
| 6,487,700 | B1 | 11/2002 | Fukushima |
| 6,489,899 | B1 | 12/2002 | Ely et al. |
| 6,490,213 | B1 | 12/2002 | Mu et al. |
| 6,492,834 | B1 | 12/2002 | Lytle et al. |
| 6,496,969 | B2 | 12/2002 | Roy et al. |
| 6,496,971 | B1 | 12/2002 | Lesea et al. |
| 6,498,720 | B2 | 12/2002 | Glad |
| 6,499,134 | B1 | 12/2002 | Buffet et al. |
| 6,499,359 | B1 | 12/2002 | Washeleski et al. |
| 6,504,403 | B2 | 1/2003 | Bangs et al. |
| 6,507,214 | B1 | 1/2003 | Snyder |
| 6,507,215 | B1 | 1/2003 | Piasecki et al. |
| 6,507,857 | B1 | 1/2003 | Yalcinalp |
| 6,509,758 | B2 | 1/2003 | Piasecki et al. |
| 6,512,395 | B1 | 1/2003 | Lacey et al. |
| 6,516,428 | B2 | 2/2003 | Wenzel et al. |
| 6,522,128 | B1 | 2/2003 | Ely et al. |
| 6,523,416 | B2 | 2/2003 | Takagi et al. |
| 6,525,593 | B1 | 2/2003 | Mar |
| 6,526,556 | B1 | 2/2003 | Stoica et al. |
| 6,529,791 | B1 | 3/2003 | Takagi |
| 6,530,065 | B1 | 3/2003 | McDonald et al. |
| 6,534,970 | B1 | 3/2003 | Ely et al. |
| 6,535,061 | B2 | 3/2003 | Darmawaskita et al. |
| 6,535,200 | B2 | 3/2003 | Philipp |
| 6,535,946 | B1 | 3/2003 | Bryant et al. |
| 6,536,028 | B1 | 3/2003 | Katsioulas et al. |
| 6,539,534 | B1 | 3/2003 | Bennett |
| 6,542,025 | B1 | 4/2003 | Kutz et al. |
| 6,542,844 | B1 | 4/2003 | Hanna |
| 6,542,845 | B1 | 4/2003 | Grucci et al. |
| 6,546,297 | B1 | 4/2003 | Gaston et al. |
| 6,552,933 | B2 | 4/2003 | Roohparvar |
| 6,553,057 | B1 | 4/2003 | Sha |
| 6,554,469 | B1 | 4/2003 | Thomson et al. |
| 6,556,044 | B2 | 4/2003 | Langhammer et al. |
| 6,557,164 | B1 | 4/2003 | Faustini |
| 6,559,685 | B2 | 5/2003 | Green |
| 6,560,306 | B1 | 5/2003 | Duffy |
| 6,560,699 | B1 | 5/2003 | Konkle |
| 6,563,391 | B1 | 5/2003 | Mar |
| 6,564,179 | B1 | 5/2003 | Belhaj |
| 6,566,961 | B2 | 5/2003 | Dasgupta et al. |
| 6,567,426 | B1 | 5/2003 | van Hook et al. |
| 6,567,932 | B2 | 5/2003 | Edwards et al. |
| 6,570,557 | B1 | 5/2003 | Westerman et al. |
| 6,571,331 | B2 | 5/2003 | Henry et al. |
| 6,571,373 | B1 | 5/2003 | Devins et al. |
| 6,574,590 | B1 | 6/2003 | Kershaw et al. |
| 6,574,739 | B1 | 6/2003 | Kung et al. |
| 6,575,373 | B1 | 6/2003 | Nakano |
| 6,577,258 | B2 | 6/2003 | Ruha et al. |
| 6,578,174 | B2 | 6/2003 | Zizzo |
| 6,580,329 | B2 | 6/2003 | Sander |
| 6,581,191 | B1 | 6/2003 | Schubert et al. |
| 6,587,093 | B1 | 7/2003 | Shaw et al. |
| 6,587,995 | B1 | 7/2003 | Duboc et al. |
| 6,588,004 | B1 | 7/2003 | Southgate et al. |
| 6,590,422 | B1 | 7/2003 | Dillon |
| 6,590,517 | B1 | 7/2003 | Swanson |
| 6,590,589 | B1 | 7/2003 | Sluiman et al. |
| 6,591,369 | B1 | 7/2003 | Edwards et al. |
| 6,592,626 | B1 | 7/2003 | Bauchot et al. |
| 6,594,799 | B1 | 7/2003 | Robertson et al. |
| 6,597,212 | B1 | 7/2003 | Wang et al. |
| 6,597,824 | B2 | 7/2003 | Newberg et al. |
| 6,598,178 | B1 | 7/2003 | Yee et al. |
| 6,600,346 | B1 | 7/2003 | Macaluso |
| 6,600,351 | B2 | 7/2003 | Bisanti et al. |
| 6,600,575 | B1 | 7/2003 | Kohara |
| 6,601,189 | B1 | 7/2003 | Edwards et al. |
| 6,601,236 | B1 | 7/2003 | Curtis |
| 6,603,330 | B1 | 8/2003 | Snyder |
| 6,603,348 | B1 | 8/2003 | Preuss et al. |
| 6,604,179 | B2 | 8/2003 | Volk et al. |
| 6,606,731 | B1 | 8/2003 | Baum et al. |
| 6,608,472 | B1 | 8/2003 | Kutz et al. |
| 6,610,936 | B2 | 8/2003 | Gillespie et al. |
| 6,611,220 | B1 | 8/2003 | Snyder |
| 6,611,276 | B1 | 8/2003 | Muratori et al. |
| 6,611,856 | B1 | 8/2003 | Liao et al. |
| 6,611,952 | B1 | 8/2003 | Prakash et al. |
| 6,613,098 | B1 | 9/2003 | Sorge et al. |
| 6,614,260 | B1 | 9/2003 | Welch et al. |
| 6,614,320 | B1 | 9/2003 | Sullam et al. |
| 6,614,374 | B1 | 9/2003 | Gustavsson et al. |
| 6,614,458 | B1 | 9/2003 | Lambert et al. |
| 6,615,167 | B1 | 9/2003 | Devins et al. |
| 6,617,888 | B2 | 9/2003 | Volk |
| 6,618,854 | B1 | 9/2003 | Mann |
| 6,621,356 | B2 | 9/2003 | Gotz et al. |
| 6,624,640 | B2 | 9/2003 | Lund et al. |
| 6,625,765 | B1 | 9/2003 | Krishnan |
| 6,628,163 | B2 | 9/2003 | Dathe et al. |
| 6,628,311 | B1 | 9/2003 | Fang |
| 6,631,508 | B1 | 10/2003 | Williams |
| 6,634,008 | B1 | 10/2003 | Dole |
| 6,634,009 | B1 | 10/2003 | Molson et al. |
| 6,636,096 | B2 | 10/2003 | Schaffer et al. |
| 6,636,169 | B1 | 10/2003 | Distinti et al. |
| 6,637,015 | B1 | 10/2003 | Ogami et al. |
| 6,639,586 | B2 | 10/2003 | Gerpheide |
| 6,642,857 | B1 | 11/2003 | Schediwy et al. |
| 6,643,151 | B1 | 11/2003 | Nebrigic et al. |
| 6,643,810 | B2 | 11/2003 | Whetsel |
| 6,649,924 | B1 | 11/2003 | Philipp et al. |
| 6,650,581 | B1 | 11/2003 | Hong et al. |
| 6,658,498 | B1 | 12/2003 | Carney et al. |
| 6,658,633 | B2 | 12/2003 | Devins et al. |
| 6,661,288 | B2 | 12/2003 | Morgan et al. |
| 6,661,410 | B2 | 12/2003 | Casebolt et al. |
| 6,661,724 | B1 | 12/2003 | Snyder et al. |
| 6,664,978 | B1 | 12/2003 | Kekic et al. |
| 6,664,991 | B1 | 12/2003 | Chew et al. |
| 6,667,642 | B1 | 12/2003 | Moyal |
| 6,667,740 | B2 | 12/2003 | Ely et al. |
| 6,670,852 | B1 | 12/2003 | Hauck |
| 6,671,869 | B2 | 12/2003 | Davidson et al. |
| 6,673,308 | B2 | 1/2004 | Hino et al. |

| | | |
|---|---|---|
| 6,677,814 B2 | 1/2004 | Low et al. |
| 6,677,932 B1 | 1/2004 | Westerman |
| 6,678,645 B1 | 1/2004 | Rajsuman et al. |
| 6,678,877 B1 | 1/2004 | Perry et al. |
| 6,680,632 B1 | 1/2004 | Meyers et al. |
| 6,680,731 B2 | 1/2004 | Gerpheide et al. |
| 6,681,280 B1 * | 1/2004 | Miyake et al. ............ 710/261 |
| 6,681,359 B1 | 1/2004 | Au et al. |
| 6,683,462 B2 | 1/2004 | Shimizu |
| 6,683,930 B1 | 1/2004 | Dalmia |
| 6,686,787 B2 | 2/2004 | Ling |
| 6,686,860 B2 | 2/2004 | Gulati et al. |
| 6,690,224 B1 | 2/2004 | Moore |
| 6,691,193 B1 | 2/2004 | Wang et al. |
| 6,691,301 B2 | 2/2004 | Bowen |
| 6,697,754 B1 | 2/2004 | Alexander |
| 6,701,340 B1 | 3/2004 | Gorecki |
| 6,701,487 B1 | 3/2004 | Ogami et al. |
| 6,701,508 B1 | 3/2004 | Bartz et al. |
| 6,703,961 B2 | 3/2004 | Mueck et al. |
| 6,704,381 B1 | 3/2004 | Moyal et al. |
| 6,704,879 B1 | 3/2004 | Parrish |
| 6,704,889 B2 | 3/2004 | Herrmann et al. |
| 6,704,893 B1 | 3/2004 | Bauwens et al. |
| 6,705,511 B1 | 3/2004 | Dames et al. |
| 6,711,226 B1 | 3/2004 | Williams et al. |
| 6,711,731 B2 | 3/2004 | Weiss |
| 6,713,897 B2 | 3/2004 | Caldwell |
| 6,714,066 B2 | 3/2004 | Gorecki et al. |
| 6,714,817 B2 | 3/2004 | Daynes et al. |
| 6,715,132 B1 | 3/2004 | Bartz et al. |
| 6,717,474 B2 | 4/2004 | Chen et al. |
| 6,718,294 B1 | 4/2004 | Bortfeld |
| 6,718,520 B1 | 4/2004 | Merryman et al. |
| 6,718,533 B1 | 4/2004 | Schneider et al. |
| 6,724,220 B1 | 4/2004 | Snyder et al. |
| 6,725,441 B1 | 4/2004 | Keller et al. |
| 6,728,900 B1 | 4/2004 | Meli |
| 6,728,902 B2 | 4/2004 | Kaiser et al. |
| 6,730,863 B1 | 5/2004 | Gerpheide |
| 6,731,552 B2 | 5/2004 | Perner |
| 6,732,068 B2 | 5/2004 | Sample et al. |
| 6,732,347 B1 | 5/2004 | Camilleri et al. |
| 6,738,858 B1 | 5/2004 | Fernald et al. |
| 6,744,323 B1 | 6/2004 | Moyal et al. |
| 6,745,369 B1 | 6/2004 | May et al. |
| 6,748,569 B1 | 6/2004 | Brooke et al. |
| 6,750,852 B2 | 6/2004 | Gillespie |
| 6,750,876 B1 | 6/2004 | Atsatt et al. |
| 6,750,889 B1 | 6/2004 | Livingston |
| 6,754,101 B2 | 6/2004 | Terzioglu et al. |
| 6,754,723 B2 | 6/2004 | Kato |
| 6,754,765 B1 | 6/2004 | Chang et al. |
| 6,754,849 B2 | 6/2004 | Tamura |
| 6,757,882 B2 | 6/2004 | Chen et al. |
| 6,765,407 B1 | 7/2004 | Snyder |
| 6,768,337 B2 | 7/2004 | Kohno et al. |
| 6,768,352 B1 | 7/2004 | Maher et al. |
| 6,769,622 B1 | 8/2004 | Tournemille et al. |
| 6,771,552 B2 | 8/2004 | Fujisawa |
| 6,774,644 B2 | 8/2004 | Eberlein |
| 6,781,456 B2 | 8/2004 | Pradhan |
| 6,782,068 B1 | 8/2004 | Wilson et al. |
| 6,784,821 B1 | 8/2004 | Lee |
| 6,785,881 B1 | 8/2004 | Bartz et al. |
| 6,788,116 B1 | 9/2004 | Cook et al. |
| 6,788,221 B1 | 9/2004 | Ely et al. |
| 6,788,521 B2 | 9/2004 | Nishi |
| 6,791,377 B2 | 9/2004 | Ilchmann et al. |
| 6,792,584 B1 | 9/2004 | Eneboe et al. |
| 6,798,218 B2 | 9/2004 | Kasperkovitz |
| 6,798,299 B1 | 9/2004 | Mar et al. |
| 6,799,198 B1 | 9/2004 | Huboi et al. |
| 6,806,771 B1 | 10/2004 | Hildebrant et al. |
| 6,806,782 B2 | 10/2004 | Motoyoshi et al. |
| 6,809,275 B1 | 10/2004 | Cheng et al. |
| 6,809,566 B1 | 10/2004 | Xin-LeBlanc |
| 6,810,442 B1 | 10/2004 | Lin et al. |
| 6,815,979 B2 | 11/2004 | Ooshita |
| 6,816,544 B1 | 11/2004 | Bailey et al. |
| 6,817,005 B2 | 11/2004 | Mason et al. |
| 6,819,142 B2 | 11/2004 | Viehmann et al. |
| 6,823,282 B1 | 11/2004 | Snyder |
| 6,823,497 B2 | 11/2004 | Schubert et al. |
| 6,825,689 B1 | 11/2004 | Snyder |
| 6,825,869 B2 | 11/2004 | Bang |
| 6,828,824 B2 | 12/2004 | Betz et al. |
| 6,829,727 B1 | 12/2004 | Pawloski |
| 6,834,384 B2 | 12/2004 | Fiorella, II et al. |
| 6,836,169 B2 | 12/2004 | Richmond et al. |
| 6,839,774 B1 | 1/2005 | Ahn et al. |
| 6,842,710 B1 | 1/2005 | Gehring et al. |
| 6,847,203 B1 | 1/2005 | Conti et al. |
| 6,850,117 B2 | 2/2005 | Weber et al. |
| 6,850,554 B1 | 2/2005 | Sha |
| 6,853,598 B2 | 2/2005 | Chevallier |
| 6,854,067 B1 | 2/2005 | Kutz et al. |
| 6,856,433 B2 | 2/2005 | Hatano et al. |
| 6,859,884 B1 | 2/2005 | Sullam |
| 6,862,240 B2 | 3/2005 | Burgan |
| 6,864,710 B1 | 3/2005 | Lacey et al. |
| 6,865,429 B1 | 3/2005 | Schneider et al. |
| 6,865,504 B2 | 3/2005 | Larson et al. |
| 6,868,500 B1 | 3/2005 | Kutz et al. |
| 6,871,253 B2 | 3/2005 | Greeff et al. |
| 6,871,331 B1 | 3/2005 | Bloom et al. |
| 6,873,203 B1 | 3/2005 | Latham, II et al. |
| 6,873,210 B2 | 3/2005 | Mulder et al. |
| 6,876,941 B2 | 4/2005 | Nightingale |
| 6,880,086 B2 | 4/2005 | Kidder et al. |
| 6,888,453 B2 | 5/2005 | Lutz et al. |
| 6,888,538 B2 | 5/2005 | Ely et al. |
| 6,892,310 B1 | 5/2005 | Kutz et al. |
| 6,892,322 B1 | 5/2005 | Snyder |
| 6,893,724 B2 | 5/2005 | Lin et al. |
| 6,894,928 B2 | 5/2005 | Owen |
| 6,897,390 B2 | 5/2005 | Caldwell et al. |
| 6,898,703 B1 | 5/2005 | Ogami et al. |
| 6,900,663 B1 | 5/2005 | Roper et al. |
| 6,901,014 B2 | 5/2005 | Son et al. |
| 6,901,563 B1 | 5/2005 | Ogami et al. |
| 6,903,402 B2 | 6/2005 | Miyazawa |
| 6,903,613 B1 | 6/2005 | Mitchell et al. |
| 6,904,570 B2 | 6/2005 | Foote et al. |
| 6,910,126 B1 | 6/2005 | Mar et al. |
| 6,911,857 B1 | 6/2005 | Stiff |
| 6,917,661 B1 | 7/2005 | Scott et al. |
| 6,922,821 B1 | 7/2005 | Nemecek |
| 6,924,668 B2 | 8/2005 | Muller et al. |
| 6,934,674 B1 | 8/2005 | Douezy et al. |
| 6,937,075 B2 | 8/2005 | Lim et al. |
| 6,940,356 B2 | 9/2005 | McDonald et al. |
| 6,941,336 B1 | 9/2005 | Mar |
| 6,941,538 B2 | 9/2005 | Hwang et al. |
| 6,944,018 B2 | 9/2005 | Caldwell |
| 6,949,811 B2 | 9/2005 | Miyazawa |
| 6,949,984 B2 | 9/2005 | Siniscalchi |
| 6,950,954 B1 | 9/2005 | Sullam et al. |
| 6,950,990 B2 | 9/2005 | Rajarajan et al. |
| 6,952,778 B1 | 10/2005 | Snyder |
| 6,954,511 B2 | 10/2005 | Tachimori |
| 6,954,904 B2 | 10/2005 | White |
| 6,956,419 B1 | 10/2005 | Mann et al. |
| 6,957,180 B1 | 10/2005 | Nemecek |
| 6,957,242 B1 | 10/2005 | Snyder |
| 6,961,686 B1 | 11/2005 | Kodosky et al. |
| 6,963,233 B2 | 11/2005 | Puccio et al. |
| 6,963,908 B1 | 11/2005 | Lynch et al. |
| 6,966,039 B1 | 11/2005 | Bartz et al. |
| 6,967,511 B1 | 11/2005 | Sullam |
| 6,967,960 B1 | 11/2005 | Bross et al. |
| 6,968,346 B2 | 11/2005 | Hekmatpour |
| 6,969,978 B2 | 11/2005 | Dening |
| 6,970,844 B1 | 11/2005 | Bierenbaum |
| 6,971,004 B1 | 11/2005 | Pleis et al. |
| 6,973,400 B2 | 12/2005 | Cahill-O'Brien et al. |
| 6,975,123 B1 | 12/2005 | Malang et al. |
| 6,980,060 B2 | 12/2005 | Boerstler et al. |

| Patent No. | Date | Name |
|---|---|---|
| 6,981,090 B1 | 12/2005 | Kutz et al. |
| 6,988,192 B2 | 1/2006 | Snider |
| 6,996,799 B1 | 2/2006 | Cismas et al. |
| 7,005,933 B1 | 2/2006 | Shutt |
| 7,009,444 B1 | 3/2006 | Scott |
| 7,010,773 B1 | 3/2006 | Bartz et al. |
| 7,015,735 B2 | 3/2006 | Kimura et al. |
| 7,017,145 B2 | 3/2006 | Taylor |
| 7,017,409 B2 | 3/2006 | Zielinski et al. |
| 7,020,854 B2 | 3/2006 | Killian et al. |
| 7,023,215 B2 | 4/2006 | Steenwyk |
| 7,023,257 B1 | 4/2006 | Sullam |
| 7,024,636 B2 | 4/2006 | Weed |
| 7,024,654 B2 | 4/2006 | Bersch et al. |
| 7,026,861 B2 | 4/2006 | Steenwyk |
| 7,030,513 B2 | 4/2006 | Caldwell |
| 7,030,656 B2 | 4/2006 | Lo et al. |
| 7,030,688 B2 | 4/2006 | Dosho et al. |
| 7,030,782 B2 | 4/2006 | Ely et al. |
| 7,034,603 B2 | 4/2006 | Brady et al. |
| 7,042,301 B2 | 5/2006 | Sutardja |
| 7,047,166 B2 | 5/2006 | Dancea |
| 7,055,035 B2 | 5/2006 | Allison et al. |
| 7,058,921 B1 | 6/2006 | Hwang et al. |
| 7,073,158 B2 | 7/2006 | McCubbrey |
| 7,076,420 B1 | 7/2006 | Snyder et al. |
| 7,079,166 B1 | 7/2006 | Hong |
| 7,086,014 B1 | 8/2006 | Bartz et al. |
| 7,088,166 B1 | 8/2006 | Reinschmidt et al. |
| 7,089,175 B1 | 8/2006 | Nemecek et al. |
| 7,091,713 B2 | 8/2006 | Erdelyi et al. |
| 7,092,980 B1 | 8/2006 | Mar et al. |
| 7,098,414 B2 | 8/2006 | Caldwell |
| 7,099,818 B1 | 8/2006 | Nemecek et al. |
| 7,100,133 B1 | 8/2006 | Meiyappan et al. |
| 7,103,108 B1 | 9/2006 | Beard |
| 7,109,978 B2 | 9/2006 | Gillespie et al. |
| 7,117,485 B2 | 10/2006 | Wilkinson et al. |
| 7,119,550 B2 | 10/2006 | Kitano et al. |
| 7,119,602 B2 | 10/2006 | Davis |
| 7,124,376 B2 | 10/2006 | Zaidi et al. |
| 7,127,630 B1 | 10/2006 | Snyder |
| 7,129,793 B2 | 10/2006 | Gramegna |
| 7,129,873 B2 | 10/2006 | Kawamura |
| 7,132,835 B1 | 11/2006 | Arcus |
| 7,133,140 B2 | 11/2006 | Lukacs et al. |
| 7,133,793 B2 | 11/2006 | Ely et al. |
| 7,138,841 B1 | 11/2006 | Li |
| 7,138,868 B2 | 11/2006 | Sanchez et al. |
| 7,139,530 B2 | 11/2006 | Kusbel |
| 7,141,968 B2 | 11/2006 | Hibbs et al. |
| 7,141,987 B2 | 11/2006 | Hibbs et al. |
| 7,149,316 B1 | 12/2006 | Kutz et al. |
| 7,150,002 B1 | 12/2006 | Anderson et al. |
| 7,151,528 B2 | 12/2006 | Taylor et al. |
| 7,152,027 B2 | 12/2006 | Andrade et al. |
| 7,154,294 B2 | 12/2006 | Liu et al. |
| 7,161,936 B1 | 1/2007 | Barrass et al. |
| 7,171,455 B1 | 1/2007 | Gupta et al. |
| 7,176,701 B2 | 2/2007 | Wachi et al. |
| 7,178,096 B2 | 2/2007 | Rangan et al. |
| 7,180,342 B1 | 2/2007 | Shutt et al. |
| 7,185,162 B1 | 2/2007 | Snyder |
| 7,185,321 B1 | 2/2007 | Roe et al. |
| 7,188,063 B1 | 3/2007 | Snyder |
| 7,193,901 B2 | 3/2007 | Ruby et al. |
| 7,199,783 B2 | 4/2007 | Wenstrand et al. |
| 7,200,507 B2 | 4/2007 | Chen et al. |
| 7,206,733 B1 | 4/2007 | Nemecek |
| 7,212,189 B2 | 5/2007 | Shaw et al |
| 7,221,187 B1 | 5/2007 | Snyder et al. |
| 7,227,389 B2 | 6/2007 | Gong et al. |
| 7,236,921 B1 | 6/2007 | Nemecek et al. |
| 7,250,825 B2 | 7/2007 | Wilson et al. |
| 7,256,588 B2 | 8/2007 | Howard et al. |
| 7,265,633 B1 | 9/2007 | Stiff |
| 7,266,768 B2 | 9/2007 | Ferlitsch et al. |
| 7,281,846 B2 | 10/2007 | McLeod |
| 7,282,905 B2 | 10/2007 | Chen et al. |
| 7,283,151 B2 | 10/2007 | Nihei et al. |
| 7,283,410 B2 | 10/2007 | Hsu et al. |
| 7,287,112 B1 | 10/2007 | Pleis et al. |
| 7,288,977 B2 | 10/2007 | Stanley |
| 7,290,244 B2 | 10/2007 | Peck et al. |
| 7,295,049 B1 | 11/2007 | Moyal et al. |
| 7,298,124 B1 | 11/2007 | Kan et al. |
| 7,301,835 B2 | 11/2007 | Joshi et al. |
| 7,305,510 B2 | 12/2007 | Miller |
| 7,307,485 B1 | 12/2007 | Snyder et al. |
| 7,308,608 B1 | 12/2007 | Pleis et al. |
| 7,312,616 B2 | 12/2007 | Snyder |
| 7,323,879 B2 | 1/2008 | Kuo et al. |
| 7,324,380 B2 | 1/2008 | Negut et al. |
| 7,332,976 B1 | 2/2008 | Brennan |
| 7,342,405 B2 | 3/2008 | Eldridge et al. |
| 7,358,714 B2 | 4/2008 | Watanabe et al. |
| 7,367,017 B2 | 4/2008 | Maddocks et al. |
| 7,373,437 B2 | 5/2008 | Seigneret et al. |
| 7,376,001 B2 | 5/2008 | Joshi et al. |
| 7,376,904 B2 | 5/2008 | Cifra et al. |
| 7,386,740 B2 | 6/2008 | Kutz et al. |
| 7,392,011 B1 | 6/2008 | Jacomb-Hood |
| 7,392,431 B2 * | 6/2008 | Swoboda ........................ 714/28 |
| 7,400,183 B1 | 7/2008 | Sivadasan et al. |
| 7,406,674 B1 | 7/2008 | Ogami et al. |
| 7,421,251 B2 | 9/2008 | Westwick et al. |
| 7,461,274 B2 | 12/2008 | Merkin |
| 7,466,307 B2 | 12/2008 | Trent, Jr. et al. |
| 7,542,533 B2 | 6/2009 | Jasa et al. |
| 7,554,847 B2 | 6/2009 | Lee |
| 7,616,509 B2 | 11/2009 | Qureshi et al. |
| 5,708,798 A1 | 4/2010 | Lynch et al. |
| 7,809,545 B2 | 10/2010 | Ciolfi et al. |
| 5,390,173 A1 | 5/2011 | Spinney et al. |
| 2001/0002129 A1 | 5/2001 | Zimmerman et al. |
| 2001/0010083 A1 | 7/2001 | Satoh |
| 2001/0038392 A1 | 11/2001 | Humpleman et al. |
| 2001/0043081 A1 | 11/2001 | Rees |
| 2001/0044927 A1 | 11/2001 | Karniewicz |
| 2001/0045861 A1 | 11/2001 | Bloodworth et al. |
| 2001/0047509 A1 | 11/2001 | Mason et al. |
| 2002/0010716 A1 | 1/2002 | McCartney et al. |
| 2002/0016706 A1 | 2/2002 | Cooke et al. |
| 2002/0023110 A1 | 2/2002 | Fortin et al. |
| 2002/0042696 A1 | 4/2002 | Garcia et al. |
| 2002/0052729 A1 | 5/2002 | Kyung et al. |
| 2002/0059543 A1 | 5/2002 | Cheng et al. |
| 2002/0063688 A1 | 5/2002 | Shaw et al. |
| 2002/0065646 A1 | 5/2002 | Waldie et al. |
| 2002/0068989 A1 | 6/2002 | Ebisawa et al. |
| 2002/0073119 A1 | 6/2002 | Richard |
| 2002/0073380 A1 | 6/2002 | Cooke |
| 2002/0080186 A1 | 6/2002 | Frederiksen |
| 2002/0085020 A1 | 7/2002 | Carroll, Jr. |
| 2002/0099863 A1 | 7/2002 | Comeau et al. |
| 2002/0109722 A1 | 8/2002 | Rogers et al. |
| 2002/0116168 A1 | 8/2002 | Kim |
| 2002/0121679 A1 | 9/2002 | Bazarjani et al. |
| 2002/0122060 A1 | 9/2002 | Markel |
| 2002/0129334 A1 | 9/2002 | Dane et al. |
| 2002/0133771 A1 | 9/2002 | Barnett |
| 2002/0133794 A1 | 9/2002 | Kanapathippillai et al. |
| 2002/0138516 A1 | 9/2002 | Igra |
| 2002/0144099 A1 | 10/2002 | Muro, Jr. et al. |
| 2002/0145433 A1 | 10/2002 | Morrise et al. |
| 2002/0152234 A1 | 10/2002 | Estrada et al. |
| 2002/0152449 A1 | 10/2002 | Lin |
| 2002/0156885 A1 | 10/2002 | Thakkar |
| 2002/0156998 A1 | 10/2002 | Casselman |
| 2002/0161802 A1 | 10/2002 | Gabrick et al. |
| 2002/0166100 A1 | 11/2002 | Meding |
| 2002/0174134 A1 | 11/2002 | Goykhman |
| 2002/0174411 A1 | 11/2002 | Feng et al. |
| 2002/0191029 A1 | 12/2002 | Gillespie et al. |
| 2003/0011639 A1 | 1/2003 | Webb |
| 2003/0014447 A1 | 1/2003 | White |
| 2003/0025734 A1 | 2/2003 | Boose et al. |
| 2003/0033588 A1 | 2/2003 | Alexander |

| | | | |
|---|---|---|---|
| 2003/0041235 | A1 | 2/2003 | Meyer |
| 2003/0056071 | A1 | 3/2003 | Triece et al. |
| 2003/0058469 | A1 | 3/2003 | Buis et al. |
| 2003/0061572 | A1 | 3/2003 | McClannahan et al. |
| 2003/0062889 | A1 | 4/2003 | Ely et al. |
| 2003/0066057 | A1 | 4/2003 | RuDusky |
| 2003/0080755 | A1 | 5/2003 | Kobayashi |
| 2003/0086300 | A1 | 5/2003 | Noyes et al. |
| 2003/0097640 | A1 | 5/2003 | Abrams et al. |
| 2003/0105620 | A1 | 6/2003 | Bowen |
| 2003/0126947 | A1 | 7/2003 | Margaria |
| 2003/0135842 | A1 | 7/2003 | Frey et al. |
| 2003/0149961 | A1 | 8/2003 | Kawai et al. |
| 2003/0229482 | A1 | 12/2003 | Cook et al. |
| 2004/0018711 | A1 | 1/2004 | Madurawe |
| 2004/0054821 | A1 | 3/2004 | Warren et al. |
| 2004/0153802 | A1 | 8/2004 | Kudo et al. |
| 2004/0205553 | A1 | 10/2004 | Hall et al. |
| 2004/0205617 | A1 | 10/2004 | Light |
| 2004/0205695 | A1 | 10/2004 | Fletcher |
| 2005/0024341 | A1 | 2/2005 | Gillespie et al. |
| 2005/0066152 | A1 | 3/2005 | Garey |
| 2005/0143968 | A9 | 6/2005 | Odom et al. |
| 2005/0240917 | A1 | 10/2005 | Wu |
| 2005/0248534 | A1 | 11/2005 | Kehlstadt |
| 2005/0280453 | A1 | 12/2005 | Hsieh |
| 2006/0015862 | A1 | 1/2006 | Odom et al. |
| 2006/0031768 | A1 | 2/2006 | Shah et al. |
| 2006/0032680 | A1 | 2/2006 | Elias et al. |
| 2006/0097991 | A1 | 5/2006 | Hotelling et al. |
| 2006/0273804 | A1 | 12/2006 | Delorme et al. |
| 2007/0139074 | A1 | 6/2007 | Reblewski |
| 2007/0258458 | A1 | 11/2007 | Kapoor |
| 2008/0086668 | A1 | 4/2008 | Jefferson et al. |
| 2008/0095213 | A1 | 4/2008 | Lin et al. |
| 2008/0186052 | A1 | 8/2008 | Needham et al. |
| 2008/0259998 | A1 | 10/2008 | Venkataraman et al. |
| 2008/0294806 | A1 | 11/2008 | Swindle et al. |
| 2009/0066427 | A1 | 3/2009 | Brennan |
| 2009/0322305 | A1 | 12/2009 | De Cremoux |

FOREIGN PATENT DOCUMENTS

| | | |
|---|---|---|
| EP | 0308583A2 A1 | 3/1989 |
| EP | 368398 A1 | 5/1990 |
| EP | 0450863 A1 | 10/1991 |
| EP | 0450863 A2 | 10/1991 |
| EP | 0499383A2 A1 | 8/1992 |
| EP | 0639816A2 A1 | 2/1995 |
| EP | 01170671 A1 | 1/2002 |
| EP | 1205848 A1 | 5/2002 |
| EP | 9 423A2 A1 | 2/2003 |
| JP | 404083405 A1 | 3/1992 |
| JP | 405055842 A1 | 3/1993 |
| JP | 06021732 A1 | 1/1994 |
| JP | 404095408 A1 | 3/2002 |
| WO | 9532478 A1 | 11/1995 |
| WO | 9532481 A1 | 11/1995 |
| WO | PCT/US96/17305 A1 | 6/1996 |
| WO | PCT/US98/34376 A1 | 8/1998 |
| WO | PCT/US99/09712 A1 | 2/1999 |

OTHER PUBLICATIONS

Anonymous, F/Port: Fast Parallel Port for the PC: Installation Manual: Release 7.1, circa 1997, available for download from http://www.fapo.com/fport.htm.

Anonymous, "Warp Nine Engineering—The IEEE 1284 Experts-F/Port Product Sheet, " undated web page found at http://www.fapo.com/fport.htm, Apr. 12, 2005.

Bursky, "FPGA Combines Multiple Interfaces and Logic," Electronic Design, vol. 48 No. 20, pp. 74-78 (Oct. 2, 2000).

"Webster's Third New International Dictionary", 1966, G. & C. Merriam Company pp. 1328-1329.

Five unnumbered pages from the Provisional U.S. Appl. No. 60/243,708, Oct. 26, 2000.

Ganapathy, Gopi, and Narayan, Ram, and Jorden, Glen, and Fernandez, Denzil, and Wang, Ming, and Nishimura, Jim; "Hardware Emulation for Functional Verification of K5", Jun. 1996, 33rd Design Automation Conference Proceedings, Jun. 3-7, 1996, pp. 315-318.

Hintz et al.; "Microcontrollers", 1992, McGraw-Hill, pp. 29-37.

Ito, Sergio Akira and Carro, Luigi; "A Comparison of Microcontrollers Targeted to FPGA-Based Embedded Applications", Sep. 2000, Proceedings of 13th Symposium on Integrated Circuits and Systems Design, Sep. 18-24, 2000, pp. 397-402.

Julio Faura et al.; "A Novel Mixed Signal Programmable Device With On-Chip Microprocessor", 1997, IEEE 1997 Custom Integrated Circuits Conference, pp. 103-568.

Monte Mar, Bert Sullam, Eric Blom; "An architecture for a configurable Mixed-signal device", 2003, IEEE Journal of Solid-State Circuits, vol. 3, pp. 565-568.

Robinson, Gordon D; "Why 1149.1 (JTAG) Realy Works", May 1994, Conference Proceedings Electro194 International, May 10-12, 1994, Combined Volumes, pp. 749-754.

Walters, Stephen; "Computer-Aided Prototyping for ASIC-Based Systems", 1991, IEEE Design & Test of Computers; vol. 8, Issue 2, pp. 4-10.

USPTO Non-Final Rejection Dated Mar. 2, 2006 for U.S. Appl. No. 10/001,477.

USPTO Final Rejection Dated Feb. 13, 2006 for U.S. Appl. No. 09/994,600.

USPTO Final Rejection Dated May 4, 2005 for U.S. Appl. No. 09/994,600.

USPTO Final Rejection Dated Oct. 17, 2007 for U.S. Appl. No. 09/994,600.

USPTO Final Rejection Dated Dec. 8, 2006 for U.S. Appl. No. 09/994,600.

USPTO Notice of Improper Request for RCE Dated Nov. 6, 2006 for U.S. Appl. No. 09/994,600.

USPTO Non-Final Rejection Dated Jul. 17, 2006 for U.S. Appl. No. 09/994,600.

USPTO Non-Final Rejection Dated May 15, 2007 for U.S. Appl. No. 09/994,600.

USPTO Non-Final Rejection Dated Aug. 23, 2005 for U.S. Appl. No. 09/994,600.

USPTO Non-Final Rejection Dated Oct. 21, 2004 for U.S. Appl. No. 09/994,600.

USPTO Non-Final Rejection Dated May 14, 2008 for U.S. Appl. No. 09/994,600.

USPTO Non-Final Rejection Dated Nov. 12, 2008 for U.S. Appl. No. 09/994,600.

USPTO Final Rejection Dated Jun. 30, 2008 for U.S. Appl. No. 10/001,477.

USPTO Final Rejection Dated Jul. 23, 2007 for U.S. Appl. No. 10/001,477.

USPTO Final Rejection Dated Aug. 24, 2006 for U.S. Appl. No. 10/001,477.

USPTO Final Rejection Dated Oct. 24, 2005 for U.S. Appl. No. 10/001,477.

USPTO Non-Final Rejection Dated Jan. 22, 2007 for U.S. Appl. No. 10/001,477.

USPTO Non-Final Office Action Dated May 11, 2005 for U.S. Appl. No. 10/001,477.

USPTO Non-Final Office Action Dated Dec. 6, 2007 for U.S. Appl. No. 10/001,477.

USPTO Notice of Allowance Dated Nov. 10, 2008 for U.S. Appl. No. 10/001,477.

USPTO Final Office Action Dated Feb. 6, 2008 for U.S. Appl. No. 10/002,217.

USPTO Final Office Action Dated Mar. 7, 2007 for U.S. Appl. No. 10/002,217.

USPTO Final Office Action Dated Nov. 17, 2005 for U.S. Appl. No. 10/002,217.

USPTO Non-Final Office Action Dated Apr. 3, 2006 for U.S. Appl. No. 10/002,217.

USPTO Non-Final Office Action Dated May 19, 2005 for U.S. Appl. No. 10/002,217.

USPTO Non-Final Office Action Dated Aug. 3, 2007 for U.S. Appl. No. 10/002,217.

USPTO Non-Final Office Action Dated Oct. 2, 2006 for U.S. Appl. No. 10/002,217.

USPTO Notice of Allowance Dated Jun. 6, 2008 for U.S. Appl. No. 10/002,217.

USPTO Notice of Allowance Dated Oct. 14, 2008 for U.S. Appl. No. 10/002,217.
USPTO Final Office Action Dated Jan. 30, 2008 for U.S. Appl. No. 09/989,777.
USPTO Final Office Action Dated Mar. 13, 2007 for U.S. Appl. No. 09/989,777.
USPTO Final Office Action Dated Dec. 21, 2005 for U.S. Appl. No. 09/989,777.
USPTO Non-Final Office Action Dated Apr. 11, 2006 for U.S. Appl. No. 09/989,777.
USPTO Non-Final Office Action Dated Jul. 5, 2005 for U.S. Appl. No. 09/989,777.
USPTO Non-Final Office Action Dated Sep. 11, 2007 for U.S. Appl. No. 09/989,777.
USPTO Non-Final Office Action Dated Sep. 13, 2006 for U.S. Appl. No. 09/989,777.
USPTO Advisory Action Dated May 23, 2006 for U.S. Appl. No. 09/994,601.
USPTO Final Rejection Dated Mar. 8, 2006 for U.S. Appl. No. 09/994,601.
USPTO Final Rejection Dated Mar. 24, 2005 for U.S. Appl. No. 09/994,601.
USPTO Final Rejection Dated Apr. 17, 2008 for U.S. Appl. No. 09/994,601.
USPTO Final Rejection Dated May 18, 2007 for U.S. Appl. No. 09/994,601.
USPTO Non-Final Rejection Dated Jul. 29, 2004 for U.S. Appl. No. 09/994,601.
USPTO Notice of Allowance Dated Jul. 7, 2008 for U.S. Appl. No. 09/989,777.
USPTO Notice of Allowance Dated Sep. 15, 2008 for U.S. Appl. No. 09/989,777.
USPTO Notice of Allowance Dated Nov. 4, 2008 for U.S. Appl. No. 09/989,777.
USPTO Ex Parte Qualyle Dated Jun. 18, 2007 for U.S. Appl. No. 09/992,076.
USPTO Final Rejection Dated Jan. 30, 2007 for U.S. Appl. No. 09/992,076.
USPTO Final Rejection Dated Mar. 17, 2006 for U.S. Appl. No. 09/992,076.
USPTO Non-Final Rejection Dated Jun. 1, 2005 for U.S. Appl. No. 09/992,076.
USPTO Non-Final Rejection Dated Aug. 10, 2006 for U.S. Appl. No. 09/992,076.
USPTO Non-Final Rejection Dated Nov. 21, 2005 for U.S. Appl. No. 09/992,076.
USPTO Notice of Allowance Dated Mar. 26, 2008 for U.S. Appl. No. 09/992,076.
USPTO Notice of Allowance Dated Jul. 29, 2008 for U.S. Appl. No. 09/992,076.
USPTO Notice of Allowance Dated Nov. 13, 2008 for U.S. Appl. No. 09/992,076.
USPTO Notice of Allowance Dated Nov. 29, 2007 for U.S. Appl. No. 09/992,076.
USPTO Non-Final Rejection Dated Sep. 21, 2005 for U.S. Appl. No. 09/994,601.
USPTO Non-Final Rejection Dated Oct. 4, 2007 for U.S. Appl. No. 09/994,601.
USPTO Non-Final Rejection Dated Nov. 14, 2006 for U.S. Appl. No. 09/994,601.
USPTO Notice of Allowance Dated Dec. 22, 2008 for U.S. Appl. No. 09/994,601.
USPTO Advisory Action Dated May 15, 2006 for U.S. Appl. No. 09/989,778.
USPTO Final Rejection Dated Jan. 8, 2009 for U.S. Appl. No. 09/989,778.
USPTO Final Rejection Dated Feb. 5, 2007 for U.S. Appl. No. 09/989,778.
USPTO Final Rejection Dated Feb. 15, 2006 for U.S. Appl. No. 09/989,778.
USPTO Final Rejection Dated Dec. 20, 2007 for U.S. Appl. No. 09/989,778.
USPTO Non-Final Rejection Dated Mar. 29, 2005 for U.S. Appl. No. 09/989,778.
USPTO Non-Final Rejection Dated Jul. 14, 2008 for U.S. Appl. No. 09/989,778.
USPTO Non-Final Rejection Dated Jul. 19, 2007 for U.S. Appl. No. 09/989,778.
USPTO Non-Final Rejection Dated Sep. 1, 2005 for U.S. Appl. No. 09/989,778.
USPTO Non-Final Rejection Dated Sep. 18, 2006 for U.S. Appl. No. 09/989,778.
USPTO Final Rejection Dated Jun. 14, 2005 for U.S. Appl. No. 09/998,848.
USPTO Final Rejection Dated Jul. 25, 2006 for U.S. Appl. No. 09/998,848.
USPTO Final Rejection Dated Aug. 10, 2007 for U.S. Appl. No. 09/998,848.
USPTO Final Rejection Dated Nov. 24, 2008 for U.S. Appl. No. 09/998,848.
USPTO Non-Final Rejection Dated Jan. 26, 2006 for U.S. Appl. No. 09/998,848.
USPTO Non-Final Rejection Dated Jan. 29, 2007 for U.S. Appl. No. 09/998,848.
USPTO Non-Final Rejection Dated Feb. 22, 2008 for U.S. Appl. No. 09/998,848.
USPTO Non-Final Rejection Dated Dec. 21, 2004 for U.S. Appl. No. 09/998,848.
USPTO Final Rejection Dated Jan. 11, 2007 for U.S. Appl. No. 09/989,767.
USPTO Final Rejection Dated Jan. 15, 2009 for U.S. Appl. No. 09/989,767.
USPTO Final Rejection Dated Mar. 6, 2006 for U.S. Appl. No. 09/989,767.
USPTO Final Rejection Dated Apr. 6, 2005 for U.S. Appl. No. 09/989,767.
USPTO Final Rejection Dated Dec. 27, 2007 for U.S. Appl. No. 09/989,767.
USPTO Non-Final Rejection Dated Jul. 17, 2006 for U.S. Appl. No. 09/989,767.
USPTO Non-Final Rejection Dated Jul. 2, 2007 for U.S. Appl. No. 09/989,767.
USPTO Non-Final Rejection Dated Jul. 24, 2008 for U.S. Appl. No. 09/989,767.
USPTO Non-Final Rejection Dated Oct. 6, 2004 for U.S. Appl. No. 09/989,767.
USPTO Final Rejection Dated Feb. 27, 2007 for U.S. Appl. No. 09/989,771.
USPTO Final Rejection Dated Mar. 28, 2006 for U.S. Appl. No. 09/989,771.
USPTO Final Rejection Dated Apr. 6, 2005 for U.S. Appl. No. 09/989,771.
USPTO Final Rejection Dated Dec. 10, 2008 for U.S. Appl. No. 09/989,771.
USPTO Final Rejection Dated Dec. 27, 2007 for U.S. Appl. No. 09/989,771.
USPTO Non-Final Rejection Dated May 28, 2008 for U.S. Appl. No. 09/989,771.
USPTO Non-Final Rejection Dated Jul. 16, 2007 for U.S. Appl. No. 09/989,771.
USPTO Non-Final Rejection Dated Aug. 23, 2006 for U.S. Appl. No. 09/989,771.
USPTO Non-Final Rejection Dated Sep. 12, 2005 for U.S. Appl. No. 09/989,771.
USPTO Non-Final Rejection Dated Sep. 22, 2004 for U.S. Appl. No. 09/989,771.
USPTO Final Rejection Dated Apr. 3, 2007 for U.S. Appl. No. 09/989,765.
USPTO Final Rejection Dated Apr. 4, 2008 for U.S. Appl. No. 09/989,765.
USPTO Final Rejection Dated Apr. 17, 2006 for U.S. Appl. No. 09/989,765.
USPTO Non-Final Rejection Dated Sep. 19, 2007 for U.S. Appl. No. 09/989,765.

USPTO Non-Final Rejection Dated Sep. 26, 2008 for U.S. Appl. No. 09/989,765.
USPTO Non-Final Rejection Dated Oct. 2, 2006 for U.S. Appl. No. 09/989,765.
USPTO Non-Final Rejection Dated Oct. 5, 2005 for U.S. Appl. No. 09/989,765.
USPTO Final Rejection Dated Jul. 9, 2008 for U.S. Appl. No. 09/989,782.
USPTO Final Rejection Dated Jul. 24, 2007 for U.S. Appl. No. 09/989,782.
USPTO Final Rejection Dated Sep. 21, 2006 for U.S. Appl. No. 09/989,782.
USPTO Final Rejection Dated Nov. 3, 2005 for U.S. Appl. No. 09/989,782.
USPTO Non-Final Rejection Dated Jan. 29, 2007 for U.S. Appl. No. 09/989,782.
USPTO Non-Final Rejection Dated Mar. 28, 2006 for U.S. Appl. No. 09/989,782.
USPTO Non-Final Rejection Dated Apr. 29, 2005 for U.S. Appl. No. 09/989,782.
USPTO Non-Final Rejection Dated Oct. 6, 2004 for U.S. Appl. No. 09/989,782.
USPTO Non-Final Rejection Dated Nov. 26, 2008 for U.S. Appl. No. 09/989,782.
USPTO Non-Final Rejection Dated Dec. 14, 2007 for U.S. Appl. No. 09/989,782.
USPTO Final Rejection Dated Feb. 10, 2005 for U.S. Appl. No. 10/008,096.
USPTO Final Rejection Dated Jun. 16, 2008 for U.S. Appl. No. 10/008,096.
USPTO Final Rejection Dated Sep. 4, 2007 for U.S. Appl. No. 10/008,096.
USPTO Final Rejection Dated Oct. 13, 2006 for U.S. Appl. No. 10/008,096.
USPTO Final Rejection Dated Nov. 25, 2005 for U.S. Appl. No. 10/008,096.
USPTO Non-Final Rejection Dated Mar. 7, 2007 for U.S. Appl. No. 10/008,096.
USPTO Non-Final Rejection Dated Apr. 17, 2006 for U.S. Appl. No. 10/008,096.
USPTO Non-Final Rejection Dated Jun. 14, 2004 for U.S. Appl. No. 10/008,096.
USPTO Non-Final Rejection Dated Jun. 24, 2005 for U.S. Appl. No. 10/008,096.
USPTO Non-Final Rejection Dated Dec. 12, 2007 for U.S. Appl. No. 10/008,096.
USPTO Notice of Allowance Dated Dec. 22, 2008 for U.S. Appl. No. 10/008,096.
USPTO Final Rejection Dated Jun. 4, 2008 for U.S. Appl. No. 10/001,478.
USPTO Final Rejection Dated Sep. 5, 2006 for U.S. Appl. No. 10/001,478.
USPTO Final Rejection Dated Sep. 17, 2007 for U.S. Appl. No. 10/001,478.
USPTO Final Rejection Dated Oct. 24, 2005 for U.S. Appl. No. 10/001,478.
USPTO Non-Final Rejection Dated Jan. 30, 2008 for U.S. Appl. No. 10/001,478.
USPTO Non-Final Rejection Dated Mar. 15, 2006 for U.S. Appl. No. 10/001,478.
USPTO Non-Final Rejection Dated Apr. 2, 2007 for U.S. Appl. No. 10/001,478.
USPTO Non-Final Rejection Dated May 16, 2005 for U.S. Appl. No. 10/001,478.
USPTO Non-Final Rejection Dated Oct. 20, 2008 for U.S. Appl. No. 10/001,478.
"Pod-Wikipedia, the free encyclopedia"; retrieved on Nov. 14, 2005 from http://en.wikipedia.org/wiki/Pod, 3 pages.
"pod-defintion by dict.die.net"; retrieved on Nov. 14, 2005 from http://dict.die.net/pod; 2 pages.
"Capturing Test/Emulation and Enabling Real-Time Debugging Using FPGA for In-Circuit Emulation;" Oct. 10,2001; U.S. Appl. No. 09/975,104; Snyder; 35 pages.

"Host to FPGA Interface in an In-Circuit Emulation System;" Oct. 10, 2001; U.S. Appl. No. 09/975,105; Nemecek; 44 pages.
Anonymous; "Using Debug"; 1999; Prentice-Hall Publishing; 20 pages.
Harrison et al.; "Xilinx FPGA Design in a Group Environment Using VHDS and Synthesis Tools"; Colloquium on Digital System Design Using Synthesis Techniques; Feb. 15, 1996; 4 pages.
Microsoft Press Computer User's Dictionary; 1998; 3 pages, Multiple-user system to multisync monitor.
Sreeram Duvvuru and Siamak Arya, "Evaluation of a Branch Target Address Cache," 1995; IEEE; 8 pages.
Andrew S. Tanenbaum with contributions from James R. Goodman, "Structured Computer Organization," 1999, Prentice Hall, Fourth Edition; 32 pages.
"Method for Beaking Executon of a Test Code in DUT and Emulaor Chip Essentaly Simutaneousy and Handling Complex Breakpoint Events;" Oct. 10, 2001; U.S. Appl. No. 09/975,338; Nemecek et al.; 34 pages.
"Emulator Chip-Board Architecture for Interface;" Oct. 10, 2001; U.S. Appl. No. 09/975,030; Snyder et al.; 37 pages.
Wikipedia—Main Page, retrieved on Mar. 8, 2006 from http://en.wikipedia.org/wiki/Main_Page and http://en.wikipedia.org/wiki/Wikipedia:Introduction; 5 pages
Wikipedia—Processor register, retrieved on Mar. 7, 2006 from http://en.wikipedia.org/wiki/Processor_register; 4 pages.
Dahl, et al.; "Emulation of the Sparcle Microprocessor with the MIT Virtual Wires Emulation System"; 1994; IEEE; 9 pages.
Bauer et al.; "A Reconfigurable Logic Machine for Fast Event-Driven Simulation"; 1998; Design Automation Conference Proceedings; 8 pages.
"PSoC designer: Integrated development environment, getting started 25-minute tutorial, version 1.0", Cypress Microsystems., Cypress Microsystems, Inc. CMS10006A, Jul. 3, 2001; 25 pages.
"PSoC technology complete changes 8-bit MCU system design", Cypress Microsystems, Inc. retrieved from <http>://www.archive.org/web/20010219005250/http://cypressmicro.com- /t...>, Feb. 19, 2001; 21 pages.
Hsieh et al., "Modeling Micro-Controller Peripherals for High-Level Co-Simulation and Synthesis," IEEE, 1997; 4 pages.
Specks et al., "A Mixed Digital-Analog 16B Microcontroller with 0.5MB Flash Memory, On-Chip Power Supply, Physical Nework Interface, and 40V I/O for Automotive Single-Chip Mechatronics," IEEE, Feb. 9, 2000; 1 page.
USPTO Notice of Allowance for U.S. Appl. No. 09/930,021 dated Nov. 26, 2004; 4 pages.
USPTO Final Rejection for U.S. Appl. No. 09/930,021 dated Aug. 31, 2004; 8 pages.
USPTO Non-Final Rejection for U.S. Appl. No. 09/930,021 dated Apr. 26, 2004; 6 pages.
USPTO Miscellaneous Action with SSP for U.S. Appl. No. 09/930,021 dated Oct. 1, 2001; 1 page.
USPTO Notice of Allowance for Application No. 09/953,423 dated Jul. 12, 2004; 6 pages.
USPTO Non-Final Rejection for U.S. Appl. No. 09/953,423 dated Feb. 6, 2004; 5 pages.
USPTO Notice of Allowance for U.S. Appl. No. 09/957,084 dated May 18, 2004; 5 pages.
USPTO Final Rejection for U.S. Appl. No. 09/957,084 dated Jan. 29, 2004; 8 pages.
USPTO Non-Final Rejection for U.S. Appl. No. 09/957,084 dated Aug. 27, 2003; 8 pages.
USPTO Final Rejection for U.S. Appl. No. 09/957,084 dated Apr. 23, 2003; 8 pages.
USPTO Non-Final Rejection for U.S. Appl. No. 09/957,084 dated Aug. 23, 2002; 6 pages.
USPTO Notice of Allowance for U.S. Appl. No. 09/969,313 dated Oct. 4, 2005; 6 pages.
USPTO Non-Final Rejection for U.S. Appl. No. 09/969,313 dated May 6, 2005; 9 pages.
USPTO Requirement for Restriction/Election for U.S. Appl. No. 09/969,313 dated Mar. 18, 2005; 6 pages.
USPTO Notice of Allowance for U.S. Appl. No. 09/969,311 dated Mar. 1, 2005; 4 pages.

USPTO Non-Final Rejection for U.S. Appl. No. 09/969,311 dated Sep. 21, 2004; 4 pages.
USPTO Advisory Action for U.S. Appl. No. 09/969,311 dated Jul. 21, 2003; 2 pages.
USPTO Final Rejection for U.S. Appl. No. 09/969,311 dated Apr. 7, 2003; 7 pages.
USPTO Non-Final Rejection for U.S. Appl. No. 09/969,311 dated Nov. 6, 2002; 8 pages.
USPTO Notice of Allowance for U.S. Appl. No. 09/972,319 dated Dec. 30, 2004; 4 pages.
USPTO Non-Final Rejection for U.S. Appl. No. 09/972,319 dated Sep. 16, 2004; 9 pages.
USPTO Notice of Allowance for U.S. Appl. No. 09/972,003 dated Jul. 14, 2004; 4 pages.
USPTO Requirement for Restriction/Election for U.S. Appl. No. 09/972,003 dated May 6, 2004; 4 pages.
USPTO Non-Final Rejection for U.S. Appl. No. 09/972,003 dated Feb. 2, 2004; 10 pages.
USPTO Non-Final Rejection for U.S. Appl. No. 09/972,003 dated Aug. 19, 2003; 11 pages.
USPTO Notice of Allowance for U.S. Appl. No. 09/972,133 dated Jun. 9, 2006; 6 pages.
USPTO Final Rejection for U.S. Appl. No. 09/972,133 dated Mar. 30, 2006; 8 pages.
USPTO Non-Final Rejection for U.S. Appl. No. 09/972,133 dated Nov. 25, 2005; 9 pages.
USPTO Advisory Action for U.S. Appl. No. 09/972,133 dated Aug. 31, 2005; 3 pages.
USPTO Final Rejection for U.S. Appl. No. 09/972,133 dated Jun. 29, 2005; 10 pages.
USPTO Non-Final Rejection for U.S. Appl. No. 09/972,133 dated Mar. 8, 2005; 9 pages.
USPTO Notice of Allowance for U.S. Appl. No. 09/975,104 dated Oct. 19, 2006; 4 pages.
USPTO Non-Final Rejection for U.S. Appl. No. 09/975,104 dated Jun. 16, 2006; 8 pages.
USPTO Final Rejection for U.S. Appl. No. 09/975,104 dated Feb. 15, 2006; 7 pages.
USPTO Non-Final Rejection for U.S. Appl. No. 09/975,104 dated Aug. 16, 2005; 6 pages.
USPTO Non-Final Rejection for U.S. Appl. No. 09/975,104 dated Mar. 21, 2005; 7 pages.
USPTO Notice of Allowance for U.S. Appl. No. 09/975,030 dated Feb. 6, 2006; 7 pages.
USPTO Non-Final Rejection for U.S. Appl. No. 09/975,030 dated Oct. 20, 2005; 7 pages.
USPTO Non-Final Rejection for U.S. Appl. No. 09/975,030 dated Mar. 29, 2005; 13 pages.
USPTO Notice of Allowance for U.S. Appl. No. 09/997,111 dated Sep. 28, 2006; 7 pages.
USPTO Notice of Allowance for U.S. Appl. No. 10/272,231 dated Mar. 8, 2004; 6 pages.
USPTO Final Rejection for U.S. Appl. No. 10/272,231 dated Nov. 5, 2003; 5 pages.
USPTO Non-Final Rejection for U.S. Appl. No. 10/272,231 dated Jul. 14, 2003; 6 pages.
USPTO Notice of Allowance for U.S. Appl. No. 11/125,554 dated Feb. 7, 2008; 4 pages.
USPTO Notice of Allowance for U.S. Appl. No. 11/125,554 dated Apr. 24, 2007; 7 pages.
USPTO Non-Final Rejection for U.S. Appl. No. 11/125,554 dated Dec. 11, 2006; 9 pages.
USPTO Notice of Allowance for U.S. Appl. No. 09/855,868 dated Apr. 25, 2005; 6 pages.
USPTO Non-Final Rejection for U.S. Appl. No. 09/855,868 dated Aug. 26, 2004; 7 pages.
USPTO Notice of Allowance for U.S. Appl. No. 09/887,923 dated Sep. 27, 2004; 5 pages.
USPTO Non-Final Rejection for U.S. Appl. No. 09/887,923 dated May 25, 2004; 7 pages.
USPTO Notice of Allowance for U.S. Appl. No. 09/875,599 dated Oct. 17, 2006; 4 pages.
USPTO Non-Final Rejection for U.S. Appl. No. 09/875,599 dated May 31, 2006; 18 pages.
USPTO Final Reject on for U.S. Appl. No. 09/875,599 dated Feb. 15, 2006; 18 pages.
USPTO Final Rejection for U.S. Appl. No. 09/875,599 dated Nov. 21, 2005; 16 pages.
USPTO Advisory Action for U.S. Appl. No. 09/875,599 dated Jun. 8, 2005; 3 pages.
USPTO Final Rejection for U.S. Appl. No. 09/875,599 dated Mar. 29, 2005; 20 pages.
USPTO Non-Final Rejection for U.S. Appl. No. 09/875,599 dated Dec. 3, 2004; 16 pages.
USPTO Final Rejection for U.S. Appl. No. 09/875,599 dated Aug. 25, 2004; 17 pages.
USPTO Final Rejection for U.S. Appl. No. 09/875,599 dated Apr. 26, 2004; 15 pages.
USPTO Non-Final Rejection for U.S. Appl. No. 09/875,599 dated Oct. 27, 2003; 13 pages.
USPTO Notice of Allowance for U.S. Appl. No. 10/004,197 dated Feb. 9, 2007; 7 pages.
USPTO Notice of Allowance for U.S. Appl. No. 10/004,197 dated Oct. 6, 2006; 7 pages.
USPTO Non-Final Rejection for U.S. Appl. No. 10/004,197 dated Apr. 3, 2006; 13 pages.
USPTO Final Rejection for U.S. Appl. No. 10/004,197 dated Nov. 23, 2005; 17 pages.
USPTO Non-Final Rejection for U.S. Appl. No. 10/004,197 dated Jun. 6, 2005; 21 pages.
USPTO Notice of Allowance for U.S. Appl. No. 10/004,039 dated Aug. 15, 2006; 7 pages.
USPTO Non-Final Rejection for U.S. Appl. No. 10/004,039 dated Apr. 11, 2006; 14 pages.
USPTO Final Rejection for U.S. Appl. No. 10/004,039 dated Nov. 22, 2005; 19 pages.
USPTO Non-Final Rejection for U.S. Appl. No. 10/004,039 dated Jun. 6, 2005; 17 pages.
USPTO Notice of Allowance for U.S. Appl. No. 10/001,568 dated Mar. 17, 2006; 9 pages.
USPTO Final Rejection for U.S. Appl. No. 10/001,568 dated Oct. 26, 2005; 16 pages.
USPTO Non-Final Rejection for U.S. Appl. No. 10/001,568 dated May 19, 2005; 16 pages.
USPTO Notice of Allowance for U.S. Appl. No. 09/887,955 dated Oct. 12, 2004; 5 pages.
USPTO Non-Final Rejection for U.S. Appl. No. 09/887,955 dated May 26, 2004; 5 pages.
USPTO Notice of Allowance for U.S. Appl. No. 09/826,397 dated Oct. 7, 2004; 8 pages.
USPTO Non-Final Rejection for U.S. Appl. No. 09/826,397 dated Apr. 21, 2004; 6 pages.
USPTO Notice of Allowance for U.S. Appl. No. 09/893,048 dated Jul. 25, 2006; 4 pages.
USPTO Non-Final Rejection for U.S. Appl. No. 09/893,048 dated Jan. 12, 2006; 6 pages.
USPTO Non-Final Rejection for U.S. Appl. No. 09/893,048 dated Jul. 27, 2005; 6 pages.
USPTO Non-Final Rejection for U.S. Appl. No. 09/893,048 dated Oct. 6, 2004; 5 pages.
USPTO Notice of Allowance for U.S. Appl. No. 09/893,050 dated Jul. 5, 2005; 6 pages.
USPTO Non-Final Rejection for U.S. Appl. No. 09/893,050 dated Jan. 5, 2005; 13 pages.
USPTO Final Rejection for U.S. Appl. No. 09/893,050 dated Aug. 30, 2004; 13 pages.
USPTO Non-Final Rejection for U.S. Appl. No. 09/893,050 dated Jan. 15, 2004; 9 pages.
USPTO Notice of Allowance for U.S. Appl. No. 09/909,047 dated May 11, 2005; 25 pages.
USPTO Notice of Allowance for U.S. Appl. No. 09/909,047 dated Feb. 15, 2005; 6 pages.
USPTO Non-Final Rejection for U.S. Appl. No. 09/909,047 dated Jul. 6, 2004; 9 pages.

USPTO Notice of Allowance for U.S. Appl. No. 09/912,768 dated Sep. 13, 2005; 5 pages.
USPTO Non-Final Rejection for U.S. Appl. No. 09/912,768 dated Apr. 11, 2005; 14 pages.
USPTO Final Rejection for U.S. Appl. No. 09/912,768 dated Nov. 17, 2004; 13 pages.
USPTO Non-Final Rejection for U.S. Appl. No. 09/912,768 dated Jun. 22, 2004; 11 pages.
USPTO Notice of Allowance for U.S. Appl. No. 09/922,579 dated Dec. 28, 2004; 6 pages.
USPTO Non-Final Rejection for U.S. Appl. No. 09/922,579 dated Aug. 18, 2004; 6 pages.
USPTO Notice of Allowance for U.S. Appl. No. 09/923,461 dated May 12, 2005; 6 pages.
USPTO Non-Final Rejection for U.S. Appl. No. 09/923,461 dated Jul. 16, 2004; 6 pages.
USPTO Notice of Allowance for U.S. Appl. No. 09/929,891 dated Dec. 23, 2005; 4 pages.
USPTO Notice of Allowance for U.S. Appl. No. 09/929,891 dated Jun. 15, 2005; 6 pages.
USPTO Non-Final Rejection for U.S. Appl. No. 09/929,891 dated Sep. 13, 2004; 6 pages.
USPTO Notice of Allowance for U.S. Appl. No. 10/011,214 dated Apr. 11, 2005; 4 pages.
USPTO Final Rejection for U.S. Appl. No. 10/011,214 dated Jan. 21, 2005; 8 pages.
USPTO Non-Final Rejection for U.S. Appl. No. 10/011,214 dated Aug. 13, 2004; 10 pages.
Hong et al., "Hierarchial System Test by an IEEE 1149.5 MTM-Bus Slave-Module Interface Core," IEEE, 2000; 14 pages.
Haberl et al., "Self Testable Boards with Standard IEEE 1149.5 Module Test and Maintenance (MTM) Bus Interface," IEEE, 1994; 6 pages.
Varma et al., "A Structured Test Re-Use Methodology for Core-Based System Chips," IEEE, 1998: 9 pages.
Andrews, "Roadmap for Extending IEEE 1149.1 for Hierarchical Control of Locally-Stored, Standardized command Set, Test Programs," IEEE, 1994; 7 pages.
Ghosh et al., "A Low Overhead Design for Testability and Test Generation Technique for Core-based Systems," IEEE, 1997; 10 pages.
Zorian, "Test Requirements for Embedded Core-based Systems and IEEE P1500," IEEE, 1997; 9 pages.
Zorian et al., "Testing Embedded-Core Based System Chips," IEEE, 1998; 14 pages.
Papachristou et al., "Microprocessor Based Testing for Core-Based System on a Chip," IEEE, 1999; 6 pages.
Maroufi et al., "Solving the I/O Bandwidth Problem in System on a Chip Testing," IEEE, 2000; 6 pages.
Marsh, "Smart Tools Illuminate Deeply Embedded Systems," EDN, 2000; 7 pages.
York et al., "On-chip Support Needed for SOC Debug," Electronic Engineering Times, 1999; 2 pages.
Atmel Corporation: AT9OSC Summary: "Secure Microcontrollers for Smart Cards," 1999; 7 pages.
Hwang et al., "Integrated circuit for automatically varying resistance in computer system, has pair of transistors connected in parallel with respective resistors such that resistors are bypassed when corresponding transistors are enabled," Derwent Information Ltd; 2002; 2 pages.
Morrison, "IBM Eyes Merchant Packaging Services," Jul. 13, 1998; Electronic News <http://www.findarticles.com>; 4 pages.
Charles, Jr. et al., "Wirebonding: Reinventing the Process for MCMs," Apr. 1998; IEEE 7th International Conference on Multichip Modules and High Density Packaging; 3 pages.
Tran et al., "Fine Pitch and Wirebonding and Reliability of Aluminum Capped Copper Bond Pads," May 2000, IEEE Electronic Components and Technology Conference; 8 pages.
Song et al., "A 50% Power Reduction Scheme for CMOS Relaxation Oscillator," IEEE, 1999; 4 pages.
"Electronic Circuit Protector-Circuit Breaker," IBM Technical Disclosure Bulletin; vol. 36, Issue 8, Aug. 1, 1993; 1 page.

USPTO Final Rejection for U.S. Appl. No. 10/001,478 dated Apr. 20, 2009; 16 pages.
USPTO Notice of Allowance for U.S. Appl. No. 09/994,600 dated Apr. 3, 2009; 5 pages
USPTO Notice of Allowance for Application No. 09/992,076 dated Feb. 27, 2009; 6 pages.
USPTO Non-Final Rejection for U.S. Appl. No. 09/989,771 dated Apr. 30, 2009; 11 pages.
USPTO Notice of Allowance for U.S. Appl. No. 09/989,762 dated Mar. 25, 2009; 7 pages.
USPTO Notice of Allowance for U.S. Appl. No. 09/989,762 dated Oct. 24, 2008; 7 pages.
USPTO Notice of Allowance for U.S. Appl. No. 09/989,762 dated Jun. 2, 2008; 6 pages.
USPTO Notice of Allowance for U.S. Appl. No. 09/989,762 dated Jan. 2, 2008: 6 pages.
USPTO Non-Final Rejection for U.S. Appl. No. 09/989,762 dated Jul. 23, 2007; 15 pages.
USPTO Final Rejection for U.S. Appl. No. 09/989,762 dated Jan. 26, 2007; 13 pages.
USPTO Non-Final Rejection for U.S. Appl. No. 09/989,762 dated Aug. 10, 2006; 18 pages.
USPTO Final Rejection for U.S. Appl. No. 09/989,762 dated Mar. 14, 2006; 19 pages.
USPTO Non-Final Rejection for U.S. Appl. No. 09/989,762 dated Jul. 27, 2005; 15 pages.
USPTO Non-Final Rejection for U.S. Appl. No. 11/644,100 dated Mar. 9, 2009; 11 pages.
USPTO Advisory Action for U.S. Appl. No. 11/644,100 dated Feb. 9, 2009; 3 pages.
USPTO Final Rejection for U.S. Appl. No. 11/644,100 dated Nov. 18, 20089; 12 pages.
USPTO Non-Final Rejection for U.S. Appl. No. 11/644,100 dated Apr. 14, 2008; 10 pages.
USPTO Notice of Allowance for U.S. Appl. No. 11/415,588 dated Mar. 11, 2008; 6 pages.
USPTO Advisory Action for U.S. Appl. No. 11/415,588 dated Jan. 14, 2008 8 pages.
USPTO Final Rejection for U.S. Appl. No. 11/415,588 dated Oct. 19, 2007; 8 pages.
USPTO Non-Final Rejection for U.S. Appl. No. 11/415,588 dated Aug. 13, 2007; 8 pages.
USPTO Notice of Allowance for U.S. Appl. No. 12/218,404 dated Mar. 19, 2009; 7 pages.
USPTO Non-Final Rejection for U.S. Appl. No. 12/218,404 dated Sep. 30, 2008; 8 pages.
USPTO Notice of Allowance for U.S. Appl. No. 11/132,894 dated Apr. 26, 2007; 4 pages.
USPTO Non-Final Rejection for U.S. Appl. No. 11/132,894 dated Dec. 19, 2006; 12 pages.
USPTO Non-Final Rejection for U.S. Appl. No. 11/322,044 dated May 4, 2009; 18 pages.
USPTO Non-Final Rejection for U.S. Appl. No. 11/322,044 dated Nov. 25, 2008; 15 pages.
USPTO Non-Final Rejection for U.S. Appl. No. 11/322,044 dated Apr. 11, 2008; 11 pages.
USPTO Advisory Action for U.S. Appl. No. 11/322,044 dated Nov. 30, 2007; 2 pages.
USPTO Final Rejection for U.S. Appl. No. 11/322,044 dated Sep. 21, 2007; 14 pages.
USPTO Non-Final Rejection for U.S. Appl. No. 11/322,044 dated Apr. 24, 2007; 13 pages.
USPTO Non-Final Rejection for U.S. Appl. No. 10/305,589 dated Feb. 4, 2005; 5 pages.
USPTO Final Rejection for U.S. Appl. No. 10/305,589 dated Oct. 21, 2004; 7 pages.
USPTO Non-Final Rejection for U.S. Appl. No. 10/305,589 dated Oct. 7, 2003; 6 pages.
Maneatis, "Low-Jitter Process-Independent DLL and PLL Based on Self-Biased Techniques," IEEE Journal of Solid-States Circuits, vol. 31, No. 11, Nov. 1996, 10 pages.

Larsson, "A 2-1600-MHz CMOS Clock Recovery PLL with Low-Vdd Capability," IEEE Journal of Solid-State Circuits, vol. 34, No. 12, Dec. 1999, 10 pages.

USPTO Notice of Allowance for U.S. Appl. No. 10/327,217 dated Aug. 12, 2004; 6 pages.

USPTO Non-Final Rejection for U.S. Appl. No. 10/327,217 dated Apr. 30, 2004; 5 pages.

USPTO Miscellaneous Action for U.S. Appl. No. 10/327,217 dated Feb. 10, 2004; 1 page.

USPTO Notice of Allowance for U.S. Appl. No. 10/871,582 dated Mar. 30, 2006; 6 pages.

USPTO Final Rejection for U.S. Appl. No. 10/871,582 dated Feb. 1, 2006; 5 pages.

USPTO Non-Final Rejection for U.S. Appl. No. 10/871,582 dated Sep. 7, 2005; 7 pages.

USPTO Notice of Allowance for U.S. Appl. No. 09/404,891 dated Aug. 12, 2004; 6 pages.

USPTO Final Rejection for U.S. Appl. No. 09/404,891 dated Dec. 8, 2004; 7 pages.

USPTO Non-Final Rejection for U.S. Appl. No. 09/404,891 dated Jun. 25, 2004; 6 pages.

USPTO Non-Final Rejection for U.S. Appl. No. 09/404,891 dated Jan. 5, 2004; 5 pages.

USPTO Non-Final Rejection for U.S. Appl. No. 09/404,891 dated Jul. 10, 2003; 6 pages.

USPTO Non-Final Rejection for U.S. Appl. No. 09/404,891 dated Mar. 5, 2003; 6 pages.

USPTO Non-Final Rejection for U.S. Appl. No. 09/404,891 dated Oct. 11, 2002; 5 pages.

USPTO Notice of Allowance for U.S. Appl. No. 10/226,911 dated Aug. 20, 2004; 4 pages.

USPTO Non-Final Rejection for U.S. Appl. No. 10/226,911 dated Mar. 19, 2004; 6 pages.

USPTO Notice of Allowance for U.S. Appl. No. 09/943,149 dated Jan. 12, 2004; 7 pages.

USPTO Non-Final Rejection for U.S. Appl. No. 09/943,149 dated Aug. 28, 2003; 9 pages.

USPTO Final Rejection for U.S. Appl. No. 09/943,149 dated May 7, 2003; 10 pages.

USPTO Non-Final Rejection for U.S. Appl. No. 09/943,149 dated Feb. 1, 2002; 7 pages.

Durham et al., "Integrated Continuous-Time Balanced Filters for 16-bit DSP Interfaces." IEEE, 1993; 6 pages.

Durham et al., "Circuit Architectures for High Linearity Monolithic Continuous-Time Filtering." IEEE, 1992; 7 pages.

Durham et al., "High-Linearity Continuous-Time Filter in 5-V VLSI CMOS," IEEE, 1992; 8 pages.

USPTO Notice of Allowance for U.S. Appl. No. 10/293,392 dated Mar. 10, 2004; 6 pages.

USPTO Non-Final Rejection for U.S. Appl. No. 10/293,392 dated Oct. 16, 2003; 6 pages.

USPTO Notice of Allowance for U.S. Appl. No. 10/288,003 dated Jan. 14, 2005; 6 pages.

USPTO Final Rejection for U.S. Appl. No. 10/288,003 dated Oct. 6, 2004; 6 pages.

USPTO Non-Final Rejection for U.S. Appl. No. 10/288,003 dated Apr. 7, 2004; 9 pages.

USPTO Advisory Action for U.S. Appl. No. 11/200,619 dated May 11, 2009; 3 pages.

USPTO Final Rejection for U.S. Appl. No. 11/200,619 dated Mar. 3, 2009; 14 pages.

USPTO Non-Final Rejection for U.S. Appl. No. 11/200,619 dated Aug. 27, 2008; 13 pages.

USPTO Notice of Allowance for U.S. Appl. No. 11/201,922 dated Apr. 9, 2009; 4 pages.

USPTO Non-Final Rejection for U.S. Appl. No. 11/201,922 dated Oct. 21, 2008; 12 pages.

USPTO Final Rejection for U.S. Appl. No. 11/201,922 dated Apr. 30, 2008; 10 pages.

USPTO Non-Final Rejection for U.S. Appl. No. 11/201,922 dated Oct. 15, 2007; 10 pages.

USPTO Non-Final Rejection for U.S. Appl. No. 11/201,627 dated Dec. 12, 2008; 17 pages.

USPTO Final Rejection for U.S. Appl. No. 11/201,627 dated Apr. 29, 2006; 21 pages.

USPTO Non-Final Rejection for U.S. Appl. No. 11/201,627 dated Nov. 16, 2007; 16 pages.

USPTO Notice of Allowance for U.S. Appl. No. 09/989,808 dated Feb. 13, 2006; 4 pages.

USPTO Non-Final Rejection for U.S. Appl. No. 09/989,808 dated Oct. 19, 2005; 8 pages.

USPTO Non-Final Rejection for U.S. Appl. No. 09/989,808 dated Apr. 14, 2005; 8 pages.

USPTO Notice of Allowance for U.S. Appl. No. 10/109,979 dated Mar. 14, 2006; 6 pages.

USPTO Non-Final Rejection for U.S. Appl. No. 10/109,979 dated Jun. 30, 2005; 6 pages.

USPTO Notice of Allowance for U.S. Appl. No. 09/989,819 dated Jan. 11, 2005; 7 pages.

USPTO Non-Final Rejection for U.S. Appl. No. 09/989,819 dated Jul. 13, 2004; 4 pages.

USPTO Miscellaneous Action for U.S. Appl. No. 09/989,819 dated Dec. 14, 2001; 1 page.

USPTO Notice of Allowance for U.S. Appl. No. 09/989,761 dated Jan. 14, 2005; 6 pages.

USPTO Final Rejection for U.S. Appl. No. 09/989,761 dated Aug. 26, 2004; 7 pages.

USPTO Non-Final Rejection for U.S. Appl. No. 09/989,761 dated Mar. 10, 2004; 6 pages.

USPTO Final Rejection for U.S. Appl. No. 09/989,761 dated Oct. 3, 2003, 7 pages.

USPTO Non-Final Rejection for U.S. Appl. No. 09/989,761 dated Apr. 18, 2003; 5 pages.

Wang, et al., "Synthesizing Operations System Based Device Drivers in Embedded Systems," 2003, ACM; 8 pages.

Lutovac et al., "Symbolic Computation of Digital Filter Transfer Function Using MATLAB," Proceedings of 23rd International Conference on Microelectronics (MIEL 2002), vol. 2 NIS, Yugoslavia; 4 pages.

Nouta et al., "Design and FPGA-Implementation of Wave Digital Bandpass Filters with Arbitrary Amplitude Transfer Characteristics," Proceedings of IEEE International Symposium on Industrial Electronics; 1998, vol. 2; 5 pages.

Xilinx, Virtex-II Pro Platform FPGA Developer's Kit, "How Data2BRAM Fits in with Hardware and Software Flows," Chapter 2: Using Data2BRAM: Jan. 2003 Release; 2 pages.

PCT Preliminary Report on Patentability (Chapter 1 of the Patent Cooperation Treaty), PCT/US2005/028793, filed Aug. 12, 2005, mailed Dec. 21, 2007; 2 pages.

PCT Written Opinion of the International Searching Authority for PCT/US2005/028793, filed Aug. 12, 2005, mailed Nov. 19, 2007; 7 pages.

PCT International Search Report of the International Searching Authority for PCT/US05/028793, filed Aug. 12, 2005, mailed Nov. 19, 2007; 5 pages.

International Search Report and Written Opinion of the International Searching Authority for PCT/US05/28898, filed Aug. 12, 2005, mailed Mar. 6, 2007; 6 pages.

PCT International Search Report for PCT/US05/28791, filed Aug. 12, 2005, mailed Mar. 31, 2008; 4 pages.

PCT International Written Opinion for PCT/US05/28791, filed Aug. 12, 2005, mailed Mar. 31, 2008; 8 pages.

"New Object Domain R3 Beta Now Available (Build 134)!" Mar. 13, 2001; <http://web.archive.org/web/200100331202605/www.obejectdomain.com/domain30/index.htmlΔ; 2 pages.

"OMG XML Metadata Interchange (XMI) Specifications" 2000, 17 pages.

Electronic Tools Company; E-Studio User Manual, 2000; retrieved from http://web.archive.org for site http://e-tools.com on Mar. 23, 2005; 77 pages.

Cover Pages Technology Reports; XML and Electronic Design Automation (EDA); Aug. 2000: retrieved from http://xml.coverpages.org on Mar. 23, 2005; 5 pages.

Microsoft Computer Dictionary "ActiveX" 2002; Microsoft Press: 5th Edition; 3 pages.

"VHDL Samples" retrieved on Jan. 29, 2007 from http://www.csee.umbc.edu/help/VHDL/samples/samples.shtml: 10 pages.

Anonymous, "Lotus Notes FAQ—How do you generate unique document numbers?" Sep. 19, 1999; retrieved from www.keysolutions.com on Jul. 9, 2008; 1 page.

Ashok Bindra, "Programmable SoC Delivers A New Level Of Systems Flexibility"; Electronics Design; Nov. 5, 2000; 11 pages.

Cypress MicroSystem, Inc. "PsoC Designer Integrated Development Environment User Guide"; Rev. 1.18; Sep. 8, 2003; 193 pages.

Hamblen, "Rapid Prototyping Using Field-Programmable Logic Devices"Jun. 2000, IEEE; 9 pages.

USPTO Final Rejection for U.S. Appl. No. 09/943,062 dated Apr. 30, 2004; 9 pages.

Snyder et al., "Xilinx's A-to-Z Systems Platform" Cahners Microprocessor, The Insiders Guide to Microprocessor Hardware, Feb. 6, 2001; 6 pages.

"PSoC Technology Completely Changes 8-bit MCU System Design" Cypress MicroSystem, Inc. Feb. 19, 2001; 24 pages.

USPTO Non-Final Rejection for U.S. Appl. No. 09/943,062 dated Dec. 8, 2003; 9 pages.

USPTO Advisory Action for U.S. Appl. No. 09/943,062 dated Sep. 25, 2003; 3 pages.

USPTO Final Rejection for U.S. Appl. No. 09/943,062 dated Jun. 27, 2003; 8 pages.

USPTO Non-Final Rejection for U.S. Appl. No. 09/943,062 dated Jan. 27, 2003; 7 pages.

USPTO Non-Final Rejection for U.S. Appl. No. 09/943,062 dated Sep. 11, 2002; 9 pages.

"PSoC Designer: Integrated Development Environment" User Guide; Revision 1.11: Last Revised Jul. 17, 2001; 109 pages.

Cypress Microsystems, "Cypress Microsystems Unveils Programmable System-on-a-Chip from Embedded Internet, Communications and Consumer Systems;" 2000, <http://www.cypressmicro.com/corporate/CY_Announces_13_2000.html>; 3 pages.

Huang et al., ICEBERG, An Embedded In-Circuit Emulator Synthesizer for Microcontrollers, Proceedings of the 36th Design, Automation Conference 1999; 6 pages.

Yoo et al., "Fast Hardware-Software Co-verification by Optimistic Execution of Real Processor;" Proceedings of Design, Automation and Test in Europe Conference and Exhibition 2000; 6 pages.

USPTO Advisory Action for U.S. Appl. No. 09/943,062 dated Mar. 27, 2008; 3 pages.

USPTO Final Rejection for U.S. Appl. No. 09/943,062 dated Jan. 18, 2008; 8 pages.

USPTO Non-Final Rejection for U.S. Appl. No. 09/943,062 dated Jun. 22, 2007; 12 pages.

USPTO Miscellaneous Action for U.S. Appl. No. 09/943,062 dated Jan. 30, 2006; 2 pages.

USPTO Notice of Allowance for U.S. Appl. No. 10/113,064 dated Sep. 21, 2006; 7 pages.

USPTO Non-Final Rejection for U.S. Appl. No. 10/113,064 dated Apr. 6, 2006; 19 pages.

USPTO Final Rejection for U.S. Appl. No. 10/113,064 dated Oct. 18, 2005; 22 pages.

USPTO Non-Final Rejection for U.S. Appl. No. 10/113,064 dated Apr. 25, 2005; 15 pages.

Kory Hopkins, "Definition;" Jan. 16, 1997; <http://www.cs.sfu.ca/cs/people/GradStudent.html>; 1 page.

Ebeling et al., "Validating VLSI Circuit Layout by Wirelist Comparison;" Sep. 1983; in proceedings of the IEEE International Conference on Computer Aided Design (ICCAD-83); 2 pages.

Ohirich et al., "Sub-Gemini: Identifying Subcircuits using a Fast Subgraph Isomorphism Algorithm;" Jun. 1993; in proceedings of the 30th IEEE/ACM Design Automation Conference; 7 pages.

U.S. Appl. No. 12/356,468: "System and Method for Dynamically Generating a Configuration Datasheet," Anderson et al.; filed on Jan. 20, 2009; 27 pages.

International Search Report from the International Search Authority for International Application No. PCT/US08/60680 dated Aug. 15, 2008; 4 pages.

USPTO Notice of Allowance for U.S. Appl. No. 09/475,879 dated Oct. 22, 2004; 7 pages.

USPTO Advisory Action for U.S. Appl. No. 09/475,879 dated Mar. 4, 2002; 3 pages.

USPTO Advisory Action for U.S. Appl. No. 09/475,879 dated Dec. 31, 2001; 3 pages.

USPTO Final Rejection for U.S. Appl. No. 09/475,879 dated Oct. 11, 2001; 10 pages.

USPTO Non-Final Rejection for U.S. Appl. No. 09/475,879 dated Mar. 8, 2001; 6 pages.

U.S. Appl. No. 09/475,879: "Programmable Logic Device," Lacey et al.; filed on Dec. 30, 1999, 50 pages.

U.S. Appl. No. 10/137,497: "Reconfigurable Testing System and Method," Pleis et al.; filed on May 1, 2002; 40 pages.

USPTO Non-Final Rejection for U.S. Appl. No. 10/137,497 dated Nov. 5, 2004, 17 pages.

USPTO Final Rejection for U.S. Appl. No. 10/137,497 dated May 5, 2005; 13 pages.

USPTO Non-Final Rejection for U.S. Appl. No. 10/137,497 dated Sep. 22, 2005; 21 pages.

USPTO Final Rejection for U.S. Appl. No. 10/137,497 dated Mar. 13, 2006; 15 pages.

USPTO Non-Final Rejection for U.S. Appl. No. 10/137,497 dated Aug. 2, 2006; 21 pages.

USPTO Notice of Allowance for U.S. Appl. No. 10/137,497 dated Jan. 24, 2007; 12 pages.

USPTO Notice of Allowance for U.S. Appl. No. 10/137,497 dated Jul. 20, 2007; 4 pages.

U.S. Appl. No. 10/653,050 "Method and System for Programming a Memory Device," Snyder et al.; filed on Aug. 29, 2003; 69 pages.

USPTO Non-Final Rejection for U.S. Appl. No. 10/653,050 dated Apr. 6, 2004; 7 pages.

USPTO Notice of Allowance for U.S. Appl. No. 10/653,050 dated Jul. 29, 2004; 4 pages.

U.S. Appl. No. 10/172,670: "Method and System for Programming a Memory Device," Snyder et al.: filed on Jun. 13, 2002, 66 pages.

USPTO Notice of Allowance for U.S. Appl. No. 11/965,291 dated May 5, 2009; 7 pages.

USPTO Non-Final Rejection for U.S. Appl. No. 11/965,291 dated Dec. 17, 2008; 8 pages.

U.S. Appl. No. 11/965,291: "Universal Digital Block Interconnection and Channel Routing," Snyder et al., filed on Dec. 27, 2007: 31 pages.

USPTO Non-Final Rejection for U.S. Appl. No. 11/273,708 dated Mar. 19, 2007; 16 pages.

USPTO Final Rejection for U.S. Appl. No. 11/273,708 dated Jul. 5, 2007; 8 pages.

USPTO Notice of Allowance for U.S. Appl. No. 11/273,708 dated Aug. 9, 2007.

USPTO Requirement for Restriction/Election for U.S. Appl. No. 11/337,272 dated Sep. 11, 2006; 5 pages.

USPTO Non-Final Rejection for U.S. Appl. No. 11/337,272 dated Oct. 24, 2006; 9 pages.

UPSTO Final Rejection for U.S. Appl. No. 11/337,272 dated Feb. 2, 2007; 11 pages.

USPTO Advisory Action for U.S. Appl. No. 11/337,272 dated Apr. 3, 2007; 3 pages.

USPTO Non-Final Rejection for U.S. Appl. No. 11/337,272 dated May 17, 2007; 11 pages.

USPTO Notice of Allowance for U.S. Appl. No. 11/337,272 dated Aug. 15, 2007; 9 pages.

USPTO Non-Final Rejection for U.S. Appl. No. 11/983,291 dated Mar. 9, 2009; 9 pages.

USPTO Non-Final Rejection for U.S. Appl. No. 11/698,660 dated Dec. 2, 2008; 12 pages.

USPTO Final Rejection for U.S. Appl. No. 11/698,650 dated May 28, 2009; 12 pages.

USPTO Non-Final Rejection for U.S. Appl. No. 11/709,866 dated Nov. 7, 2008; 14 pages.

USPTO Notice of Allowance for U.S. Appl. No. 11/709,866 dated Apr. 7, 2009; 8 pages.

Van Ess, David; "Simulating a 555 Timer with PSoC." Cypress Semiconductor Corporation, Application Note AN2286, May 19, 2005; 10 pages.

Cypress Semiconductor Corporation, "FAN Controller CG6457AM and CG6462AM," PSoC Mixed Signal Array Preliminary Data Sheet; May 24, 2005; 25 pages.

Cypress Semiconductor Corporation, "PSoC Mixed-Signal Controllers," Product Description; <http://www.cypress.com/portal/server>; retrieved on Sep. 27, 2005; 2 pages.

Cypress Semiconductor Corporation, "CY8C21x34 Data Sheet," CSR User Module, CSR V.1.0; Oct. 6, 2006; 36 pages.

Chapweske, Adam; "The PS/2 Mouse Interface," PS/2 Mouse Interfacing, 2001; 11 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Seguine, Ryan; "Layout Guidelines for PSoC CapSense," Cypress Semiconductor Corporation, Application Note AN2292; Jul. 22, 2005; 13 pages.

Lee, Mark: "EMC Design Considerations for PSoC CapSense Applications," Cypress Semiconductor Corporation, Application Note AN2318; Sep. 16, 2005: 6 pages.

Cypress Semiconductor Corporation, "Release Notes srn017," Jan. 24, 2007; 3 pages.

Cypress Semiconductor Corporation, "PSoC CY8C20x34 Technical Reference Manual (TRM)," PSoC CY8C20x34 TRM, Version 1.0, 2006: 220 pages.

International Written Opinion of the International Searching Authority for International Application No. PCT/US2006/09572 dated Jan. 10, 2008; 5 pages.

International Search Report for International Application No. PCT/US2006/09572 dated Jan. 10, 2008; 2 pages.

USPTO Notice of Allowance for U.S. Appl. No. 10/238,966 dated Jan. 27, 2009; 4 pages.

USPTO Non-Final Rejection for U.S. Appl. No. 10/238,966 dated Jun. 30, 2008; 12 pages.

USPTO Non-Final Rejection for U.S. Appl. No. 10/238,966 dated Dec. 26, 2007; 12 pages.

USPTO Final Rejection for U.S. Appl. No. 10/238,966 dated Sep. 27, 2007; 9 pages.

USPTO Non-Final Rejection for U.S. Appl. No. 10/238,966 dated Apr. 19, 2007; 7 pages.

USPTO Non-Final Rejection for U.S. Appl. No. 10/238,966 dated Oct. 20, 2006; 8 pages.

USPTO Non-Final Rejection for U.S. Appl. No. 10/238,966 dated Apr. 6, 2006; 8 pages.

USPTO Notice of Allowance for U.S. Appl. No. 10/033,027 dated Mar. 31, 2009; 7 pages.

USPTO Non-Final Rejection for U.S. Appl. No. 10/033,027 dated Dec. 18, 2008; 5 pages.

USPTO Final Rejection for U.S. Appl. No. 10/033,027 dated Jun. 8, 2007; 8 pages.

USPTO Non-Final Rejection for U.S. Appl. No. 10/033,027 dated Dec. 21, 2006; 31 pages.

USPTO Final Rejection for U.S. Appl. No. 10/033,027 dated Aug. 9, 2006; 6 pages.

USPTO Non-Final Rejection for U.S. Appl. No. 10/033,027 dated Apr. 26, 2006; 26 pages.

USPTO Final Rejection for U.S. Appl. No. 10/033,027 dated Oct. 31, 2005; 24 pages.

USPTO Non-Final Rejection for U.S. Appl. No. 10/033,027 dated Apr. 20, 2005; 20 pages.

USPTO Non-Final Rejection for U.S. Appl. No. 10/033,027 dated Oct. 18, 2004; 17 pages.

"An Analog PPL-Based Clock and Data Recovery Circuit with High Input Jitter Tolerance;" Sun, Reprinted from IEEE Journal of Solid-State Circuits, 1989; 4 pages.

"WP 3.5: An Integrated Time Reference;" Blauschild, Digest of Technical Papers, 1994; 4 pages.

"Micropower CMOS Temperature Sensor with Digital Output;" Bakker et al., IEEE Journal of Solid-State Circuits, 1996; 3 pages.

USPTO Notice of Allowance for U.S. Appl. No. 10/002,217 dated Jan. 28, 2009; 4 pages.

USPTO Non-Final Rejection for U.S. Appl. No. 09/975,115 dated Oct. 8, 2008; 34 pages.

USPTO Final Rejection U.S. Appl. No. 09/975,115 dated May 12, 2008; 33 pages.

USPTO Non-Final Rejection for U.S. Appl. No. 09/975,115 dated Jan. 7, 2008; 30 pages.

USPTO Non-Final Rejection for U.S. Appl. No. 09/975,115 dated Jul. 28, 2007; 28 pages.

USPTO Final Rejection for U.S. Appl. No. 09/975,115 dated Feb. 21, 2007; 25 pages.

USPTO Non-Final Rejection for U.S. Appl. No. 09/975,115 dated Oct. 31, 2006; 19 pages.

USPTO Final Rejection for U.S. Appl. No. 09/975,115 dated Jun. 23, 2006; 20 pages.

USPTO Non-Final Rejection for U.S. Appl. No. 09/975,115 dated Jan. 11, 2006; 15 pages.

USPTO Non-Final Reject on for U.S. Appl. No. 09/975,115 dated Jul. 27, 2005; 11 pages.

USPTO Non-Final Rejection for U.S. Appl. No. 09/975,115 dated Feb. 11, 2005; 86 pages.

USPTO Final Rejection for U.S. Appl. No. 09/975,338 dated Jan. 31, 2008; 21 pages.

USPTO Non-Final Rejection for U.S. Appl. No. 09/975,338 dated Aug. 24, 2007; 19 pages.

USPTO Final Rejection for U.S. Appl. No. 09/975,338 dated Feb. 27, 2007; 23 pages.

USPTO Non-Final Rejection for U.S. Appl. No. 09/975,338 dated Sep. 6, 2006; 11 pages.

USPTO Advisory Action for U.S. Appl. No. 09/975,338 dated May 15, 2006; 4 pages.

USPTO Final Rejection for U.S. Appl. No. 09/975,338 daed Jan. 18, 2006; 12 pages.

USPTO Non-Final Rejection for U.S. Appl. No. 09/975,338 dated Apr. 5, 2005; 13 pages.

USPTO Non-Final Rejection for U.S. Appl. No. 10/113,065 dated May 20, 2005; 14 pages.

USPTO Final Rejection for U.S. Appl. No. 10/113,065 dated Oct. 26, 2005; 17 pages.

USPTO Notice of Allowance for U.S. Appl. No. 10/113,065 dated Apr. 6, 2006; 8 pages.

USPTO Non-Final Rejection for U.S. Appl. No. 09/998,834 dated Sep. 20, 2004; 11 pages.

USPTO Notice of Allowance for U.S. Appl. No. 09/998,834 dated May 19, 2005; 7 pages.

USPTO Non-Final Rejection for U.S. Appl. No. 09/998,859 dated May 15, 2003; 6 pages.

USPTO Final Rejection for U.S. Appl. No. 09/998,859 dated Nov. 19, 2003; 5 pages USPTO Non-Final Rejection for U.S. Appl. No. 09/998,859 dated Nov. 4, 2004; 6 pages.

USPTO Notice of Allowance for U.S. Appl. No. 09/998,859 dated Mar. 14, 2005; 6 pages.

USPTO Notice of Allowance for U.S. Appl. No. 09/975,105 dated Dec. 14, 2006: 4 pages.

USPTO Final Rejection for U.S. Appl. No. 09/975,105 dated Jul. 13, 2006; 7 pages.

USPTO Non-Final Rejection for U.S. Appl. No. 09/975,105 dated Jan. 19, 2006; 5 pages.

USPTO Non-Final Rejection for U.S. Appl. No. 09/975,105 dated Apr. 19, 2005; 9 pages.

USPTO Notice of Allowance for U.S. Appl. No. 10/324,455 dated Feb. 12, 2004; 4 pages.

USPTO Non-Final Rejection for U.S. Appl. No. 10/324,455 dated Nov. 6, 2003; 4 pages.

USPTO Non-Final Rejection for U.S. Appl. No. 10/324,455 dated Aug. 21, 2003; 4 pages.

From U.S. Appl. No. 10/033,027: Goodenough, F. "Analog Counterparts of FPGAS Ease System Design" Electronic Design, Penton Publishing, Cleveland, OH, US vol. 42, No. 21, Oct. 24, 1994; 10 pages.

From U.S. Appl. No. 10/033,027: Harbaum, T. et al. "Design of a Flexible Coprocessor Unit" Proceedings of the Euromicro Conference, XX XX, Sep. 1999; 10 pages.

From U.S. Appl. No. 10/033,027: "Programmable Microcontroller (PSoC) Architecture (Mixed Analog/Digital)", Aug. 7, 2001; U.S. Appl. No. 09/924,734 Snyder et al.; 28 pages.
From U.S. Appl. No. 10/033,027: "Digital Configurable Macro Architecture"; Jul. 18, 2001; U.S. Appl. No. 09/909,045; Snyder; 37 pages.
From U.S. Appl. No. 10/033,027: "Configuring Digital Functions in a Digital Configurable Macro Architecture"; Jul. 18, 2001; U.S. Appl. No. 09/909,109; Snyder; 38 pages.
From U.S. Appl. No. 10/033,027: "A Programmable Analog System Architecture (As Amended)", Jul. 18, 2001; U.S. Appl. No. 09/909,047; Mar; 60 pages.
From U.S. Appl. No. 10/033,027: "Programmable Methodology and Architecture for a Programmable Analog System (As Amended)", Aug. 14, 2001; U.S. Appl. No. 09/930,021; Mar et al.; 87 pages.
From U.S. Appl. No. 10/033,027: "Method for Synchronizing and Resetting Clock Signals Supplied to Multiple Programmable Analog Blocks (As Amended)", Oct. 1, 2001; U.S. Appl. No. 09/969;311; Sullam; 57 pages.
From U.S. Appl. No. 10/033,027: "Method and Apparatus for Programming a Flash Memory"; Jun. 5, 2001; U.S. Appl. No. 09/875,599; Snyder; 23 pages.
From U.S. Appl. No. 10/033,027: "In-System Chip Emulator Architecture", Oct. 10, 2001; U.S. Appl. No. 09/975,115; Snyder et al.; 38 pages.
From U.S. Appl. No. 10/033,027: "A Configurable Input/Output Interface for a Microcontroller"; Sep. 14, 2001; U.S. Appl. No. 09/953,423; Kutz et al.; 28 pages.
From U.S. Appl. No. 10/033,027: "Multiple Use of Microcontroller Pad"; Jun. 26, 2001; U.S. Appl. No. 09/893,050; Kutz et al.; 21 pages.
From U.S. Appl. No. 10/033,027: "Programming Architecture for a Programmable Analog System"; Aug. 14, 2001; U.S. Appl. No. 09/929,891; Mar et al.; 82 pages.
From U.S. Appl. No. 10/033,027: "Architecture for Synchroninzing and Resetting Clock Signals Supplied to Multiple Analog Programmable Analog Blocks"; Oct. 1, 2001; U.S. Appl. No. 09/969,313; Sullam; 50 pages.
USPTO Advisory Action for U.S. Appl. No. 09/998,848 dated Sep. 7, 2005; 3 pages.
USPTO Final Rejection for U.S. Appl. No. 09/989,765 dated Mar. 31, 2009; 18 pages.
USPTO Final Rejection for U.S. Appl. No. 09/989,778 dated Mar. 16, 2009; 26 pages.
"Pod—Piece of Data, Plain Old Documentation, Plain Old Dos. . ."; retrieved on Nov. 14, 2005 from http://www.auditmype.com/acronym/POD.asp; 2 pages.
Nam et al.; "Fast Development of Source-Level Debugging System Using Hardware Emulation"; IEEE 2000; 4 pages.
Huang et al.; "Iceberg: An Embedded In-Cicuit Emulator Synthesizer for Microcontrollers"; ACM 1999; 6 pages.
Khan et al.; "FPGA Architectures for Asic Hardware Emulators"; IEEE 1993; 5 pages.
Oh et al.: Emulator Environment Based on an FPGA Prototyping Board; IEEE Jun. 21-23, 2000; 6 pages.
Hong et al.; "An FPGA-Based Hardware Emulator for Fast Fault Emulation"; IEEE 1997; 4 pages.
Ching et al.; "An ln-Curcuit-Emulator for TMS320C25"; IEEE 1994; 6 pages.
Pasternak; "In-Circuit-Emulation in ASIC Architecture Cor Designs"; IEEE 1989; 4 pages.
Melear; "Using Background Modes for Testing, Debugging and Emulation of Microcontrollers"; IEEE 1997; 8 pages.
Stan Augarten; "The Chip Collection—ntroduction—Smithsonian Institute"; "State of the Art"; "The First 256-Bit Static RAM"; retrieved on Nov. 14, 2005 from http://smithsonianchips.si.edu/augarten/p24htm; 2 pages.
Anonymous; "JEEN JTAG Embedded Ice Ethernet Interface"; Aug. 1999; Embedded Performance, Inc.; 3 pages.
Sedory; "A Guide to Debug"; 2004; retrieved on May 20, 2005; 7 pages.

"Microsoft Files Summary Judgement Motions"; Feb. 1999; Microsoft PressPass; retrieved on May 20, 2005 from http://www.microsoft.com/presspass/press/1999/feb99/Feb99/Calderapr.asp; 3 pages.
Xerox; "Mesa Debugger Documentation"; Apr. 1979; Xerox Systems Development Department; Version 5.0; 33 pages.
U.S. Appl. No. 09/964,991: "A Novel Band-Gap Circuit for Providing an Accurate Reference Voltage Compensated for Process State, Process Variations and Temperature," Kutz at al., filed on Sep. 26, 2001; 25 pages.
U.S. Appl. No. 09/842,966: "Precision Crystal Oscillator Circuit Used in Microcontroller," Monte Mar, filed on Apr. 25, 2001; 28 pages.
U.S. Appl. No. 09/207,912: "Circuit(s), Architecture and Method(s) for Operating and/or Tuning a Ring Oscillator," Monte Mar, filed on Dec. 9, 1998; 23 pages.
USPTO Non-Final Rejection for U.S. Appl. No. 09/998,859 dated May 28, 2003; 6 pages.
U.S. Appl. No. 09/943,062: "Apparatus and Method for Programmable Power Management in a Programmable Analog Circuit Block," Monte Mar, filed on Aug. 29, 2001; 46 pages.
U.S. Appl. No. 10/238,966: "Method for Parameterizing a User Module," Perrin et al., filed on Sep. 9, 2002; 41 pages.
USPTO U.S. Appl. No. 09/935,454: "Method and Apparatus for Local and Global Power Management in a Programmable Analog Circuit," Monte Mar, filed on Aug. 22, 2001; 1 page.
USPTO U.S. Appl. No. 09/923,461: "Non-Interfering Multiply-Mac (Multiply Accumulate) Circuit," Warren Snyder, filed on Aug. 6, 2001; 25 pages.
USPTO U.S. Appl. No. 09/922,579: "A Method for a Efficient Supply to a Microcontroller," Kutz et al., Aug. 3, 2001; 37 pages.
USPTO U.S. Appl. No. 09/922,419: "A Power Supply Pump Circuit for a Microcontroller," Kutz et al., filed on Aug. 3, 2001; 38 pages.
USPTO U.S. Appl. No. 09/912,768: "A Microcontroller having a Dual Mode Relax Oscillator that is Trimmable," James Shutt; filed on Jul. 24, 2001; 33 pages.
USPTO U.S. Appl. No. 09/893,048: "A Microcontroller having an On-Chip High Gain Amplifier," Kutz et al., filed on Jun. 26, 2001; 22 pages.
USPTO U.S. Appl. No. 09/826,397: "Method and Circuit for Allowing a Microprocessor to Change its Operating Frequency on-the-Fly," Bert Sullam, filed on Apr. 2, 2001; 24 pages.
USPTO U.S. Appl. No. 09/887,955: "Novel Power on Reset Circuit for Microcontroller," Kutz et al., filed on Jun. 22, 2001; 42 pages.
USPTO U.S. Appl. No. 10/001,478: "In-Circuit Emulator and POD Synchronized Boot," Nemecek et al., filed on Nov. 1, 2001; 44 pages.
USPTO U.S. Appl. No. 10/001,568: "Combined In-Circuit Emulator and Programmer," Nemecek et al., filed on Nov. 1, 2001; 47 pages.
USPTO U.S. Appl. No. 10/002,217: "Conditional Branching in an In-Circuit Emulation System," Craig Nemecek, filed on Nov. 1, 2001; 43 pages.
USPTO U.S. Appl. No. 10/004,039: "In-Circuit Emulator with Gatekeeper for Watchdog Timer," Nemecek et al., filed on Nov. 14, 2001; 46 pages.
USPTO U.S. Appl. No. 10/004,197: "In-Circuit Emulator with Gatekeeper Based Halt Control," Nemecek et at, filed on Nov. 14, 2001; 47 pages.
USPTO U.S. Appl. No. 10/000,383: "System and Method of Providing a Programmable Clock Architecture for an Advanced Microcontroller," Sullam et at., filed on Oct. 24, 2001; 34 pages.
USPTO U.S. Appl. No. 09/887,923: "Novel Method and System for interacting between a Processor and a Power on Reset to Dynamically Control Power States in a Microcontroller," Kutz et al., filed on Jun. 22, 2001; 44 pages.
USPTO U.S. Appl. No. 09/855,868: "Protecting Access to Microcontroller Memory Blocks," Warren Snyder, filed on May 14, 2001; 28 pages.
USPTO U.S. Appl. No. 11/125,554: "A Method for a Efficient Supply to a Microcontroller," Kutz et al., filed on May 9, 2005; 1 page.
USPTO U.S. Appl. No. 10/272,231: "Digital Configurable Macro Architecture," Warren Snyder, filed on Oct. 15, 2002; 36 pages.

USPTO U.S. Appl. No. 09/977,111: "A Frequency Doubler Circuit with Trimmablo Current Control," Shutt et al., filed on Oct. 11, 2001; 35 pages.
USPTO U.S. Appl. No. 09/973,535: "Architecture for Decimation Algorithm," Warren Snyder, filed on Oct. 9, 2001; 26 pages.
U.S. Appl. No. 60/243,708 "Advanced Programmable Microcontroller Device"; Snyder et al., filed on Oct. 26, 2000; 277 pages.
USPTO U.S. Appl. No. 09/972,133: "Method for Entering Circuit Test Mode," Warren Snyder, filed on Oct. 5, 2001, 30 pages.
USPTO U.S. Appl. No. 09/972,003: "Test Architecture for Microcontroller Providing for a Serial Communication Interface," Warren Snyder, filed on Oct. 5, 2001; 32 pages.
USPTO U.S. Appl. No. 09/957,084: "A Crystal-Less Oscillator with Trimmable Analog Current Control for Increased Stability," Mar et al., filed on Sep. 19, 2001; 28 pages.
USPTO U.S. Appl. No. 10/011,214: "Method and Circuit for Synchronizing a Write Operation between an On-Chip Microprocessor and an On-Chip Programmable Analog Device Operating at Different Frequencies," Sullam et al., filed on Oct. 25, 2001; 49 pages.
USPTO U.S. Appl. No. 09/972,319: "Method for Applying Instructions to Microprocessor in Test Mode," Warren Snyder, filed on Oct. 5, 2001; 31 pages.
Wikipedia.org; "Von Neumann architecture"; retrieved from http://en.wikipedia.org/wiki/Von_Neumann_architecture on Jan. 22, 2007; 4 pages.
"In circuit Emulators—descriptions of the major ICEs around"; retrieved on Nov. 14, 2005 from http://www.algonet.se/~staffann/developer/emulator.htm; 6 pages.
Jonathan S. Rosenburg, "Hew Debuggers Work" John Wiley & Sons, Inc. 1996; 259 pages.
USPTO U.S. Appl. No. 09/975,105: "Host to FPGA Interface in an In-Circuit Emulation System," Craig Nernacek, filed on Oct. 10, 2001; 44 pages.
USPTO U.S. Appl. No. 10/033,027: "Microcontrollable Programmable System on a Chip," Warren Snyder, filed on Oct. 22, 2001; 117 pages.
USPTO U.S. Appl. No. 10/803,030: "Programmable Microcontrollable Architecture (Mixed Analog/Digital)," Snyder et al., filed on Mar. 16, 2004; 13 pages.
USPTO U.S. Appl. No. 09/989,815: "A Data Driven Method and System for Monitoring Hardware Resource Usage for Programming an Electric Device," Bartz et al., filed on Nov. 19, 2001; 36 pages.
USPTO U.S. Appl. No. 09/275,336: "Programmable Oscillator Scheme," Mar et al., filed on Mar. 24, 1999; 25 pages.
USPTO U.S. Appl. No. 09/721,316: "Programmable Oscillator Scheme," Mar et al., filed on Nov. 22, 2000; 26 pages.
USPTO U.S. Appl. No. 10/324,455: "Programmable Oscillator Scheme," Mar et al., filed on Dec. 20, 2002; 23 pages.
USPTO U.S. Appl. No. 09/998,859: "A System and a Method for Checking Lock Step Consistency between in Circuit Emulation and a Microcontroller while Debugging Process is in Progress," Craig Nemecek, filed on Nov. 15, 2001; 33 pages.
USPTO U.S. Appl. No. 09/998,834: "A System and a Method for Communication between and Ice and a Production Microcontroller while in a Halt State," Craig Nemecek, filed on Nov. 15, 2001; 33 pages.
USPTO U.S. Appl. No. 10/113,065: "System and Method for Automatically Matching Components in a Debugging System," Nemecek et al., filed on Mar. 29, 2002; 32 pages.
USPTO U.S. Appl. No. 09/989,574: "Method and System for using a Graphics user Interface for Programming an Electronic Device," Bartz et al., filed on Nov. 19, 2001; 43 pages.
USPTO U.S. Appl. No. 09/989,816: "Datasheet Browsing and Creation with Data-Driven Datasheet Tabs within a Microcontroller Design Tool," Bartz at al., filed on Nov. 19, 2001; 55 pages.
Wikipedia "XML" retrieved on Jan. 29, 2007 from http://en.wikipedia.org/wiki/XML; 16 pages.
Cypress MicroSystem, Inc. "Cypress Customer Forums" retrieved from <http://www.cypress.com/forums/messageview>; Nov. 30, 2004; 1 page.
USPTO U.S. Appl. No. 10/113,064: "Method and System for Debugging through Supervisory Operating Codes and Self Modifying Codes," Roe et al., filed on Mar. 29, 2003; 36 pages.
USPTO U.S. Appl. No. 10/002,726: "Method and Apparatus for Generating Microcontroller Configuration Information," Ogami et al., filed on Oct. 24, 2001; 54 pages.
USPTO Notice of Allowance for U.S. Appl. No. 10/002,726 dated Feb. 6, 2007; 7 pages.
USPTO Non-Final Rejection for U.S. Appl. No. 10/002,726 dated Aug. 28, 2006; 10 pages.
USPTO Final Rejection for U.S. Appl. No. 10/002,726 dated Mar. 27, 2006; 8 pages.
USPTO Final Rejection for U.S. Appl. No. 10/002,726 dated Nov. 30, 2005; 10 pages.
USPTO Non-Final Rejection for U.S. Appl. No. 10/002,726 dated Jun. 10, 2005; 10 pages.
USPTO Non-Final Rejection for U.S. Appl. No. 10/002,726 dated Dec. 13, 2004; 7 pages.
USPTO U.S. Appl. No. 11/818,005: "Techniques for Generating Microcontroller Configuration Information," Ogami et al., filed on Jun. 12, 2007; 61 pages.
USPTO Requirement for Restriction/Election for U.S. Appl. No. 11/818,005 dated Jul. 14, 2009; 5 pages.
USPTO U.S. Appl. No. 11/850,260: "Circuit and Method for Improving the Accuracy of a Crystal-less Oscillator Having Dual-Frequency Modes," Wright et al., filed on Sep. 5, 2007; 33 pages.
USPTO Non-Final Rejection for U.S. Appl. No. 11/850,260 dated Mar. 6, 2009; 7 pages.
USPTO U.S. Appl. No. 11/644,100: "Differential-to-single ended signal converter circuit and method," Jonathon Stiff, filed on Dec. 21, 2006; 33 pages.
USPTO U.S. Appl. No. 11/415,588: "Voltage Controlled Oscillator Delay Cell and Method," Sivadasan et al., filed on May 1, 2006; 24 pages.
USPTO U.S. Appl. No. 12/218,404: "Voltage Controlled Oscillator Delay Cell and Method," Sivadasan et al., filed on Jul. 14, 2008; 23 pages.
USPTO U.S. Appl. No. 11/132,894: "Open Loop Bandwidth Test Architecture and Method for Phase Locked Loop (PLL)," Jonathon Stiff, filed on May 19, 2005; 38 pages.
USPTO U.S. Appl. No. 11/322,044: "Split charge pump PLL architecture," Jonathon Stiff, filed on Dec. 28, 2005; 19 pages.
USPTO U.S. Appl. No. 10/305,589: "Current Controlled Delay Circuit," Jonathan Stiff, filed on Nov. 26, 2002; 18 pages.
USPTO U.S. Appl. No. 09/849,164: "Reduced Static Phase Error CMOS PLL Charge Pump," Jonathon Stiff, filed on May 4, 2001; 30 pages.
USPTO U.S. Appl. No. 10/327,217: "Single Ended Clock Signal Generator Having a Differential Output," Richmond et al., filed on Dec. 20, 2002; 27 pages.
USPTO U.S. Appl. No. 10/871,582: "LVDS Input Circuit with Extended Common Mode Range," Reinschmidt et al., filed on Jun. 17, 2004; 25 pages.
USPTO U.S. Appl. No. 09/404,891: "Method, Architecture and Circuitry for Controlling Pulse Width in a Phase and/or Frequency Detector," Scott et al., filed on Sep. 24, 1999: 17 pages.
USPTO U.S. Appl. No. 10/226,911: "Calibration of Integrated Circuit Time Constants," Gehring et al.; filed on Aug. 22, 2002; 32 pages.
USPTO U.S. Appl. No. 09/943,149: "Method for Phase Locking in a Phase Lock Loop," Moyal et al., filed on Aug. 30, 2001; 21 pages.
USPTO U.S. Appl. No. 09/047,595: "Roving Range Control to Limit Receive PLL Frequency of Operation," Paul H. Scott, filed on Mar. 29, 1998; 35 pages.
USPTO U.S. Appl. No. 09/216,460: "Circuit and Method for Controlling an Output of a Ring Oscillator," Abugharbieh et al., filed on Dec. 18, 1998; 21 pages.
USPTO U.S. Appl. No. 09/471,914: "Reference-Free Clock Generator and Data Recovery PLL," Dalmia et al., filed on Dec. 23, 1999; 32 pages.
USPTO U.S. Appl. No. 09/471,576: "Reference-Free Clock Generation and Data Recovery PLL," Kamal Dalmia, filed on Dec. 23, 1999; 30 pages.
USPTO U.S. Appl. No. 10/083,442: "Method/Architecture for a Low Gain PLL with Wide Frequency Range," Meyers et al., filed on Feb. 26, 2002; 28 pages.

USPTO U.S. Appl. No. 09/470,665: "Digital Phase/Frequency Detector, and Clock Generator and Data Recovery PLL Containing the Same," Kamal Dalmia, filed on Dec. 23, 1999; 26 pages.
USPTO U.S. Appl. No. 09/893,161: "Architecture of a PLL with Dynamic Frequency Control on a PLD," Michael T. Moore, filed on Jun. 27, 2001; 32 pages.
USPTO U.S. Appl. No. 09/608,753: "PLL Lockout Watchdog," Wilson et al., filed on Aug. 24, 2004; 24 pages.
USPTO U.S. Appl. No. 09/398,956: "Frequency Acquisition Rate Control in Phase Lock Loop Circuits," Moyal et al., filed on Sep. 17, 1999; 35 pages.
USPTO U.S. Appl. No. 09/747,262: "Linearized Digital Phase-Locked Loop," Williams et al., filed on Dec. 22, 2000; 9 pages.
USPTO U.S. Appl. No. 09/981,448: "Oscillator Tuning Method," Lane T. Hauck, filed on Oct. 17, 2001; 28 pages.
USPTO U.S. Appl. No. 09/538,989: "Memory Based Phase Locked Loop," Rengarajan S. Krishnan, filed on Mar. 30, 2000; 27 pages.
USPTO U.S. Appl. No. 09/048,905: "Programmable Clock Generator," Mann et al., filed on Mar. 26, 1998; 42 pages.
USPTO U.S. Appl. No. 08/865,342: "Programmable Clock Generator," Mann et al., filed on May 29, 1997; 41 pages.
USPTO U.S. Appl. No. 10/288,003: "Low Voltage Differential Signal Driver Circuit and Method," Roper et al., filed on Nov. 4, 2002; 30 pages.
USPTO Notice of Allowance for U.S. Appl. No. 09/989,777 dated Mar. 9, 2009; 7 pages.
USPTO U.S. Appl. No. 11/200,619: "Providing hardware independence to automate code generation of processing device firmware," Snyder et al., filed on Aug. 10, 2005; 41 pages.
USPTO U.S. Appl. No. 11/201,922: "Design model for a hardware device-independent method of defining embedded firmware for programmable systems," McDonald et al., filed on Aug. 10, 2005; 31 pages.
USPTO U.S. Appl. No. 11/201,627: "Method and an apparatus to design a processing system using a graphical user interface," Ogami et al., filed on Aug. 10, 2005; 37 pages.
USPTO U.S. Appl. No. 09/989,808: "Automatic generation of application program interfaces, source code, interrupts, and data sheets for microcontroller programming," Bartz et al., filed on Nov. 19, 2001; 62 pages.
USPTO U.S. Appl. No. 10/109,979: "Graphical user interface with logic unifying functions," Anderson et al., filed on Mar. 29, 2002; 100 pages.
USPTO U.S. Appl. No. 09/989,781: "System and method for decoupling and iterating resources associated with a module," Ogami et al., filed on Nov. 19, 2001; 40 pages.
USPTO U.S. Appl. No. 09/989,775: "User defined names for registers in memory banks derived from configurations," Ogami et al., filed on Nov. 19, 2001; 29 pages.
USPTO U.S. Appl. No. 09/989,819: "System and method for creating a boot file utilizing a boot template," Ogami et al., filed on Nov. 19, 2001; 43 pages.
USPTO U.S. Appl. No. 09/989,761: "Storing of global parameter defaults and using them over two or more design projects," Ogami et al., filed on Nov. 19, 2001; 37 pages.
Burgos et al., "Power Converter Analysis and Design using Matlab: A Transfer Function Approach," Proceedings of IEEE International Symposium on industrial Electronics, 1998, vol, 2; 6 pages.
"The Gemini Netlist Comparison Project" <http://www.cs.washington.edu/research/projects/lis/www/gemini/gemini.html> larry@cs.washington.edu; Mar. 19, 2002; 2 pages.
Ebeling "Gemini II: A Second Generation Layout Validation Program;" 1988; in proceedings of the IEEE International Conference on Computer Aided Design (ICCAD-88); 4 pages.
USPTO U.S. Appl. No. 12/132,527: "System and Method for Performing Next Placements and Pruning of Disallowed Placements for Programming an Integrated Circuit;" Ogami et al., filed on Jun. 3, 2008; 44 pages.
USPTO U.S. Appl. No. 09/475,808: "Configurable Memory for Programmable Logic Circuits," Lacey et al., filed on Dec. 30, 1999; 24 pages.
USPTO Non-Final Rejection for U.S. Appl. No. 09/475,808 dated Jun. 6, 2001; 8 pages.

USPTO Notice of Allowance for U.S. Appl. No. 09/475,808 dated Nov. 6, 2001; 8 pages.
USPTO U.S. Appl. No. 11/986,338: Reconfigurable Testing System and Method, Pleis et al., filed on Nov. 20, 2007: 41 pages.
USPTO Notice of Allowance for U.S. Appl. No. 11/986,338 dated May 7, 2009; 1 page.
USPTO U.S. Appl. No. 11/273,708: "Capacitance Sensor Using Relaxation Oscillators," Snyder et al., filed on Nov. 11, 2005; 33 pages.
USPTO U.S. Appl. No. 11/337,272: "Successive Approximate Capacitance Measurement Circuit;" Warren Snyder, filed on Jan. 20, 2006 29 pages.
USPTO U.S. Appl. No. 11/983,291: "Successive Approximate Capacitance Measurement Circuit," Warren Snyder, filed on Nov. 7, 2007; 26 pages.
USPTO U.S. Appl. No. 11/698,660: "Configurable Bus," Kutz et al., filed on Jan. 25, 2007; 35 pages.
Sedra et al., "Microelectronic Circuits," 3rd Edition, Oxford University Press, 1991; 20 pages.
USPTO U.S. Appl. No. 11/166,622: "Touch wake for electronic devices," Beard et al., filed on Jun. 23, 2005; 22 pages.
USPTO U.S. Appl. No. 10/024,093: "Configurable Memory for Programmable Logic Circuits," Lacey et al., filed on Dec. 18, 2001; 25 pages.
USPTO U.S. Appl. No. 11/088,028: "Method and Circuit for Rapid Alignment of Signals," Moyal et al., filed on Nov. 13, 2007; 34 pages.
USPTO Notice of Allowance for U.S. Appl. No. 11/088,028 dated Jul. 2, 2007; 6 pages.
USPTO Notice of Allowance for U.S. Appl. No. 11/088,028 dated Jan. 26, 2007; 6 pages.
USPTO Non-Final Rejection for U.S. Appl. No. 11/088,028 dated Jun. 16, 2006; 8 pages.
USPTO U.S. Appl. No. 11/985,340: "Method and Circuit for Rapid Alignment of Signals," Moyal et al., filed on Nov. 13, 2007; 34 pages.
USPTO Notice of Allowance for U.S. Appl. No. 11/985,340 dated Jun. 2, 2009; 7 pages.
USPTO Requirement for Restriction for U.S. Appl. No. 11/985,340 dated Mar. 16, 2009; 7 pages.
USPTO Non-Final Rejection for U.S. Appl. No. 11/865,672 dated Jul. 17, 2009; 6 pages.
USPTO Non-Final Rejection for U.S. Appl. No. 11/859,547 dated Oct. 1, 2009; 9 pages.
USPTO Non-Final Rejection for U.S. Appl. No. 11/967,243 dated Sep. 17, 2009; 9 pages.
USPTO Non-Final Rejection for U.S. Appl. No. 11/967,240 dated Jun. 10, 2009; 7 pages.
USPTO Non-Final Rejection for U.S. Appl. No. 11/857,947 dated Mar. 30, 2009; 18 pages.
USPTO Non-Final Rejection for U.S. Appl. No. 12/104,672 dated Aug. 26, 2009; 11 pages.
USPTO Non-Final Rejection for U.S. Appl. No. 12/060,128 dated Apr. 29, 2009; 11 pages.
International Search Report of the international Searching Authority for International Application No. PCT/US08160695 dated Jul. 22, 2009; 3 pages.
Written Opinion of the International Searching Authority for International Application No. PCT/US08/60695 dated Jul. 22, 2009; 6 pages.
Azim et al., "A Custom DSP Chip to Implement a Robot Motion Controller Proceedings of the IEEE Custom Integrated Circuits Conference," May 1988, pp. 8.7.1-8.7.5; 6 pages.
Catthoor et al., "Architectural Strategies for an Application-Specific Synchronous Multiprocessor Environment," IEEE transactions on Acoustics, Speech, and Signal Processing; vol. 36, No. 2, Feb. 1988, pp. 265-284; 20 pages.
International Search Report of the International Searching Authority for International Application No. PCT/US08/60696 dated Sep. 22, 2008; 2 pages.
International Search Report of the International Searching Authority for International Application No. PCT/US08160698 dated Sep. 5, 2008; 2 pages.

Shahbahrami et al., "Matrix Register File and Extended Subwords: Two Techniques for Embedded Media Processors," ACM, May 2005; 9 pages.

Jung et al., "A Register File with Transposed Access Mode," 2000, IEEE; 2 pages.

International Search Report of the International Searching Authority for International Application No. PCT/US08/60681 dated Sep. 12, 2008; 2 pages.

Written Opinion of the International Searching Authority for International Application No. PCT/US08/60681 dated Sep. 12, 2008; 4 pages.

USPTO Notice of Allowance for U.S. Appl. No. 11/965,677 dated Sep. 10, 2009; 6 pages.

USPTO Non-Final Rejection for U.S. Appl. No. 11/965,677 dated Mar. 10, 2009; 10 pages.

Written Opinion of the International Searching Authority for International Application No. PCT/US08/60696 dated Sep. 22, 2008; 4 pages.

USPTO Notice of Allowance for U.S. Appl. No. 10/001,477 dated Dec. 4, 2009; 7 pages.

USPTO Notice of Allowance for U.S. Appl. No. 09/989,765 dated Dec. 22, 2009; 8 pages.

USPTO Notice of Allowance for U.S. Appl. No. 09/994,600 dated Jan. 4, 2010; 4 pages.

USPTO Notice of Allowance for U.S. Appl. No. 10/002,217 dated Jan. 4, 2010; 7 pages.

USPTO Notice of Allowance for U.S. Appl. No. 09/989,777 dated Jan. 15, 2010; 8 pages.

USPTO Notice of Allowance for U.S. Appl. No. 11/965,291 dated Jan. 13, 2010; 4 pages.

USPTO Notice of Allowance for U.S. Appl. No. 09/975,115 dated Jan. 29, 2010; 9 pages.

USPTO Notice of Allowance for U.S. Appl. No. 10/238,966 dated Feb. 1, 2010; 4 pages.

USPTO Final Rejection for U.S. Appl. No. 09/994,601 dated Jan. 5, 2010; 13 pages.

USPTO Non-Final Rejection for U.S. Appl. No. 09/998,848 dated Dec. 10, 2009; 16 pages.

USPTO Notice of Allowance for U.S. Appl. No. 10/008,096 dated Feb. 1, 2010; 6 pages.

USPTO Non-Final Rejection for U.S. Appl. No. 11/201,627 dated Dec. 24, 2009; 22 pages.

USPTO Final Rejection for U.S. Appl. No. 11/200,619 dated Jan. 4, 2010; 18 pages.

USPTO Non-Final Rejection for U.S. Appl. No. 111644,100 dated Dec. 16, 2009; 13 pages.

USPTO Non-Final Rejection for U.S. Appl. No. 11/850,260 dated Jan. 14, 2010; 8 pages.

USPTO Notice of Allowance for U.S. Appl. No. 10/033,027 dated Feb. 18, 2010; 4 pages.

Adham et al., "Preliminary Outline of the IEEE P1500 Scalable Architecture for Testing Embedded Cores," 1999, IEEE; 6 pages.

Page Maintained by Efstathiou, "Analog Electronics: Basic Circuits of Operational Amplifiers," <http://web.archive.org/web/20030306113442> Dec. 2, 2008, retrieved from the Internet Archives; 10 pages.

USPTO Notice of Allowance for U.S. Appl. No. 09/989,762 dated Feb. 22, 2010; 7 pages.

USPTO Notice of Allowance for U.S. Appl. No. 11/986,338 dated Feb. 16, 2010; 4 pages.

USPTO Non-Final Rejection for U.S. Appl. No. 12/136,557 dated Mar. 15, 2010; 10 pages.

USPTO Notice of Allowance for U.S. Appl. No. 11/965,677 dated Feb. 12, 2010; 4 pages.

USPTO Notice of Allowance for U.S. Appl. No. 11/985,340 dated Feb. 19, 2010; 8 pages.

USPTO Notice of Allowance for U.S. Appl. No. 12/218,404 dated Feb. 16, 2010; 7 pages.

USPTO Notice of Allowance for U.S. Appl. No. 11/709,866 dated Feb. 16, 2010; 7 pages.

USPTO Non-Final Rejection for U.S. Appl. No. 10/133,581 dated Aug. 12, 2005; 12 pages.

USPTO Notice of Allowance for U.S. Appl. No. 10/133,581 dated Mar. 5, 2010; 9 pages.

USPTO Non-Final Rejection for U.S. Appl. No. 10/133,581 dated Sep. 1, 2009; 18 pages.

USPTO Final Rejection for U.S. Appl. No. 10/133,581 dated May 11, 2009; 21 pages.

USPTO Non-Final Rejection for U.S. Appl. No. 10/133,581 dated Nov. 26, 2008; 20 pages.

USPTO Final Rejection for U.S. Appl. No. 10/133,581 dated Jun. 11, 2008; 14 pages.

USPTO Non-Final Rejection for No. 10/133,581 dated Nov. 27, 2007; 15 pages.

USPTO Final Rejection for U.S. Appl. No. 10/133,581 dated Jul. 13, 2007; 15 pages.

USPTO Non-Final Rejection for U.S. Appl. No. 10/133,581 dated Jan. 10, 2007; 14 pages.

USPTO Final Rejection for U.S. Appl. No. 10/133,581 dated Aug. 10, 2006; 13 pages.

USPTO Non-Final Rejection for U.S. Appl. No. 10/133,581 dated Feb. 24, 2006; 11 pages.

USPTO Non-Final Rejection for U.S. Appl. No. 12/070,547 dated Jun. 3, 2009; 6 pages.

USPTO Notice of Allowance for U.S. Appl. No. 09/989,765 dated Mar. 31, 2010; 8 pages.

USPTO Notice of Allowance for U.S. Appl. No. 12/104,672 dated Jan. 11, 2010; 7 pages.

USPTO Non-Final Rejection for U.S. Appl. No. 11/799,439 dated Nov. 2, 2007; 7 pages.

USPTO Non-Final Rejection for U.S. Appl. No. 11/799,439 dated May 29, 2008; 8 pages.

USPTO Final Rejection for U.S. Appl. No. 11/799,439 dated Dec. 18, 2008; 6 pages.

USPTO Notice of Allowance for U.S. Appl. No. 11/799,439 dated Jun. 25, 2009; 6 pages.

USPTO Notice of Allowance for U.S. Appl. No. 111799,439 dated Feb. 5, 2010; 4 pages.

USPTO Notice of Allowance for U.S. Appl. No. 11/347,189 dated Sep. 27, 2007; 4 pages.

USPTO Non-Final Rejection for U.S. Appl. No. 11/347,189 dated Jun. 8, 2007; 6 pages.

USPTO Notice of Allowance for U.S. Appl. No. 12/070,547 dated Feb. 24, 2010; 4 pages.

USPTO Final Rejection for U.S. Appl. No. 12/070,547 dated Oct. 30, 2009; 5 pages.

USPTO Non-Final Rejection for U.S. Appl. No. 11/201,922 dated Jun. 11, 2010, 12 pages.

USPTO Notice of Allowance for U.S. Appl. No. 09/943,062 dated Jun. 29, 2010, 4 pages.

USPTO Non-Final Rejection for U.S. Appl. No. 12/132,527 dated Apr. 29, 2010, 7 pages.

USPTO Notice of Allowance for U.S. Appl. No. 10/256,829 dated May 18, 2010; 4 pages.

USPTO Non-Final Rejection for U.S. Appl. No. 101256,829 dated Oct. 26, 2009: 8 pages.

USPTO Final Rejection for U.S. Appl. No. 10/256,629 dated Jun. 23, 2009; 8 pages.

USPTO Non-Final Rejection for U.S. Appl. No. 10/256,829 dated Jan. 7, 2009; 7 pages.

USPTO Non-Final Rejection for U.S. Appl. No. 10/258,829 dated Jun. 26, 2008; 11 pages.

USPTO Notice of Allowance for U.S. Appl. No. 10/258,829 dated Oct. 29, 2007; 6 pp.

USPTO Final Rejecton for U.S. Appl. No. 10/256,829 dated Jun. 1, 2007; 16 pages.

USPTO Non-Final Rejection for U.S. Appl. No. 10/256,829 dated Nov. 2, 2006: 13 pages.

USPTO Non-Final Rejection for U.S. Appl. No. 10/256,829 dated May 3, 2006; 16 pages.

USPTO Final Rejection for U.S. Appl. No. 10/256,829 dated Jan. 27, 2006; 24 pages.

USPTO Non-Final Rejection for U.S. Appl. No. 10/256,829 dated Jul. 28, 2005; 14 pages.

USPTO Notice of Allowance for U.S. Appl. No. 09/989,017 dated May 9, 2005; 6 pages.
USPTO Non-Final Rejection for U.S. Appl. No. 09/989,017 dated Jan. 12, 2005; 5 pages.
USPTO Non-Final Rejection for U.S. Appl. No. 09/989,017 dated Jun. 8, 2004; 7 pages.
USPTO Notice of Allowance for U.S. Appl. No. 10/327,207 dated Jun. 11, 2007; 4 pages.
USPTO Notice of Allowance for U.S. Appl. No. 10/327,207 dated Dec. 26, 2006; 5 pages.
USPTO Non-Final Rejection for U.S. Appl. No. 10/327,207 dated Jul. 21, 2006; 12 pages.
USPTO Final Rejection for U.S. Appl. No. 10/327,207 dated Mar. 2, 2006; 13 pages.
USPTO Non-Final Rejection for U.S. Appl. No. 10/327,207 dated Sep. 20, 2005; 11 pages.
USPTO Miscellaneous Action for U.S. Appl. No. 10/327,207 date May 13, 2003; 1 page.
USPTO Notice of Allowance for U.S. Appl. No. 09/989,570 dated May 19, 2005; 4 pages.
USPTO Non-Final Rejection for U.S. Appl. No. 09/989,570 dated Jan. 26, 2005; 9 pages.
USPTO Notice of Allowance for U.S. Appl. No. 09/989,570 dated Sep. 10, 2004; 8 pages.
USPTO Non-Final Rejection for U.S. Appl. No. 09/989,570 dated Mar. 25, 2004; 8 pages.
USPTO Non-Final Rejection for U.S. Appl. No. 09/989,570 dated Oct. 7, 2003; 6 pages.
USPTO Advisory Action for U.S. Appl. No. 09/989,570 dated Aug. 14, 2003; 3 pages.
USPTO Final Rejection for U.S. Appl. No. 09/989,570 dated May 30, 2003; 9 pages.
USPTO Non-Final Rejection for U.S. Appl. No. 09/989,570 dated Jan. 2, 2003; 7 pages.
USPTO Notice of Allowance for U.S. Appl. No. 09/989,571 dated Sep. 13, 2005; 6 pages.
USPTO Non-Final Rejection for U.S. Appl. No. 09/989,571 dated May 23, 2005; 8 pages.
USPTO Final Rejection for U.S. Appl. No. 09/989,571 dated Jan. 26, 2005; 11 pages.
USPTO Non-Final Rejection for U.S. Appl. No. 09/989,571 dated Jun. 12, 2004; 9 pages.
M. Mooris Mano, "Computer System Architutecute," 1982, Prentice-Hall, 2nd Edition, pp. 264-264 and 435-440; 14 pages.
Dirk Killat, "A One-Chip Solution for Electronic Ballasts in Fluorescent Lamps," Power Electronics, <http://powerelectronics.com/mag/power_onechip_solution_electronic/>, dated Mar. 1, 2004, accessed Sep. 13, 2995; 4 pages.
Fred Eady, "PSoC 101," Circuit Cellar, Aug. 2004, accessed Sep. 13, 2005, <http://www.circuitcellar.com/library/print/0804/eady169/2/htm>; 4 pages.
USPTO Notice of Allowance for U.S. Appl. No. 10/803,030 dated Jan. 8, 2007; 6 pages.
USPTO Non-Final Rejection for U.S. Appl. No. 10/803,030 dated Jun. 8, 2005; 4 pages.
U.S. Appl. No. 12/058,586: "System and Method for Monitoring a Target Device," Ogami et al., filed on Mar. 28, 2008; 41 pages.
U.S. Appl. No. 12/058,534: "System and Method for Controlling a Target Device," Ogami et al., filed on Mar. 28, 2008; 40 pages.
U.S. Appl. No. 12/004,833: "System and Methods for Dynamically Reconfiguring a Programmable System on a Chip," Ogami et al., filed on Dec. 21, 2007; 40 pages.
U.S. Appl. No. 12/058,569: "Configuration of Programmable IC Design Elements," Best et al., filed on Mar. 28, 2008; 19 pages.
U.S. Appl. No. 12/057,149: "Power Managements Architecture Method and Configuration System," Kenneth Ogami, filed on Mar. 27, 2008; 34 pages.
U.S. Appl. No. 12/765,400: "Autonomous Control in a Programmable System,"Sullam et al., filed on Apr. 22, 2010; 30 pages.
International Search Report for International Application No. PCT/US/33626 mailed Jun, 24, 2010.

The Written Opinion of the International Search Report for International Application No. PCT/US10/33626 mailed on Jun. 24, 2919; 5 pages.
USPTO Non-Final Rejection for U.S. Appl. No. 12/060,176 dated Mar. 30, 2010; 22 pages.
John Mangino, "Using DMA with High Performance Peripherals to Maximize System Performance," 2007, Texas Instruments, pp. 1-23; 23 pages.
Balough et al., "White Paper: Comparing IP Integration Approaches for FPGA Implementation," Feb. 2007, Version 1.1, Altera, pp. 1-7; 7 pages.
A.F. Harvey, "DMA Fundamentals on Various PC Platforms,"1994, National Instruments Corporation, pp. 1-19; 19 pages.
Vixel, "InSpeed SOC 320 Embedded Storage Switch," 2003, Vixel, pp. 1-5; 5 pages.
USPTO Miscellaneous Action for U.S. Appl. No. 10/133,581 dated Jun. 23, 2010; 6 pages.
USPTO Miscellaneous Action for U.S. Appl. No. 10/001,478 dated Feb. 23, 2010; 5 pages.
USPTO Notice of Allowance for U.S. Appl. No. 10/001,478 dated Jun. 2, 2010, 11 pages.
USPTO Notice of Allowance for U.S. Appl. No. 11/985,340 dated Jun. 9, 2010, 8 pages.
USPTO Notice of Allowance for U.S. Appl. No. 11/850,260 dated Jul. 2, 2010, 8 pages.
USPTO Notice of Allowance for U.S. Appl. No. 12/060,128 dated Oct. 19, 2010, 8 pages.
USPTO Advisory Action for U.S. Appl. No. 11/818,005 dated Jul. 30, 2010, 3 pages.
USPTO Advisory Action for U.S. Appl. No. 11/201,627 dated Aug. 5, 2010, 3 pages.
USPTO Final Rejection for U.S. Appl. No. 11/201,627 dated May 24, 2010, 26 pages.
USPTO Non-Final Rejection for U.S. Appl. No. 11/166,622 dated Jun. 22, 2010, 11 pages.
USPTO Final Rejection for U.S. Appl. No. 11/166,622 dated Mar. 18, 2010, 12 pages.
USPTO Non-Final Rejection for U.S. Appl. No. 11/698,660 dated May 21, 2010, 15 pages.
USPTO Advisory Action for U.S. Appl. No. 11/644,100 dated Jul. 21, 2010, 3 pages.
USPTO Final Rejection for U.S. Appl. No. 11/644,100 dated May 19, 2010, 13 pages.
USPTO Final Rejection for U.S. Appl. No. 11/865,672 dated Dec. 30, 2009, 6 pages.
USPTO Final Rejection for U.S. Appl. No. 11/857,947 dated Oct. 14, 2009, 22 pages.
USPTO Non-Final Rejection for U.S. Appl. No. 11/857,947 dated Feb. 3, 2010, 23 pages.
USPTO Non-Final Rejection for U.S. Appl. No. 11/857,947 dated Jul. 21, 2010, 15 pages.
USPTO Non-Final Rejection for U.S. Appl. No. 12/058,569 dated Aug. 2, 2010, 9 pages.
USPTO Final Rejection for U.S. Appl. No. 11/968,145 dated Aug. 2, 2010, 6 pages.
USPTO Non-Final Rejection for U.S. Appl. No. 11/968,145 dated Mar. 4, 2010, 11 pages.
USPTO Non-Final Rejection for U.S. Appl. No. 12/104,678 dated Jul. 2, 2010, 8 pages.
USPTO Advisory Action for U.S. Appl. No. 09/994,601 dated Mar. 23, 2010; 2 pages.
USPTO Non-Final Rejection for U.S. Appl. No. 11/818,005 dated Oct. 26, 2010; 10 pages.
USPTO Final Rejection for U.S. Appl. No. 12/132,527 dated Oct. 14, 2010; 8 pages.
USPTO Notice of Allowance for U.S. Appl. No. 09/998,848 dated Oct. 13, 2010; 4 pages.
USPTO Non-Final Rejection for U.S. Appl. No. 09/998,848 dated Jun. 21, 2010; 15 pages.
USPTO Advisory Action for U.S. Appl. No. 09/998,848 dated Feb. 24, 2010; 3 pages.
USPTO Non-Final Rejection for U.S. Appl. No. 09/989,767 dated Jul. 9, 2010; 22 pages.

USPTO Non-Final Rejection for U.S. Appl. No. 09/989,771 dated Jul. 20, 2010; 12 pages.
USPTO Advisory Action for U.S. Appl. No. 09/989,771 dated Feb. 3, 2010; 3 pages.
USPTO Miscellaneous Action for U.S. Appl. No. 10/113,581 dated Jun. 23, 2010; 6 pages.
USPTO Notice of Allowance for U.S. Appl. No. 10/113,581 dated Sep. 3, 2010; 11 pages.
USPTO Notice of Allowance for U.S. Appl. No. 12/057,149 dated Nov. 30, 2010; 7 pages.
USPTO Final Rejection for U.S. Appl. No. 11/698,660 dated Sep. 3, 2010; 19 pages.
USPTO Final Rejection for U.S. Appl. No. 12/060,176 dated Oct. 12, 2010; 22 pages.
USPTO Miscellaneous Action for U.S. Appl. No. 09/975,338 dated Apr. 30, 2010; 2 pages.
USPTO Final Rejection for U.S. Appl. No. 11/818,005 dated May 24, 2010; 8 pages.
USPTO Advisory Action for U.S. Appl. No. 11/779,439 dated Mar. 2009; 3 pages.
USPTO Notice of Allowance for U.S. Appl. No. 11/818,005 dated Oct. 26, 2010; 10 pages.
USPTO Non-Final Rejection for U.S. Appl. No. 11/201,627 dated Sep. 30, 2010; 6 pages.
USPTO Advisory Action for U.S. Appl. No. 11/698,660 dated Nov. 10, 2010; 3 pages.
USPTO Non-Final Rejection for U.S. Appl. No. 11/644,100 dated Sep. 15, 2010; 10 pages.
USPTO Non-Final Rejection for U.S. Appl. No. 11/201,922 dated Jun. 11, 2010; 12 pages.
USPTO Advisory Action for U.S. Appl. No. 12/136,577 dated Oct. 29, 2010; 3 pages.
USPTO Non-Final Rejection for U.S. Appl. No. 11/644,100 dated Dec. 16, 2009; 13 pages.
USPTO Final Rejection for U.S. Appl. No. 11/166,622 dated Mar. 18, 2010; 12 pages.
USPTO Non-Final Rejection for U.S. Appl. No. 12/058,534 dated Jan. 11, 2011; 17 pages.
USPTO Non-Final Rejection for U.S. Appl. No. 12/004,833 dated Dec. 21, 2010; 8 pages.
USPTO Requirement Restriction for U.S. Appl. No. 12/004,833 dated Sep. 22, 2010; 6 pages.
U.S Appl. No. 12/058,586; "System and Method for Monitoring a Target Device," Kenneth Ogami et al. filed on Mar. 28, 2008; 56 pages.
USPTO Notice of Allowance for U.S. Appl. No. 10/118,682 dated Apr. 3, 2006; 4 pages.
USPTO Final Rejection for U.S. Appl. No. 10/118,682 dated Oct. 12, 2005; 11 pages.
USPTO Non-Final Rejection for U.S. Appl. No. 10/118,682 dated Jun. 16, 2005; 12 pages.
USPTO Requirement Restriction for U.S. Appl. No. 10/118,682 dated Apr. 28, 2005; 4 pages.
USPTO Non-Final Rejection for U.S. Appl. No. 10/118,682 dated Jan. 12, 2005; 11 pages.
USPTO Non-Final Rejection for U.S. Appl. No. 10/118,682 dated Sep. 24, 2004; 8 pages.
USPTO Final Rejection for U.S. Appl. No. 10/118,682 dated May 3, 2004; 8 pages.
USPTO Non-Final Rejection for U.S. Appl. No. 10/118,682 dated Feb. 25, 2004; 9 pages.
USPTO Non-Final Rejection for U.S. Appl. No. 10/118,682 dated Nov. 3, 2003; 8 pages.
USPTO Notice of Allowance for U.S. Appl. No. 10/329,162 dated Jul. 5, 2007; 7 pages.
USPTO Non-Final Rejection for U.S. Appl. No. 10/329,162 dated Jan. 29, 2007; 10 pages.
USPTO Final Rejection for U.S. Appl. No. 10/329,162 dated Aug. 25, 2006; 12 pages.
USPTO Non-Final Rejection for U.S. Appl. No. 10/329,162 dated Mar. 10, 2006; 9 pages.
USPTO Final Rejection for U.S. Appl. No. 10/329,162 dated Sep. 21, 2005; 12 pages.
USPTO Non-Final Rejection for U.S. Appl. No. 10/329,162 dated Apr. 21, 2005; 10 pages.
USPTO Advisory Action for U.S. Appl. No. 10/329,162 dated Mar. 29, 2005; 2 pages.
USPTO Final Rejection for U.S. Appl. No. 10/329,162 dated Dec. 15, 2004; 10 pages.
USPTO Non-Final Rejection for U.S. Appl. No. 10/329,162 dated Aug. 2, 2004; 8 pages.
USPTO Final Rejection for U.S. Appl. No. 09/989,767 dated Jan. 18, 2011; 24 pages.
USPTO Notice of Allowance for U.S. Appl. No. 11/201,627 dated Jan. 20, 2011; 8 pages.
USPTO Non-Final Rejection for U.S. Appl. No. 11/200,619 dated Jan. 31, 2011; 14 pages.
USPTO Non-Final Rejection for U.S. Appl. No. 11/698,660 dated Dec. 13, 2010; 20 pages.
USPTO Notice of Allowance for U.S. Appl. No. 11/644,100 dated Jan. 6, 2011; 6 pages.
USPTO Non-Final Rejection for U.S. Appl. No. 11/201,922 dated Dec. 28, 2010; 14 pages.
USPTO Final Rejection for U.S. Appl. No. 11/166,622 dated Dec. 7, 2010; 12 pages.
USPTO Non-Final Rejection for U.S. Appl. No. 11/166,622 dated Jun. 22, 2010; 11 pages.
USPTO Final Rejection for U.S Appl. No. 09/989,771 dated Jan. 4, 2011; 12 pages.
USPTO Non-Final Rejection for U.S Appl. No. 11/818,005 dated Oct. 26, 2010; 10 pages.
USPTO Non-Final Rejection for U.S. Appl. No. 11/968,145 dated Jan. 5, 2011; 8 pages.
USPTO Notice of Allowance for U.S. Appl. No. 12/058,569 dated Dec. 13, 2010; 6 pages.
USPTO Non-Final Rejection for U.S. Appl. No. 09/989,782 dated Oct. 27, 2009; 9 pages.
USPTO Final Rejection for U.S. Appl. No. 12/104,678 dated Dec. 3, 2010; 9 pages.
USPTO Final Rejection for U.S. Appl. No. 11/857,947 dated Jan. 4, 2011; 14 pages.
USPTO Notice of Allowance for U.S. Appl. No. 09/975,115 dated May 9, 2011; 11 pages.
USPTO Notice of Allowance for U.S. Appl. No. 09/975,115 dated Oct. 28, 2010; 9 pages.
USPTO Non-Final Rejection for U.S. Appl. No. 12/902,137 dated Mar. 11, 2011; 9 pages.
USPTO Notice of Allowance for U.S. Appl. No. 12/136,710 dated Jun. 24, 2011; 7 pages.
USPTO Non-Final Rejection for U.S. Appl. No. 12/136,710 dated Feb. 8, 2011; 12 pages.
USPTO Non-Final Rejection for U.S. Appl. No. 10/033,027 dated Mar. 15, 2011; 6 pages.
U.S. Appl. No. 13/169,656: "Microcontroller Programmable System on a Chip," Warren Snyder, filed on Jun. 27, 2011; 130 pages.
USPTO Notice of Allowance for U.S. Appl. No. 10/001,478 dated Sep. 7, 2010; 10 pages.
USPTO Notice of Allowance for U.S. Appl. No. 10/001,478 dated Dec. 27, 2010; 8 pages.
USPTO Notice of Allowance for U.S. Appl. No. 10/001,478 dated May 3, 2011; 8 pages.

* cited by examiner

BREAKPOINT CONTROL IN AN IN-CIRCUIT EMULATION SYSTEM

CROSS REFERENCE TO RELATED DOCUMENTS

This application is a continuation-in-part of U.S. patent application Ser. No. 09/975,105 filed Oct. 10, 2001 now U.S. Pat. No. 7,206,733 to Nemecek entitled "Host to FPGA Interface in an In-Circuit Emulation System", which is hereby incorporated. The application is related to, incorporates by reference and claims priority benefit under 35 U.S.C. §119(e) of provisional patent application Ser. No. 60/243,708 filed Oct. 26, 2000 to Snyder, et al. entitled "Advanced Programmable Microcontroller Device" which is also hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of In Circuit Emulation. More particularly, this invention relates to methods and apparatus for providing breakpoint control in an In-Circuit Emulation System having a real microcontroller and a virtual microcontroller.

BACKGROUND OF THE INVENTION

In-circuit emulation (ICE) has been used by software and hardware developers for a number of years as a development tool to emulate the operation of complex circuit building blocks and permit diagnosis and debugging of hardware and software. Such in-circuit emulation is most commonly used currently to analyze and debug the behavior of complex devices such as microcontrollers and microprocessors that have internal structures that are far too complex to readily model using computer simulation software alone.

FIG. 1 illustrates an exemplary conventional in-circuit emulation arrangement 100 used to model, analyze and debug the operation of a microcontroller device. In this arrangement, a host computer (e.g., a personal computer) 110 is connected to a debug logic block 120 which is further connected to a special version of the microcontroller device that has been developed specially for use in emulation. Operational instructions are loaded from the host computer 110 through the debug logic 120 to the special version of the microcontroller 130. The debug logic 120 monitors operation of the microcontroller 130 as the instructions are executed. Depending upon the application, this operation may be monitored while the special version of the microcontroller 130 is interconnected with the circuitry that is intended to interface a production version of the microcontroller in the finished product under development. Such interconnection may be via simulation within host computer 110 or as actual circuitry or some combination thereof. As the circuit is stepped through its operation, the debug logic gathers information about the state of various components of the microcontroller 130 during operation and feeds that information back to the host computer 110 for analysis.

During the course of the analysis, various trace information such as time stamps, register values, data memory content, etc. may be logged in the host computer 110 for analysis and debugging by the designer. Additionally, it is generally the case that various break points can be defined by the designer that cause the program to halt execution at various points in the operation to permit detailed analysis. Other debugging tools may also be provided to enable the user to debug the operation of the circuit.

In-circuit emulation systems such as 100 have a number of disadvantages and limitations. In earlier systems, the microcontroller 130 might have been simply the production version of the microcontroller itself with no special debugging features. In such systems, the information that can be gathered by the ICE system 100 is limited to that which is available at the pinouts of the microcontroller 130 (or which can be extracted from the microcontroller using clever programming or special coding supported by the processor).

Enhancements to such early systems provided the microcontroller or other processor with an array of built-in debugging tools that use standard pins on the part and built-in instructions that facilitated in-circuit emulation. In such enhanced processors, the emulation tools are integrated into the part and thus become a design constraint for developing and improving the part. Thus, support for the debugging instruction code and the like can increase the cost and complexity of the circuit.

Newer systems often use a so-called "bond-out" microcontroller. A bond-out version of the microcontroller is a version of the production microcontroller that has been designed with special wirebonding pads on the chip that are not normally connected in the production wirebonding. The bond-out version connects these pads to pins on the microcontroller package to permit access to otherwise inaccessible points of the circuit to facilitate debugging. This technique is in common use, but has the disadvantage of imposing significant limitations on the circuit layout to permit space and circuitry associated with the special wirebonding pads. Additionally, it is usually the case that substantial interface circuitry and other special circuitry to facilitate the debugging and bond-out has to be added to the circuit. This increases the complexity, size, power consumption and potentially reduces the yield of the production part. Moreover, development resources are required to lay out the bond-out circuitry and pads and do associated design of such bond-out circuitry. Additionally, instruction code must generally be provided and supported for such an implementation. Such resources may have to be applied with every updated version of the part and may significantly impact speed, cost or flexibility in development of improved versions of the part.

A third technique, one that is used in the PENTIUM® and PENTIUM PRO™ series of microprocessors available from Intel Corporation, provides a special "probe mode" of operation of the processor. When the processor is placed in this probe mode, a number of internal signals are routed to a "debug port" for use by the in-circuit emulation system. This debug port is used to permit the in-circuit emulation system to communicate with the processors at all times and, when placed in probe mode, to read otherwise inaccessible probe points within the processor. Of course, providing such a probe mode requires significant design resources to design in all such probe and debug functions and associated instruction code support into the standard processor. This, of course, increases development cost, chip complexity and chip size.

Moreover, such facilities become a part of the processor design which must be carried through and updated as required as enhancements to the original design are developed.

SUMMARY OF THE INVENTION

The present invention relates generally to handling breakpoints in an ICE system. Objects, advantages and features of the invention will become apparent to those skilled in the art upon consideration of the following detailed description of the invention.

In one embodiment consistent with the present invention a breakpoint control mechanism for an In-Circuit Emulation system is provided. Break bits are assigned to each instruction address and stored in a lookup table within a base station containing a virtual microcontroller. As a program counter increments, a determination is made as to whether or not a break is to occur by reading the break bit from the lookup table. When a break is to occur, a breakpoint controller issues a break command over an interface to an actual microcontroller under test, thus freeing the microcontroller under test from having to include a look-up table on board for a breakpoint control or otherwise provide specifically for breakpoint control. This, advantageously, helps to minimize the dedicated debug circuitry required on the actual microcontroller.

An In-Circuit Emulation system breakpoint control consistent with an embodiment of the present invention has a microcontroller and a virtual microcontroller operating in lock-step synchronization. A breakpoint lookup table is associated with the virtual microcontroller with a break bit associated with each of a plurality of instruction addresses, the break bit being set to indicate that a break is to occur at a specified instruction address. A breakpoint controller sends a break message to the microcontroller whenever an instruction address is encountered that is associated with a set break bit.

A method of establishing a breakpoint in a microcontroller in an In-Circuit Emulation system consistent with certain embodiments of the present invention includes storing a breakpoint lookup table in a virtual microcontroller; executing a sequence of instructions in a microcontroller and in the virtual microcontroller in lock-step synchronization; at each instruction of the sequence of instructions, inspecting the breakpoint lookup table for a set break bit associated with instruction; and if a break bit is set, sending a break message to the microcontroller to implement a break in instruction execution.

A method of establishing a breakpoint in an In-Circuit Emulation system consistent with certain embodiments of the present invention include providing an microcontroller and a virtual microcontroller executing a sequence of instructions in lock-step synchronization, the virtual microcontroller having a breakpoint lookup table; determining an instruction address which a break is to precede; and programming the breakpoint lookup table to have a set break bit at the instruction address with a break is to precede.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
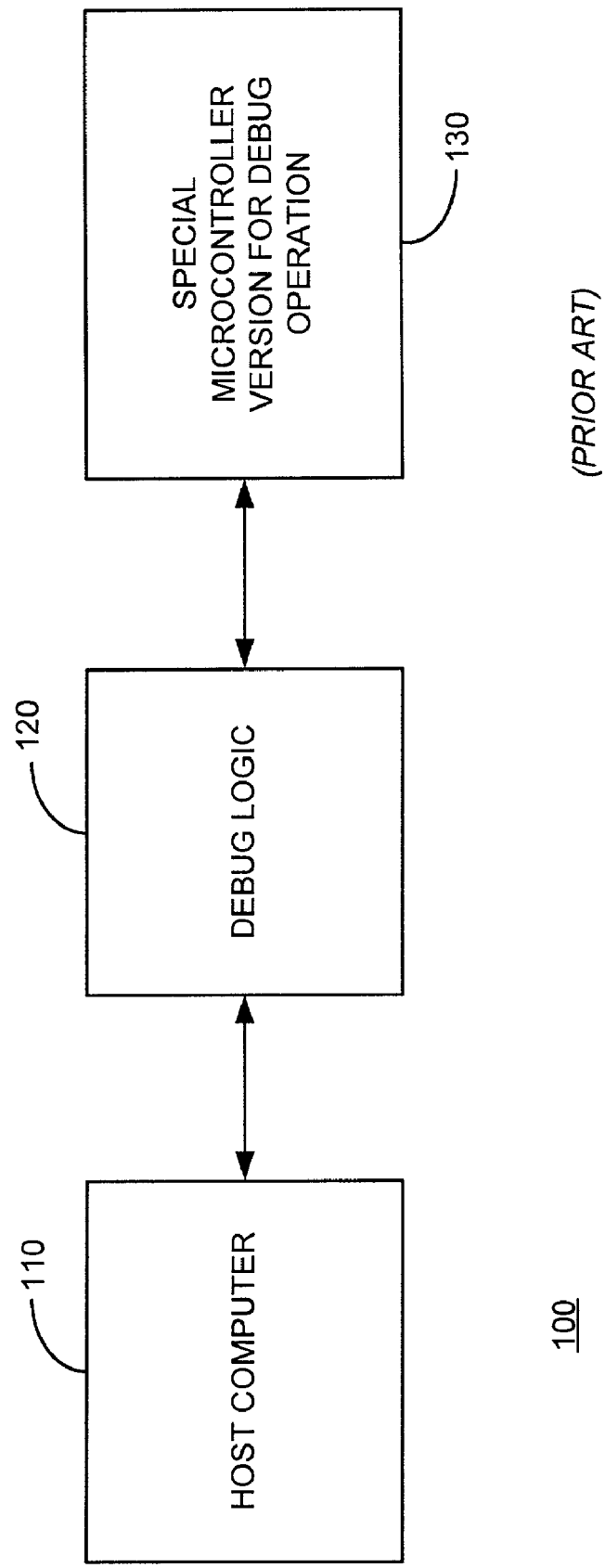
FIG. 1 is a block diagram of a conventional In-Circuit Emulation system.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "transferring" or "executing" or "determining" or "instructing" or "issuing" or "halting" or "clearing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Breakpoint Control in an in-Circuit Emulation System in Accordance with the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

A commercial ICE system utilizing the present invention is available from Cypress MicroSystems, Inc., for the CY8C25xxx/26xxx series of microcontrollers. Detailed information regarding this commercial product is available from Cypress MicroSystems, Inc., 22027 17th Avenue SE, Suite 201, Bothell, Wash. 98021, in the form of version 1.11 of "PSOC DESIGNER: Integrated Development Environment User Guide", which is hereby incorporated by reference. While the present invention is described in terms of an ICE system for the above exemplary microcontroller device, the invention is equally applicable to other complex circuitry including microprocessors and other circuitry that is suitable for analysis and debugging using in-circuit emulation. Moreover, the invention is not limited to the exact implementation details of the exemplary embodiment used herein for illustrative purposes.

Figure 2:
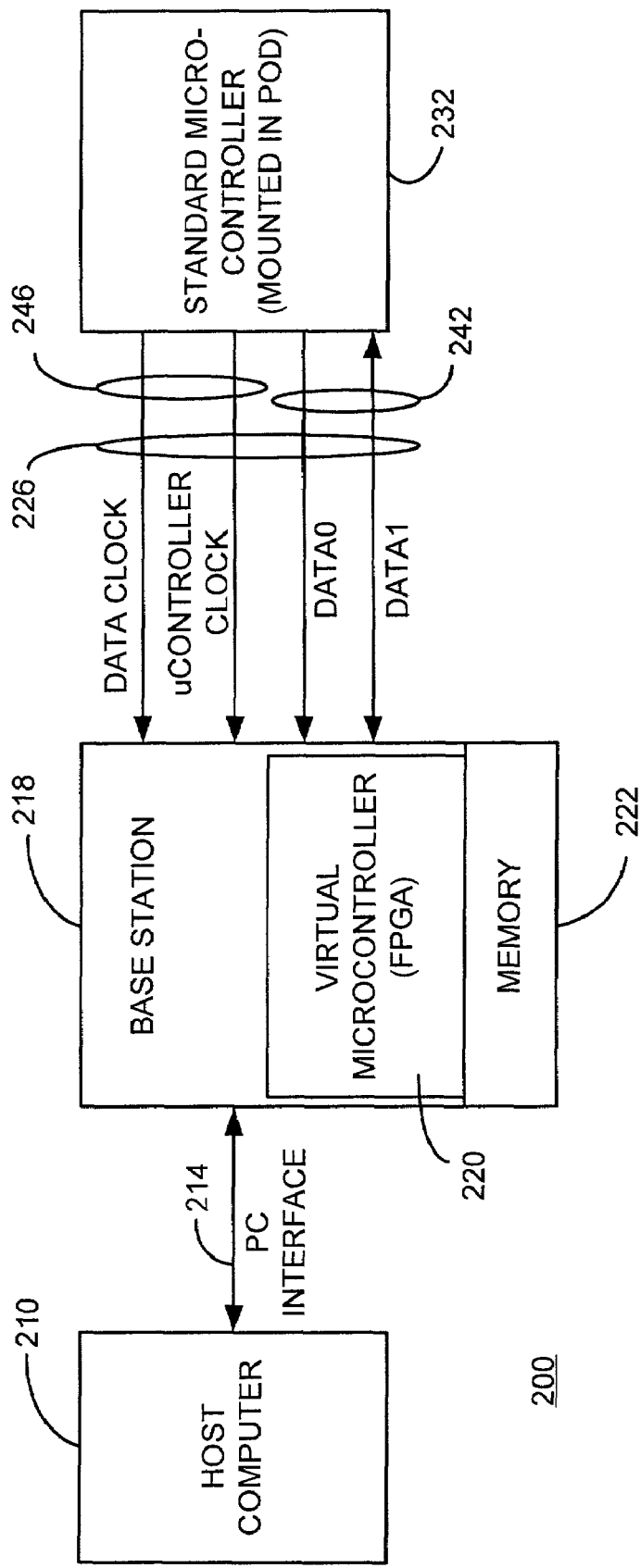
FIG. 2 is a block diagram of an exemplary In-Circuit Emulation system consistent with certain microcontroller embodiments of the present invention.

Referring now to FIG. 2, an architecture for implementation of an embodiment of an ICE system of the present invention is illustrated as system 200. In system 200, a Host computer 210 (e.g., a personal computer based on a PENTIUM® class microprocessor) is interconnected (e.g., using a standard PC interface 214 such as a parallel printer port connection, a universal serial port (USB) connection, etc.) with a base station 218. The host computer 210 generally operates to run an ICE computer program to control the emulation process and further operates in the capacity of a logic analyzer to permit a user to view information provided from the base station 218 for use in analyzing and debugging a system under test or development.

The base station 218 is based upon a general purpose programmable hardware device such as a gate array configured to function as a functionally equivalent "virtual microcontroller" 220 (or other device under test (DUT)). This is accomplished using an associated integral memory 222 which stores program instructions, data, trace information and other associated information. Thus, the base station is configured as an emulator of the internal microprocessor portion of the microcontroller 232. In preferred embodiments, a field programmable gate array FPGA (or other programmable logic device) is configured to function as the virtual microcontroller 220. The FPGA and virtual microcontroller 220 will be referred to interchangeably herein. The base station 218 is coupled (e.g., using a four wire interface 226) to a standard production microcontroller 232 mounted in a mounting device referred to as a "pod". The pod, in certain embodiments, provides connections to the microcontroller 232 that permit external probing as well as interconnection with other circuitry as might be used to simulate a system under development.

The FPGA of the base station 218 of the current embodiment is designed to emulate the core processor functionality (microprocessor functions, Arithmetic Logic Unit functions and RAM and ROM memory functions) of the Cypress MicroSystems CY8C25xxx/26xxx series microcontrollers. The CY8C25xxx/26xxx series of microcontrollers also incorporates I/O functions and an interrupt controller as well as programmable digital and analog circuitry. This circuitry need not be modeled using the FPGA 220. Instead, the I/O read information, interrupt vectors and other information can be passed to the FPGA 220 from the microcontroller 232 over the interface 226 as will be described later.

In order to minimize the need for any special ICE related functions on the microcontroller 232 itself, the FPGA 220 and associated circuitry of the base station 218 are designed to operate functionally in a manner identically to that of microprocessor portion of the production microcontroller, but to provide for access to extensive debug tools including readout of registers and memory locations to facilitate traces and other debugging operations.

The base station 218's virtual microcontroller 220 operates to execute the code programmed into the microcontroller 232 in lock-step operation with the microcontroller 232. Thus, the actual microcontroller 232 is freed of any need to provide significant special facilities for ICE, since any such facilities can be provided in the virtual microcontroller 220. The base station 218's virtual microcontroller 220 and microcontroller 232 operate together such that I/O reads and interrupts are fully supported in real time. The combination of real and virtual microcontroller behave just as the microcontroller 232 would alone under normal operating conditions. I/O reads and interrupt vectors are transferred from the microcontroller 232 to the base station 218 as will be described later. Base station 218 is then able to provide the host computer 210 with the I/O reads and interrupt vectors as well as an array of information internal to the microcontroller 232 within memory and register locations that are otherwise inaccessible.

In the designing of a microcontroller or other complex circuit such as the microcontroller 232, it is common to implement the design using the VERILOG® language (or other suitable language). Thus, it is common that the full functional design description of the microcontroller is fully available in a software format. The base station 218 of the current embodiment is based upon the commercially available SPARTAN® series of FPGAs from Xilinx, Inc., 2100 Logic Drive, San Jose, Calif. 95124. The VERILOG® description can be used as the input to the FPGA design and synthesis tools available from the FPGA manufacturer to realize the virtual microcontroller 220 (generally after timing adjustments and other debugging). Thus, design and realization of the FPGA implementation of an emulator for the microcontroller (virtual microcontroller) or other device can be readily achieved by use of the VERILOG® description along with circuitry to provide interfacing to the base station and the device under test (DUT).

In the embodiment described in connection with FIG. 2, the actual production microcontroller 232 carries out its normal functions in the intended application and passes 110 information and other information needed for debugging to the FPGA 220. The virtual microcontroller 220 implemented within the FPGA of base station 218 serves to provide the operator with visibility into the core processor functions that are inaccessible in the production microcontroller 232. Thus, the FPGA 220, by virtue of operating in lock-step operation with the microcontroller 232 provides an exact duplicate of internal registers, memory contents, interrupt vectors and other useful debug information. Additionally, memory 222 can be used to store information useful in trace operations that is gathered by the FPGA 220 during execution of the program under test. This architecture, therefore, permits the operator to have visibility into the inner workings of the microcontroller 232 without need to provide special bondouts and expensive circuitry on the microcontroller itself.

The base station 218's FPGA based virtual microcontroller 220, operating under control of host computer 210, carries out the core processor functions of microcontroller 232 and thus contains a functionally exact emulated copy of the contents of the registers and memory of the real microcontroller 232. The ICE system starts both microcontrollers (real and virtual) at the same time and keeps them running in synchronization. The real microcontroller 232 sends I/O data to the base station 218 (and in turn to the ICE software operating on the host computer 210 if required) fast enough to keep the real microcontroller 232 and the virtual microcontroller 220 of base station 218 in synchronization. Whenever the system is halted (i.e., when the system is not emulating), other information such as flash memory programming functions, test functions, etc. can be sent over the interface.

Because the microcontroller 232 operates in synchronization with the virtual microcontroller 220, less data needs to be sent over the four wire interface than would be required in an ICE system otherwise. The type of data sent over the lines is allowed to change depending on when the data is sent in the execution sequence. In other words, depending on the execution sequence time, the information over the data lines can be commands to the real microcontroller 232 or they can be data. Since the clock frequency of the real microcontroller 232 is programmable, it copies its current clock on one of the lines of the four wire interface. Moreover, the lock-step operation of the microcontroller 232 and the virtual microcontroller 220 allows the virtual microcontroller 220 to not require certain resources of the microcontroller 232 such as timers, counters, amplifiers, etc. since they are fully implemented in the microcontroller 232. In addition, the microcontroller 232 (or other DUT) can be debugged in real time without need for extensive debug logic residing on the microcontroller 232, since all registers and memory locations, etc. are available through the virtual microcontroller 220.

In the embodiment illustrated, the basic interface used is a four line interface between microcontroller 232 and base station 218. This interface permits use of a standard five wire Category Five patch cable to connect the microcontroller 232 and base station 218 in one embodiment, but of course, this is not to be considered limiting. The four wire interface 226 of the present embodiment can be functionally divided into two functional portions. A data transport portion 242 carries two data lines in the current embodiment. A clock portion 246 carries a debug system clock plus the microcontroller clock signal for the microcontroller 232. Three additional lines are also provided (not shown) for supply, ground and a reset line. But, the data transport portion 242 and the clock portion 246 are of primary interest, since the supply and reset functions can be readily provided in any other suitable manner.

The two portions of the interface are implemented in the current embodiment using four lines as described, however, in other embodiments, these two portions can be implemented with as few as two wires. In the current embodiment, the microcontroller clock signal can be varied by programming (even dynamically during execution of a program).

Therefore, it is desirable to have two clock signals—the microcontroller clock to easily track the microcontroller clock timing as well as a system clock that regulates the data transfer and other operations. However, in other embodiments, particularly where a clock frequency is not changed dynamically, a single clock can be used. The single clock can be multiplied or divided as required to implement the required clocking signals.

The present embodiment using an eight bit microcontroller that only reads eight bits at a time on any given I/O read. Thus, the present microcontroller 232 needs only to effect serializing and transferring a maximum of one eight bit I/O read for each instruction cycle. This is easily accommodated using two data lines transferring four bits each over four system clock cycles. However, using a clock which is two times faster, a single line could equally well transfer the data in the same time. Similarly, four lines could be used to transfer the same data in only two clock cycles. In any case, the objective is to transfer the data in a short enough time to permit the virtual microcontroller 220 to process the data and issue any needed response before the next instruction cycle begins. The time required to accomplish this is held at a minimum in the current invention, since the system synchronization eliminates need for any overhead protocol for transmission of the data.

The current embodiment of the invention uses a four line communication interface and method of communicating between the FPGA within base station 218 (acting as. a "virtual microcontroller" 220 or ICE) and the real microcontroller device under test (microcontroller 232). The four line communication interface is time-dependent so that different information can be transferred at different times over a small number of communication lines. Moreover, since the two processors operate in lockstep, there is no need to provide bus arbitration, framing, or other protocol overhead to effect the communication between the microcontroller 232 and the virtual microcontroller 220. This interface is used for, among other things, transferring of I/O data from the microcontroller 232 to the FPGA 220 (since the FPGA emulates only the core processor functions of the microcontroller in the current embodiment). A first interface line (Data1) is a data line used by the microcontroller 232 to send I/O data to the FPGA based virtual microcontroller 220. This line is also used to notify the FPGA 220 of pending interrupts. This Data1 line is only driven by the real microcontroller 232. A second data line (Data2), which is bidirectional, is used by the microcontroller 232 to send I/O data to the FPGA based virtual microcontroller of base station 218. In addition, the FPGA 220 uses the Data2 line to convey halt requests (i.e., to implement simple or complex breakpoints) to the microcontroller 232.

A third interface line is a 24/48 Mhz debug system clock used to drive the virtual microcontroller 220's communication state machines (the logic used within the state controller to communicate with the microcontroller 232). In the current embodiment, this clock always runs at 24 MHz unless the microcontroller 232's internal clock is running at 24 Mhz. In this case the system clock switches to 48 Mhz. Of course, these exact clock speeds are not to be considered limiting, but are presented as illustrative of the current exemplary embodiment. The fourth interface line is the internal microcontroller clock from the microcontroller 232.

A fifth line can be used to provide a system reset signal to effect the simultaneous startup of both microcontrollers. This fifth line provides a convenient mechanism to reset the microcontrollers, but in most environments, the simultaneous startup can also be effected in other ways including switching of power. Sixth and Seventh lines are provided in the current interface to provide power and ground for power supply.

The base station 218's virtual microcontroller 220 communicates with the microcontroller 232 via four signal and clock lines forming a part of the four line interface 226 forming a part of a seven wire connection as described below. The interface signals travel over a short (e.g., one foot) of CAT5 network cable. The ICE transmits break commands to the microcontroller 232 via the base station 218, along with register read/write commands when the microcontroller 232 is halted. The microcontroller 232 uses the interface to return register information when halted, and to send I/O read, interrupt vector, and watchdog information while running. The microcontroller 232 also sends a copy of its internal clocks for the ICE. The four lines of the four line interface are the first four entries in the table below. Each of the signals and their purpose is tabulated below in TABLE 1:

TABLE 1

| Signal Name | Signal Direction with Respect to Base Station 218 | Description |
| --- | --- | --- |
| U_HCLK (Data Clock or HCLOCK) | In | 24/48 MHz data clock driven by microcontroller 232. This clock is used to drive the ICE virtual microcontroller communication state machines. This clock always runs at 24 MHz, unless the U_CCLK clock is running at 24 MHz— then it switches to 48 MHz. |
| U_CCLK (microcontroller Clock or CCLOCK) | In | The internal microcontroller 232 CPU clock. |
| U_D1_IRQ (Data1) | In | One of two data lines used by the microcontroller 232 to send I/O data to the ICE. This line is also used to notify the ICE of pending interrupts. This line is only driven by the microcontroller 232 (i.e., unidirectional). |
| U_D0_BRQ (Data0) | In/Out | One of two data lines used by the microcontroller 232 to send I/O data to the ICE. The ICE uses this line to convey halt requests and other information to the microcontroller 232. This line is used for bi-directional communication. |
| ICE_POD_RST (RESET) | Out | Optional active high reset signal to microcontroller 232. |
| ICE_POD_PW_R (POWER) | Out | Optional power supply to microcontroller 232. |
| ICE_POD_GND | Out | Optional ground wire to microcontroller 232. |

Synchronization between the microcontroller 232 and the virtual microcontroller 220 is achieved by virtue of their virtually identical operation. They are both started simultaneously by a power on or reset signal. They then track each other's operation continuously executing the same instructions using the same clocking signals. The system clock signal and the microcontroller clock signal are shared between the two microcontrollers (real and virtual) so that even if the microprocessor clock is changed during operation, they remain in lock-step.

In accordance with certain embodiments of the invention, a mechanism is provided for allowing the FPGA 220 of base station 218 and the microcontroller 232 to stop at the same instruction in response to a breakpoint event (a break or halt).

The FPGA 220 has the ability monitor the microcontroller states of microcontroller 232 for a breakpoint event, due to its lock-step operation with microcontroller 232. In the process of executing an instruction, an internal start of instruction cycle (SOI) signal is generated (by both microcontrollers) that indicates that the device is about to execute a next instruction. If a breakpoint signal (a halt or break signal—the terms "halt" and "break" are used synonymously herein) is generated by the FPGA, the execution of the microcontroller 232 can be stopped at the SOI signal point before the next instruction starts.

Although the SOI signal is labeled as a signal indicating the start of an instruction, the SOI signal is used for multiple purposes in the present microcontroller. It is not required that the SOI signal actually indicate a start of instruction for many purposes, merely that there be a convenient time reference on which to base certain actions. For example, any reference signal that always takes place prior to execution of an instruction can be used as a time reference for reading a halt command. Accordingly, any such available or generated reference signal can be used equivalently as a "halt read" signal without departing from the present invention. That notwithstanding, the SOI signal is conveniently used in the current embodiment and will be used as a basis for the explanation that follows, but should not be considered limiting.

Logic within the FPGA 220 of base station 218 allows not only for implementation of simple breakpoint events, but also for producing breakpoints as a result of very complex events. By way of example, and not limitation, a breakpoint can be programmed to occur when a program counter reaches 0x0030, an I/O write is happening and the stack pointer is about to overflow. Other such complex breakpoints can readily be programmed to assist in the process of debugging. Complex breakpoints are allowed, in part, also because the virtual microcontroller 220 has time to carry out complex computations and comparisons after receipt of I/O data transfers from the microcontroller 232 and before the next instruction commences. After the receipt of I/O data from the microcontroller 232, the FPGA 220 of base station 218 has a relatively long amount of computation time to determine if a breakpoint event has occurred or not. In the event a breakpoint has occurred, the microcontroller 232 can be halted and the host processor 210 is informed.

An advantage of this process is that the FPGA 220 and the microcontroller 232 can be stopped at the same time in response to a breakpoint event. Another advantage is that complex and robust breakpoint events are allowed while still maintaining breakpoint synchronization between the two devices. These advantages are achieved with minimal specialized debugging logic (to send I/O data over the interface) and without special bond-out circuitry being required in the microcontroller device under test 232.

Figure 3:
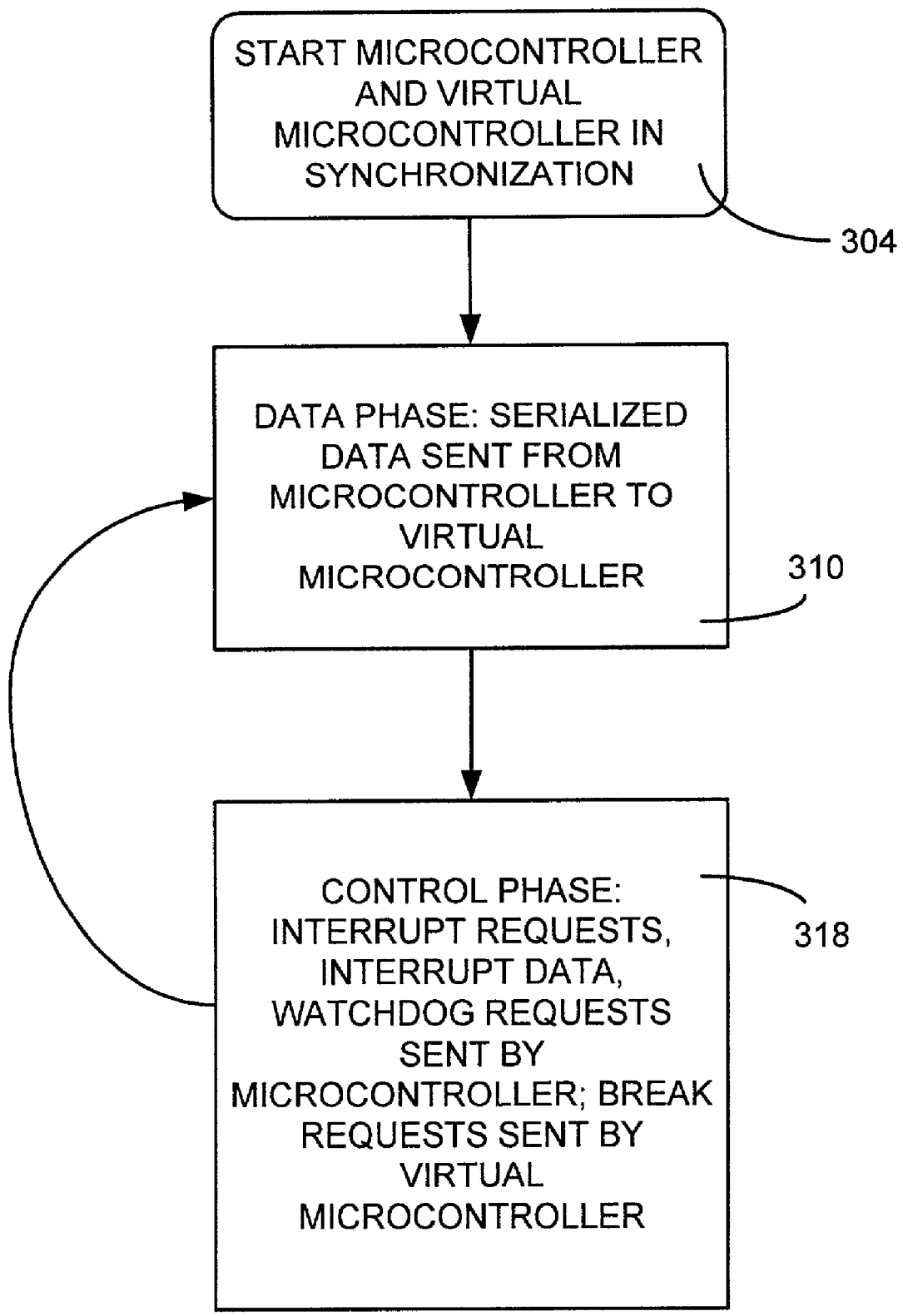
FIG. 3 is an illustration of the operational phases of an In-Circuit Emulation system consistent with an embodiment of the present invention.

Normal operation of the current microcontroller is carried out in a cycle of two distinct stages or phases as illustrated in connection with FIG. 3. The cycle begins with the initial startup or reset of both the microcontroller 232 and the virtual microcontroller 220 at 304. Once both microcontrollers are started in synchronism, the data phase 310 is entered in which serialized data is sent from the microcontroller to the virtual microcontroller. At the start of this phase the internal start of instruction (SOI) signal signifies the beginning of this phase will commence with the next low to high transition of the system clock. In the current embodiment, this data phase lasts four system clock cycles, but this is only intended to be exemplary and not limiting. The SOI signal further indicates that any I/O data read on the previous instruction is now latched into a register and can be serialized and transmitted to the virtual microcontroller. Upon the start of the data phase 310, any such I/O read data (eight bits of data in the current embodiment) is serialized into two four bit nibbles that are transmitted using the Data0 and Data1 lines of the current interface data portion 242. One bit is transmitted per data line at the clock rate of the system clock. Thus, all eight bits are transmitted in the four clock cycles of the data transfer phase.

At the end of the four clock cycle data transfer phase in the current embodiment, the control phase 318 begins. During this control phase, which in the current embodiment may be as short as two microcontroller clock periods (or as long as about fourteen clock periods, depending upon the number of cycles required to execute an instruction), the microcontroller 232 can send interrupt requests, interrupt data, and watchdog requests. Additionally, the virtual microcontroller 220 can issue halt (break) commands. If a halt command is issued, it is read by the microcontroller at the next SOI signal. Once the control phase ends, the data transfer phase repeats. If there is no data to transfer, data1 and data2 remain idle (e.g., at a logic low state). To simplify the circuitry, I/O bus data are sent across the interface on every instruction, even if it is not a bus transfer. Since the virtual microcontroller 220 is operating in synchronization with microcontroller 232 and executing the same instructions, the emulation system knows that data transferred during non I/O read transfers can be ignored.

Figure 4:
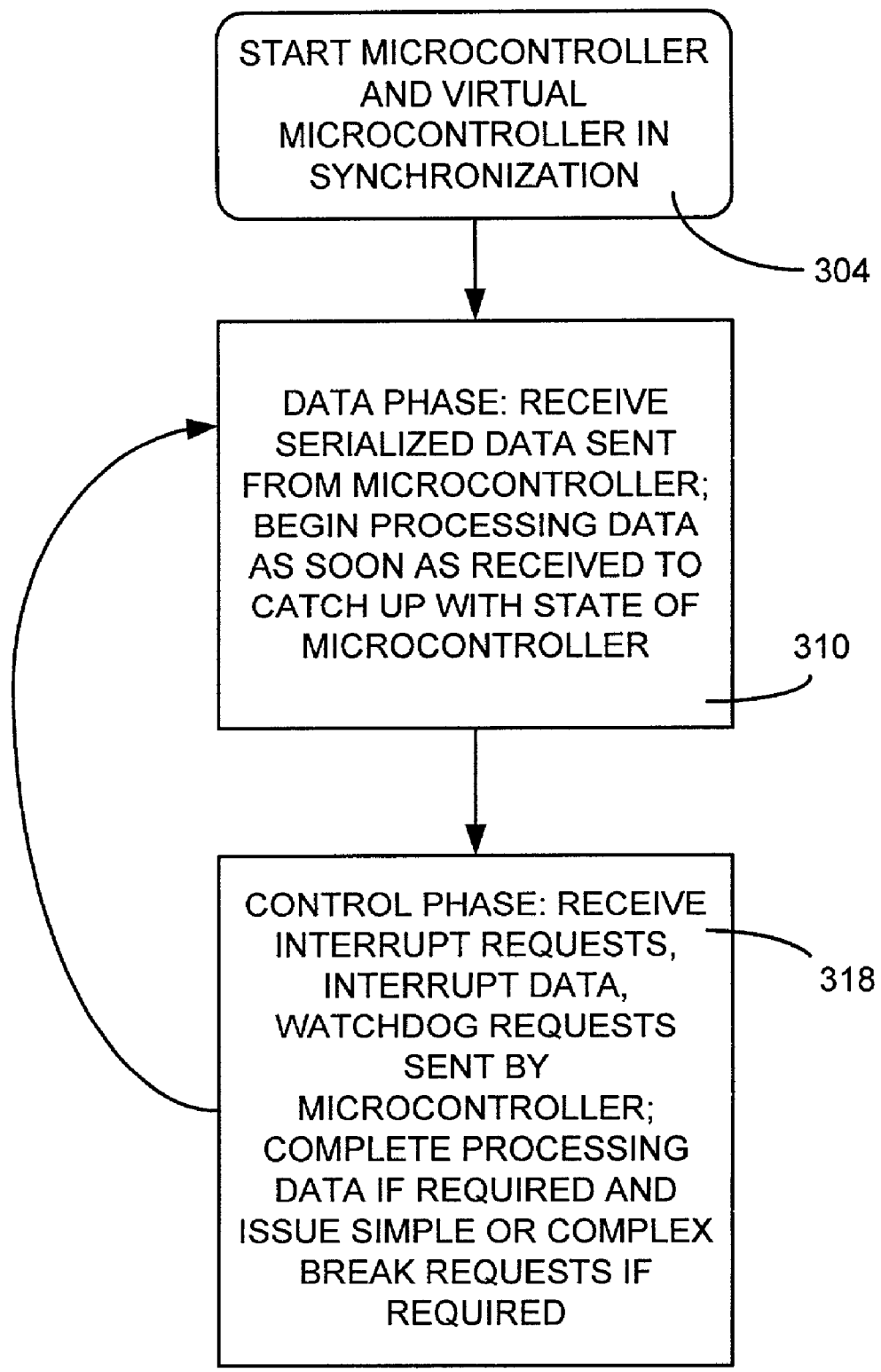
FIG. 4 is an illustration of the operational phases of an In-Circuit Emulation system consistent with an embodiment of the present invention viewed from a virtual microcontroller perspective.

FIG. 4 shows this operational cycle from the perspective of the virtual microcontroller 220. During the data transfer phase 310, the serialized data is received over Data0 and Data1. It should be noted that prior to receipt of this I/O data, the microcontroller 232 has already had access to this data for several clock cycles and has already taken action on the data. However, until receipt of the I/O read data during the data transfer phase 310, the virtual microcontroller 220 has not had access to the data. Thus, upon receipt of the I/O read data during the data phase 310, the virtual microcontroller 220 begins processing the data to catch up with the existing state of microcontroller 232. Moreover, once the I/O data has been read, the host computer 210 or virtual microcontroller 220 may determine that a complex or simple breakpoint has been reached and thus need to issue a break request. Thus, the virtual microcontroller should be able to process the data quickly enough to make such determinations and issue a break request prior to the next SOI. Break requests are read at the internal SOI signal, which also serves as a convenient reference time marker that indicates that I/O data has been read and is available for transmission by the microcontroller 232 to the virtual microcontroller 220.

By operating in the manner described, any breakpoints can be guaranteed to occur in a manner such that both the virtual microcontroller 220 and the microcontroller 232 halt operation in an identical state. Moreover, although the virtual microcontroller 220 and the microcontroller 232 operate on I/O data obtained at different times, both microcontrollers are in complete synchronization by the time each SOI signal occurs. Thus, the virtual microcontroller 220 and the microcontroller 232 can be said to operate in lock-step with respect to a common time reference of the SOI signal as well as with respect to execution of any particular instruction within a set of instructions being executed by both virtual microcontroller 220 and the microcontroller 232.

Figure 5:
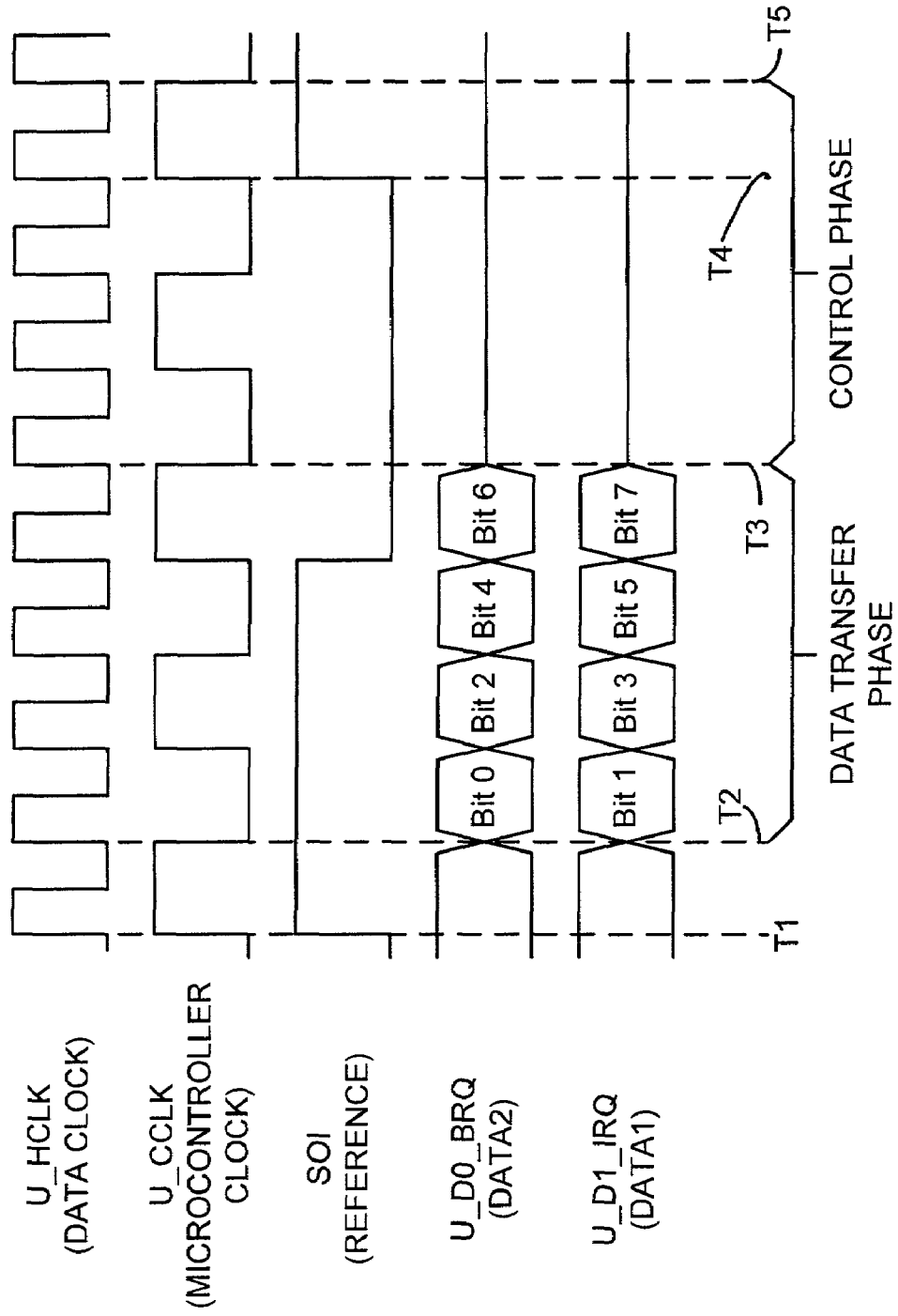
FIG. 5 is a timing diagram useful in understanding an exemplary data and control phase of operation of certain embodiments of the present invention.

A transfer of I/O data as just described is illustrated with reference to the timing diagram of FIG. 5. After the microcontroller 232 completes an I/O read instruction, it sends the read data back to the base station 218 to the virtual microcontroller, since the virtual microcontroller 220 of the present embodiment implements only the core processor functions (and not the I/O functions). The ICE system can expect the incoming data stream for an I/O read to commence with the first positive edge of U_HCLK (the debug or system clock) when SOI signal for the following instruction is at a predetermined logic level (e.g., a logic high). Thus, at time T1, the SOI signal makes a transition to a logic high and one system clock cycle later at time T2, the data transfer phase 310 begins. This timing allows the ICE system to get the read data to the emulated accumulator of base station 218 before it is needed by the next instruction's execution. Note that the first SOI pulse shown in FIG. 5 represents the first SOI following the I/O read instruction (but could be any suitable reference time signal). Transfer of the data from the microcontroller 232 is carried out using the two data lines (data2 and data1, shown as U_D0_BRK and U_D1_IRQ) with each line carrying four bits of an eight bit word. During this data transfer phase 310, an eight bit transfer representing the I/O read data can take place from the microcontroller 232 to the base station 210 in the four clock cycles between T2 and T3. The control phase 318 starts at time T3 and continues until the beginning of the next data transfer phase 310. The SOI signal at T4 indicates that the next data transfer phase is about to start and serves as a reference time to read the data2 line to detect the presence of any halt signal from the virtual microcontroller 220. The current control phase 318 ends at T5 and the next data transfer phase 310 begins.

The base station 218 only transmits break (halt) commands to the microcontroller 232 during the control phase. After the microcontroller 232 is halted in response to the break command, the interface can be used to implement memory/register read/write commands. The halt command is read at the SOI signal transition (T1 or T4). The microcontroller 232 uses the interface to return register information when halted, and to send I/O read, interrupt vector and watchdog timer information while running.

To summarize, a break is handled as follows: The ICE asserts U_D0_BRQ (break) to stop the microcontroller 232. When the ICE asserts the break, the microcontroller 232 reads it at the SOI transition to high and stops. The ICE assert breaks during the control phase. The microcontroller 232 samples the U_D0_BRQ line at the rising edge of SOI (at T4) to determine if a break is to take place. After halting, the ICE may issue commands over the U_D0_BRQ line to query the status of various registers and memory locations of the virtual microcontroller or carry out other functions.

In the case of an interrupt, if an interrupt request is pending for the microcontroller 232, the system asserts U_D1_IRQ as an interrupt request during the control phase of the microcontroller 232. Since the interrupt signal comes to the virtual microcontroller 220 from the microcontroller 232 during the control phase, the virtual microcontroller 220 knows the timing of the interrupt signal going forward. That is, the interrupt signal is the synchronizing event rather than the SOI signal. In case of an interrupt, there is no SOI, because the microcontroller 232 performs special interrupt processing including reading the current interrupt vector from the interrupt controller. Since program instructions are not being executed during the interrupt processing, there is no data/control phase. The virtual microcontroller 220 expects the interrupt vector to be passed at a deterministic time across the interface during this special interrupt processing and before execution of instructions proceeds. Since the virtual microcontroller 220 of the current embodiment does not implement an interrupt controller, interrupt vectors are read from the interrupt controller upon receipt of an interrupt request over the interface. The interrupt vector data is passed over the interface using the two data lines as with the I/O read data, following the assertion of an internal microcontroller IVR_N (active low) signal during the control phase. In the current embodiment, an interrupt cycle is approximately 10 clock cycles long. Since the interrupt service cycle is much longer than the time required to transfer the current interrupt vector, the data is easily transferred using the two data lines, with no particular timing issues.

If the microcontroller 232 undergoes a watchdog reset, it asserts the IRQ (interrupt) and BRQ (break) lines indefinitely. The ICE detects this condition and further detects that the microcontroller clock has stopped. This is enough to establish that a watchdog reset has occurred. The ICE applies an external reset, and notifies the ICE software in the host computer 210.

Figure 6:
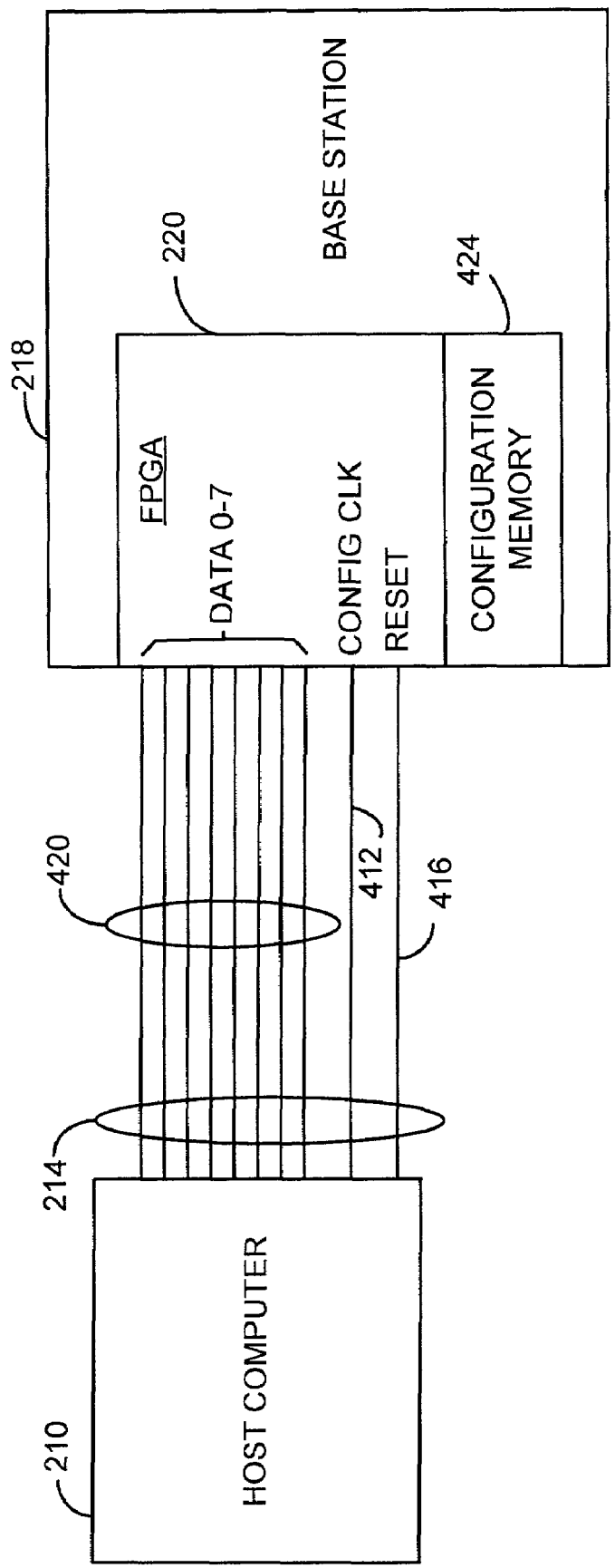
FIG. 6 is a block diagram isolating the host to FPGA interface consistent with an embodiment of the present invention

Referring now to the block diagram of FIG. 6, the interface between the host processor 210 and the base station 218 of a preferred embodiment of the present invention is illustrated. In this embodiment, the connection between the host processor 210 and the FPGA 220 is advantageously provided using a standard IEEE 1284 parallel printer cable 214 with communication carried out using a modification of standard EPP (enhanced parallel port) communication protocol. Of particular interest in this communication interface is the data strobe connection 412, the INIT (initialize) connection 416 and the eight data connections (data line 0 through data line 7) 420. These connection are directly connected to the FPGA with the INIT connection connected to the FPGA RESET pin. The data strobe line 412 is connected to the FPGA configuration clock input and the eight data lines 420 are connected to data input pins of the FPGA.

When the software on the host is started, the INIT connection 416 is driven by the host computer 210 to a logic low causing the FPGA to clear its configuration memory 424 and begin receiving configuration data. The configuration data is stored in configuration memory to define the functionality of the FPGA. This configuration data is clocked in eight bits at a time over the data lines 420 using the data strobe signal as a clock signal. That is, an eight bit word is placed on the interface data lines 420 by host processor 210 followed by toggling the data strobe line to clock the data into the FPGA 220. This unidirectional data transfer from the host computer incorporates a set of design parameters that configure the circuitry of the FPGA 220 to function, in part, as a standard IEEE 1284 EPP interface once the FPGA 220 is programmed and functional. This programming configures the FPGA 220 to have an IEEE 1284 EPP interface with the data lines 420 connected to the FPGA as bidirectional data lines, the configuration clock configured to operate as the IEEE 1284 data clock line connected to data strobe 412 and the INIT line 416 continues to drive the FPGA clear and reset function.

Data transfer continues in this manner until the FPGA 220 is fully programmed by virtue of having received the correct amount of data required by the particular FPGA 220 used in base station 218. Thus, each time the host software is initialized, a data transfer to the FPGA 220 occurs to program the FPGA 220 to function in its capacity of a virtual microcontroller (in this embodiment). Once programming ceases, the FPGA 220 "wakes up" as a virtual microcontroller (or whatever device is programmed into the FPGA 220 in general) and begins to function as the virtual microcontroller. At this point, the interface 214 ceases to function as a unidirectional programming interface and begins to function as a bidirectional communication interface using the programmed operation of the FPGA 220 communicating through its programmed IEEE 1248 EPP parallel communication interface.

In the virtual microcontroller mode of operation of the FPGA 220, communication is carried out using the eight data lines 420 as bidirectional data lines compliant with IEEE 1284 EPP parallel communication protocol with the data strobe line 412 used as a data clock and the INIT line 416 continuing to act as a clear and reset signal. INIT line 416 can thus be used to reinitialize the programming of the FPGA 220, for example, to revise a design parameter or to simply restart the ICE system. TABLE 2 below summarizes the significant connections of this interface.

TABLE 2

| Interface Lines | Program Mode Function | Free Running "Awake" Mode Function |
| --- | --- | --- |
| Data bits 0 through 7 | Unidirectional data into the FPGA | Bidirectional EPP compliant communication |
| Data Strobe | Unidirectional programming clock | EPP Compliant Data Strobe |
| INIT | Low signal indicates clear configuration memory and prepare to receive new configuration data | Low signal indicates clear configuration memory and enter programming mode - prepare to receive new configuration data |

Figure 7:
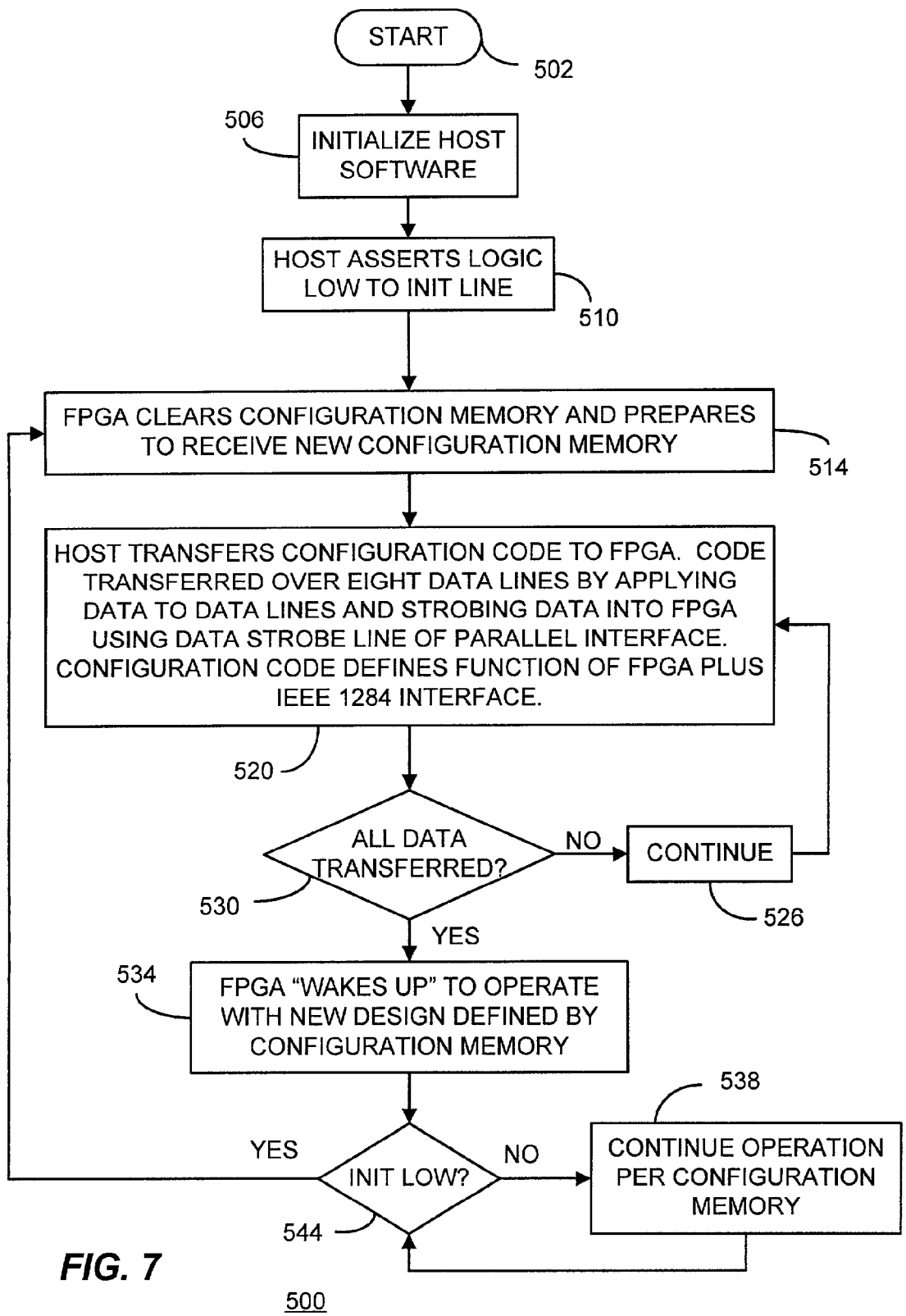
FIG. 7 is a flow chart describing the operation of the host to FPGA interface in an embodiment consistent with the present invention.

The programming and communication process between the host 210 and the FPGA 220 is described in flow chart 500 of FIG. 7 starting at 502. The host software is loaded and initialized at 506, and asserts a logic low on the INIT line 416 to signal a reset and clearing of the FPGA 220's configuration memory 424 at 510. In response to this signal, the FPGA 220 clears configuration memory 424 at 514. The Host computer 210 then begins transferring a new set of configuration parameters to the FPGA 220 at 520 by strobing data into the FPGA's configuration memory 424. This set of configuration parameters configures the FPGA 220 to have an IEEE 1284 EPP compliant communication interface. In other embodiments, other modes of communication could also be used (e.g., extended communication port (ECP) or serial communications) could be used without departing from the invention.

This process continues at 526 until all data are transferred at 530. The FPGA 220 then wakes up to operate with the new configuration parameters stored in configuration memory 424 at 534. The FPGA 220 continues to operate as configured at 538 until such time as the INIT line 416 is again asserted by the Host computer 210 at 544. Control then returns to 514 where the FPGA 220 is cleared and the reprogramming process proceeds as previously described.

Using this mechanism, the FPGA 220 can be coupled to the host computer 210 using a single interface 214 for both programming the FPGA 220 and for later communication with the FPGA 220 operating as the virtual microcontroller. This avoids use of multiple interface connections and/or use of a separate processor to handle details associated with configuration programming and communication with the FPGA 220.

The present invention provides for full in-circuit emulation without need for a special bond-out version of a DUT. This is accomplished using a minimal amount of design embedded within the DUT itself. In the current embodiment, the only functionality required of the production microcontroller itself is to provide for transfer of data over two lines forming the data portion of the interface and reading commands for break, watchdog and interrupt functions received over the same two data lines. These provisions are simple to implement, and use minimal circuitry. The two additional pinouts used for this function were readily accommodated in the eight bit microcontroller of the current invention. Moreover, the use of a single standard IEEE 1284 printer cable interface between the virtual microcontroller and the host computer to provide both FPGA programming and communication between the ICE system and the Host processor provides for a simple and versatile implementation.

In conventional In-Circuit Emulation systems, breaks are set by inserting a halt command or a trap within the microcontroller or other device's operational code. In other devices, a memory such as a Random Access Memory is provided in the microcontroller device wherein a halt or break bit is provided for each line of code. In such a system, a break bit defines the line of code wherein a break in processing is to occur. Unfortunately, with such devices the requirement for storing break addresses within the microcontroller suggests that the microcontroller has to be burdened with additional memory useful only for the purpose of providing this break function for debugging.

Figure 8:
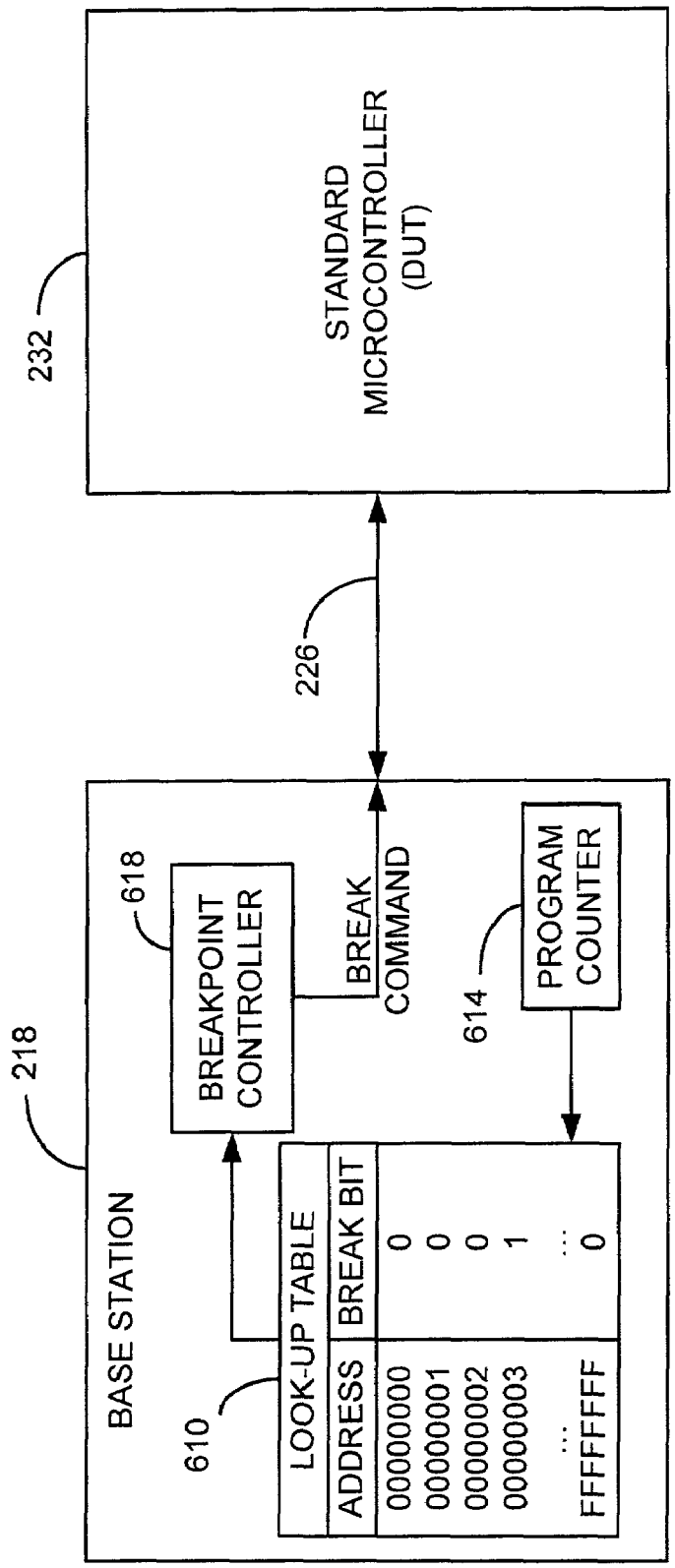
FIG. 8 is a block diagram illustrating breakpoint control consistent with an embodiment of the present invention.

The present invention utilizes the virtual microcontroller 220 and base station 218 to provide break functions so that the microcontroller 232 is freed of the burden of implementation of a break table. FIG. 8 illustrates the mechanism utilized in conjunction with certain embodiments of the present invention in which a look-up table 610 is provided within the base station 218. Look-up table 610 has one address location for each line of assembly instruction. Associated with each address is a break bit such that (in this example) a logic 0 in the address location means that no break is to occur while a logic 1 indicates that a break is to occur. In FIG. 8, the 1 in the break bit location adjacent address 00000003 indicates that a break should occur at assembly instruction number 3. Since this function is carried out within the base station 218, there is no reason to have such functionality embedded within standard microcontroller 232, and no reason to provide such functionality in a bond-out device used for In-Circuit Emulation.

In operation, a program counter 614 is used to count down the program instructions as they are retrieved for execution. In addition, program counter 614 addresses look-up table 610 to determine whether or not a break bit is present. If a break bit is present, a breakpoint controller 618 is notified that a break is to occur at the next instruction and breakpoint controller 618 sends a break command over interface 226 to standard microcontroller 232. In this manner, the debug software operating in host computer 210 can insert a breakpoint at any instruction within look-up table 610 to effect a break in the operation of the program. Since microcontroller 232 requires no memory for a look-up table analogous to 610, the microcontroller can be made smaller while still providing full break functionality. In this manner, host computer 210 can implement a break at any desired point so that debug operations can be carried out.

Figure 9:
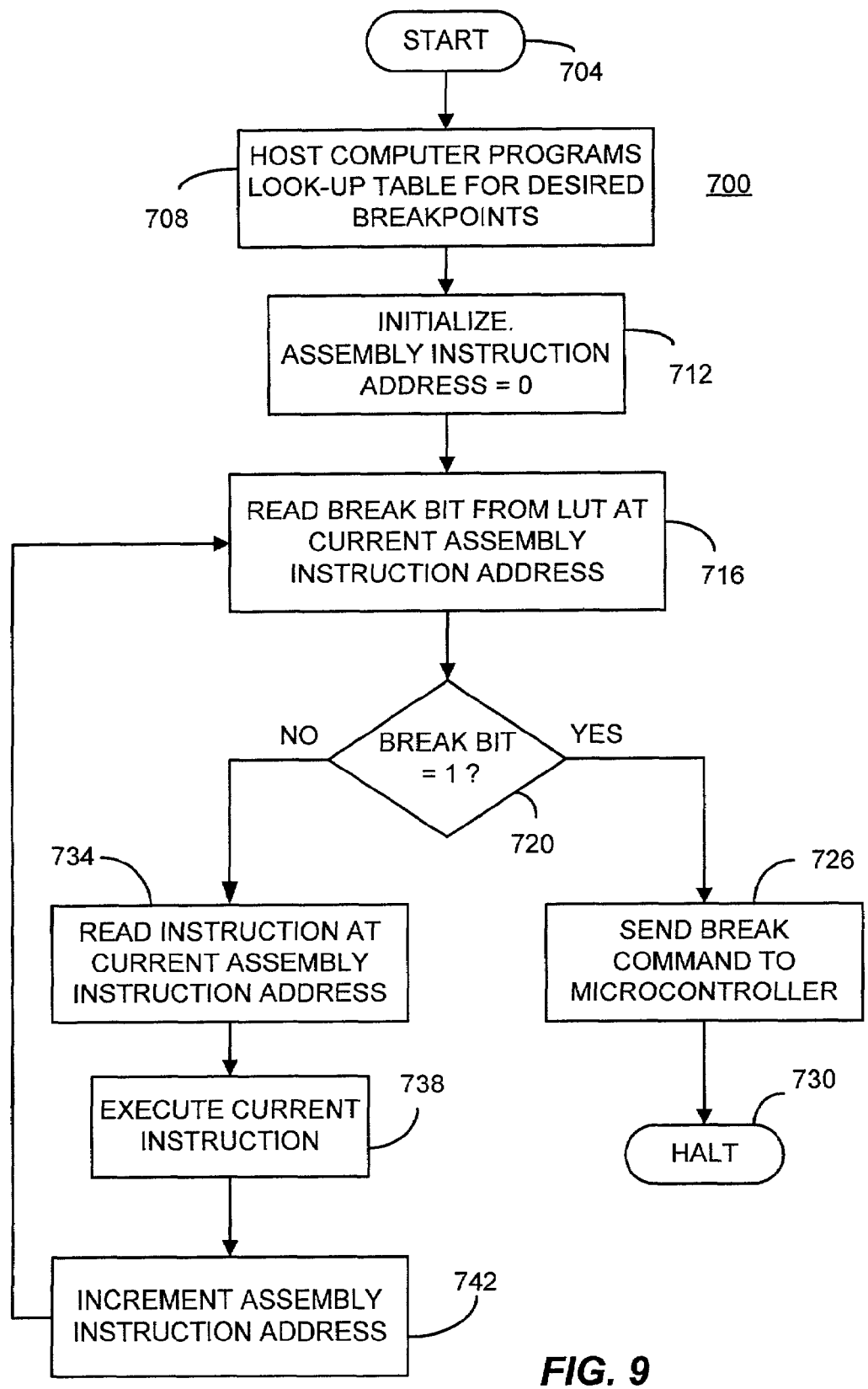
FIG. 9 is a flow chart describing the break process consistent with an embodiment of the present invention.

Referring now to FIG. 9, a process 700 describes an embodiment of the present breakpoint control function in greater detail starting at 704. At 708, the host computer 210 programs the look-up table 610 with any desired breakpoints. The system is then initialized to assembly instruction address 0 (the first address) at 712 and the breakpoint bit from the look-up table 610 is read at the current assembly instruction address at 716. At 720, if the break bit is set to 1, control passes to 726 where a break command is sent to microcontroller 232 and the system halts at 730. In this halted mode at 730, the host computer 210 can read memory locations and registers from the virtual microcontroller 220 in order to ascertain various operational status information and thereby carry out debug operations. In the event the break bit is equal to 0 at 720, the instruction at the current assembly instruction address is read at 734 and then executed at 738. The assembly instruction address is then incremented at 742 and control returns to 716 where the next break bit is read from the look-up table 610.

Thus, a mechanism is provided for minimizing the amount of circuitry required within the actual standard microcontroller 232 while still providing the ability to do extensive debugging functions by providing for easy breakpoint programming in the host computer 210.

While the present embodiment is implemented using a processor that does not use pipelined instructions, this is not to be considered limiting. As long as adequate time is available to serialize and transmit data over the interface, the present interface and break management techniques could equally well be implemented in a pipelined processor.

Those skilled in the art will understand that although the current invention has been explained in terms of providing in-circuit emulation of the core processing functions of a microcontroller. However, the present invention can be realized for any complex electronic device for which in-circuit emulation is needed including, but not limited to, microprocessors and other complex large scale integration devices without limitation. Moreover, although the mechanism for use of the interface between the host processor and the FPGA has been described in the environment of an ICE system, this should not be considered limiting since this interface mechanism can be used for other systems requiring FPGA programming and communication functions over a single interface.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An In-Circuit Emulation system breakpoint control, comprising:
   a microcontroller;
   a virtual microcontroller, which is not identical to and emulates operation of the microcontroller, configured to operate in lock-step synchronization with the microcontroller by executing same instructions using same clocking signals;
   a breakpoint lookup table which is accessed in response to operation of said virtual microcontroller, wherein said breakpoint lookup table comprises a plurality of break bits associated with a sequence of instruction addresses, and wherein said sequence of instruction addresses are associated with the virtual microcontroller, and wherein each of said sequence addresses has a corresponding break bit, the break bit being set to indicate that a break is to occur at a specified address; and
   a breakpoint controller that sends a break message to the microcontroller whenever an instruction address is encountered that is associated with a set break bit.

2. The apparatus according to claim 1, wherein the break message is sent to the microcontroller over an interface linking the microcontroller with the virtual microcontroller.

3. The apparatus according to claim 1, further comprising a program counter that increments through the breakpoint lookup table as a sequence of instructions is executed.

4. The apparatus according to claim 1, further comprising a host computer that programs the breakpoint lookup table to set a breakpoint bit at an instruction address where a break is to occur.

5. The apparatus according to claim 1, wherein the microcontroller and the virtual microcontroller operate in a two phase cycle comprising a control phase and a data transfer phase.

6. The apparatus according to claim 5, wherein the break message is sent during the control phase.

7. The apparatus according to claim 1, wherein said virtual microcontroller emulates said microcontroller such that the content of said microcontroller can be accessed to reduce debugging related functions on said microcontroller.

8. A method of establishing a breakpoint in a microcontroller in an In-Circuit Emulation system, comprising:
   storing a breakpoint lookup table in a virtual microcontroller, which is not identical to and emulates operation of the microcontroller, wherein said breakpoint lookup table comprises a plurality of break bits associated with a sequence of instructions, wherein each of said sequence of instructions has a corresponding break bit;
   executing said sequence of instructions in the microcontroller and in the virtual microcontroller in lock-step synchronization by using same clocking signals;
   at each instruction of the sequence of instructions to be executed by said virtual microcontroller, inspecting the breakpoint lookup table for a set break bit associated with instruction; and
   if a break bit is set, sending a break message to the microcontroller to implement a break in instruction execution.

9. The method according to claim 8, wherein the lookup table comprises a memory having a break bit associated with each instruction address.

10. The method according to claim 8, further comprising programming the lookup table from a host computer.

11. The method according to claim 8, further comprising incrementing a program counter through the breakpoint lookup table as a sequence of instructions is executed.

12. The method according to claim 8, further comprising halting execution of instructions in the microcontroller and the virtual microcontroller prior to the instruction associated with the set break bit.

13. The method according to claim 8, wherein the microcontroller and the virtual microcontroller operate in a two phase cycle comprising a control phase and a data transfer phase.

14. The method according to claim 13, wherein the break message is sent during the control phase.

15. The method according to claim 8, wherein said virtual microcontroller emulates said microcontroller such that the content of said microcontroller can be accessed to reduce debugging related functions on said microcontroller.

16. A method of establishing a breakpoint in an In-Circuit Emulation system, comprising:
   executing a sequence of instructions in a microcontroller and in a virtual microcontroller, which is not identical to and emulates operation of the microcontroller, in lock-step synchronization by using same clocking signals, the virtual microcontroller having a breakpoint lookup table, wherein said breakpoint lookup table comprises a plurality of break bits associated with said sequence of instructions, and wherein each of said sequence of instructions has a corresponding break bit;
   determining an instruction address which a break is to precede;
   programming the breakpoint lookup table to have a set break bit at the instruction address which the break is to precede;
   at each instruction of the sequence of instructions to be executed by said virtual microcontroller, inspecting the breakpoint lookup table for a set break bit associated with instruction; and
   halting execution of instructions in the microcontroller and the virtual microcontroller prior to the instruction associated with the set break bit.

17. The method according to claim 16, wherein if a break bit is set, sending a break message to the microcontroller to implement a break in instruction execution.

18. The method according to claim 16, wherein the lookup table comprises a memory having a break bit associated with each instruction address.

19. The method according to claim 16, wherein the programming of the lookup table is carried out from a host computer.

20. The method according to claim 16, wherein the microcontroller and the virtual microcontroller operate in a two phase cycle comprising a control phase and a data transfer phase, and wherein the break message is sent during the control phase.

21. The method according to claim 16, wherein said virtual microcontroller emulates said microcontroller such that the content of said microcontroller can be accessed to reduce debugging related functions on said microcontroller.

* * * * *